(12) United States Patent
Yahata et al.

(10) Patent No.: US 12,033,227 B2
(45) Date of Patent: **\*Jul. 9, 2024**

(54) METHOD FOR PROVIDING INFORMATION

(71) Applicant: Panasonic Intellectual Property Management Co., Ltd., Osaka (JP)

(72) Inventors: Hiroshi Yahata, Osaka (JP); Takahiro Nishi, Nara (JP); Tadamasa Toma, Osaka (JP); Toshiyasu Sugio, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/492,895

(22) Filed: Oct. 24, 2023

(65) Prior Publication Data

US 2024/0054580 A1 Feb. 15, 2024

Related U.S. Application Data

(63) Continuation of application No. PCT/JP2021/037244, filed on Oct. 7, 2021.

(30) Foreign Application Priority Data

Aug. 4, 2021 (JP) ................................ 2021-128609

(51) Int. Cl.
*G06Q 50/12* (2012.01)
*G06Q 30/0601* (2023.01)

(52) U.S. Cl.
CPC ......... *G06Q 50/12* (2013.01); *G06Q 30/0633* (2013.01); *G06Q 30/0641* (2013.01)

(58) Field of Classification Search
CPC . G06Q 50/12; G06Q 30/0633; G06Q 30/0641
See application file for complete search history.

(56) References Cited

U.S. PATENT DOCUMENTS 6,266,060 B1 7/2001 Roth
6,618,062 B1 9/2003 Brown
(Continued)

FOREIGN PATENT DOCUMENTS

| CN | 103246720 | 8/2013 |
|---|---|---|
| CN | 107679951 | 2/2018 |

(Continued)

OTHER PUBLICATIONS

International Search Report of PCT application No. PCT/JP2021/037244 dated Dec. 21, 2021.

(Continued)

*Primary Examiner* — Paul Danneman
(74) *Attorney, Agent, or Firm* — GREENBLUM & BERNSTEIN, P.L.C.

(57) ABSTRACT

A method for providing information includes: arranging, on the basis of taste information regarding a user and the menu information regarding a second restaurant indicated by a store identifier, first menu items included in the menu information in order according to the taste information; and causing the first menu items arranged in the order according to the taste information to be displayed in a first display area of a display screen of a terminal apparatus, and causing second menu items specified by the second restaurant to be displayed in a second display area of the display screen.

18 Claims, 32 Drawing Sheets

(56) References Cited

U.S. PATENT DOCUMENTS

| | | | |
|---|---|---|---|
| 6,646,659 | B1 | 11/2003 | Brown |
| 7,680,690 | B1 | 3/2010 | Catalano |
| 8,429,026 | B1 | 4/2013 | Kolawa et al. |
| 10,366,434 | B1 | 7/2019 | Belousova et al. |
| 11,138,680 | B1 | 10/2021 | Matoba |
| 11,176,626 | B1 | 11/2021 | Ismael |
| 11,727,465 | B2* | 8/2023 | Yahata .................. H04W 4/021 705/27.2 |
| 2002/0046161 | A1 | 4/2002 | Matsutani |
| 2002/0198790 | A1 | 12/2002 | Paulo |
| 2005/0114149 | A1 | 5/2005 | Rodriguez |
| 2007/0088624 | A1 | 4/2007 | Vaughn |
| 2009/0048027 | A1 | 2/2009 | Palmisano |
| 2009/0132492 | A1 | 5/2009 | Satoh et al. |
| 2010/0161432 | A1* | 6/2010 | Kumanov .......... G06Q 30/0281 705/40 |
| 2010/0332271 | A1 | 12/2010 | De Spong |
| 2012/0233002 | A1 | 9/2012 | Abujbara |
| 2013/0211959 | A1 | 8/2013 | Marusyk et al. |
| 2013/0325640 | A1 | 12/2013 | Morgan et al. |
| 2013/0339163 | A1 | 12/2013 | Dumontet |
| 2014/0324607 | A1 | 10/2014 | Frehn et al. |
| 2015/0199777 | A1 | 7/2015 | Rodriguez |
| 2015/0254789 | A1 | 9/2015 | Neeld |
| 2016/0117757 | A1 | 4/2016 | Thomas |
| 2016/0191534 | A1 | 6/2016 | Mallozzi |
| 2018/0032899 | A1 | 2/2018 | Nguyen et al. |
| 2018/0308143 | A1 | 10/2018 | Chan et al. |
| 2018/0308155 | A1 | 10/2018 | Kohli et al. |
| 2019/0163710 | A1 | 5/2019 | Haghighat Kashani et al. |
| 2019/0311445 | A1 | 10/2019 | Werner |
| 2020/0342550 | A1 | 10/2020 | Halimsaputera |
| 2020/0410496 | A1 | 12/2020 | Margolin et al. |
| 2021/0035196 | A1 | 2/2021 | Resheff et al. |
| 2021/0073768 | A1 | 3/2021 | Gordon |
| 2021/0075793 | A1 | 3/2021 | Dunjic |
| 2021/0142226 | A1 | 5/2021 | Sahni et al. |
| 2021/0287312 | A1 | 9/2021 | Yahata et al. |
| 2022/0012793 | A1 | 1/2022 | Yahata |
| 2022/0012794 | A1 | 1/2022 | Yahata |
| 2022/0012825 | A1 | 1/2022 | Yahata |
| 2022/0012826 | A1 | 1/2022 | Yahata |
| 2022/0270161 | A1 | 8/2022 | Zhang |
| 2022/0383433 | A1 | 12/2022 | Moton |
| 2023/0306494 | A1 | 9/2023 | Yahata |

FOREIGN PATENT DOCUMENTS

| | | |
|---|---|---|
| CN | 107862542 | 3/2018 |
| CN | 109816469 | 5/2019 |
| CN | 113179661 | 7/2021 |
| JP | 2003-281244 | 10/2003 |
| JP | 2004-295205 | 10/2004 |
| JP | 2005-165841 | 6/2005 |
| JP | 2007-41672 | 2/2007 |
| JP | 2007-087319 | 4/2007 |
| JP | 2007-213222 | 8/2007 |
| JP | 2009-064348 | 3/2009 |
| JP | 2009-070188 | 4/2009 |
| JP | 2009-245274 | 10/2009 |
| JP | 2014-048875 | 3/2014 |
| JP | 2014-052944 | 3/2014 |
| JP | 2017-228040 | 12/2017 |
| JP | 2000-293580 | 10/2020 |
| WO | 2007/041672 | 4/2007 |
| WO | 2021/106232 | 6/2021 |

OTHER PUBLICATIONS

English Translation of Chinese Search Report dated Apr. 29, 2023 for the related Chinese Patent Application No. 202080081216.9.

International Search Report of PCT application No. PCT/JP2020/010047 dated Jul. 7, 2020.

Trevisiol, Michele, Luca Chiarandini, and Ricardo Baeza-Yates. "Buon appetito: recommending personalized menus." Proceedings of the 25th ACM conference on Hypertext and social media. (Year: 2014).

Office Action issued in U.S. Appl. No. 17/485,591, dated Dec. 23, 2022.

Office Action issued in U.S. Appl. No. 17/485,594, dated Dec. 23, 2022.

Office Action issued in Japan Patent Application No. 2021-540456, dated Nov. 9, 2021, together with English translation thereof.

Office Action issued in Japan Patent Application No. 2021-540457, dated Nov. 9, 2021, together with English translation thereof.

International Search Report issued in PCT application No. PCT/JP2021/005102, dated May 11, 2021.

International Search Report issued in PCT application No. PCT/JP2021/005108, dated May 11, 2021.

English Translation of Chinese Search Report dated Jul. 15, 2023 for Chinese Patent Application No. 202180006657.7.

International Search Report issued in International Patent Application No. PCT/JP2022/024465, dated Sep. 6, 2022.

International Search Report issued in International Patent Application No. PCT/JP2021/037245, dated Dec. 28, 2021.

U.S. Appl. No. 18/492,906, to Yahata et al., filed Oct. 24, 2023.

U.S. Appl. No. 18/492,916, to Yahata et al., filed Oct. 24, 2023.

R. Y. Toledo, A. A. Alzahrani and L. Martinez, "A Food Recommender System Considering Nutritional Information and User Preferences", IEEE Access, vol. 7, pp. 96695-96711, 2019 (Year: 2019).

English Translation of Chinese Search Report dated Apr. 4, 2024 for Chinese Patent Application No. 202280007430.9.

* cited by examiner

| ORDER TIME INFORMATION | STORE ID | STORE NAME | ORDERED ITEM NAMES |
|---|---|---|---|
| 2020-01-03T13:15:45.000Z | A1 | RESTAURANT CHAIN A KADOMA STORE | CAPPUCCINO, ICE CREAM |
| 2020-01-04T17:05:11.000Z | B1 | RESTAURANT CHAIN B MORIGUCHI STORE | BACON, EGG, AND CHEESE BURGER, OOLONG TEA |
| 2020-01-04T22:27:06.000Z | C1 | RESTAURANT CHAIN C MORISHOJI STORE | VONGOLE BIANCO, CAFFE MOCHA, ICE CREAM |
| 2020-01-05T09:23:31.000Z | D1 | RESTAURANT CHAIN D TSURUMIRYOKUCHI STORE | DAN DAN NOODLES & CHINESE DUMPLINGS SET |
| 2020-01-07T11:01:23.000Z | A2 | RESTAURANT CHAIN A KYOBASHI STORE | CAPPUCCINO |
| ·· | ·· | ·· | ·· |

| ITEM NAME | PRICE | TIME LIMIT |
|---|---|---|
| BLENDED COFFEE | 300 | No |
| AMERICAN COFFEE | 300 | No |
| CAFE AU LAIT | 350 | No |
| ESPRESSO | 300 | No |
| CAPPUCCINO | 350 | No |
| CAFFE MOCHA | 350 | No |
| CHOCOLATE COOKIE | 150 | No |
| SPECIAL MONT BLANC WHITE CAFFE LATTE | 600 | Yes |
| ⋮ | ⋮ | ⋮ |

FIG. 14

| ITEM NAME | TOTAL NUMBER OF ORDERS | NUMBER OF ORDERS AT SPECIFIED RESTAURANT CHAIN |
|---|---|---|
| BLENDED COFFEE | 0 | 0 |
| AMERICAN COFFEE | 0 | 0 |
| CAFE AU LAIT | 2 | 0 |
| ESPRESSO | 0 | 0 |
| CAPPUCCINO | 29 | 0 |
| CAFFE MOCHA | 11 | 0 |
| CHOCOLATE COOKIE | 3 | 0 |
| SPECIAL MONT BLANC WHITE CAFFE LATTE | 0 | 0 |
| ... | ... | ... |

METHOD FOR PROVIDING INFORMATION

BACKGROUND

1. Technical Field

The present disclosure relates to a control method used in an information management system.

2. Description of the Related Art

Japanese Unexamined Patent Application Publication No. 2009-64348 discloses an order system that obtains order records of a customer and that presents an order proposal relating to foods and drinks to the customer on the basis of information regarding the obtained order records in order to save the customer the trouble of finding foods and drinks that suit his/her taste on a menu at a restaurant.

SUMMARY

Further improvements are needed in the above example of the related art.

In one general aspect, the techniques disclosed here feature a method for providing information in an information management system that manages taste information regarding a user including an order record at a first restaurant and that associates the taste information with identification information for identifying the user, the method including: obtaining, from a terminal apparatus, the identification information and a store identifier indicating a second restaurant in a chain different from a chain to which the first restaurant belongs; arranging, on a basis of the taste information associated with the identification information and the menu information regarding the second restaurant indicated by the store identifier, first menu items included in the menu information in order according to the taste information, the menu information including the first menu items and second menu items specified by the second restaurant, the menu information being obtained from a server associated with the second restaurant indicated by the store identifier over a network; transmitting, to the terminal apparatus, the menu information including the first menu items arranged in the order and the second menu items, to display the first menu items arranged in the order in a first display area of a display screen of the terminal apparatus and display the second menu items specified by the second restaurant in a second display area of the display screen.

With the above aspect, further improvements can be achieved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 12 is a diagram illustrating an example of the data configuration of an order record database storing order records;

FIG. 13 is a diagram illustrating an example of the data configuration of standard menu information;

FIG. 14 is a table illustrating the number of orders, placed by a certain user, for each of foods and drinks included in the standard menu information;

DETAILED DESCRIPTIONS

Figure 1:
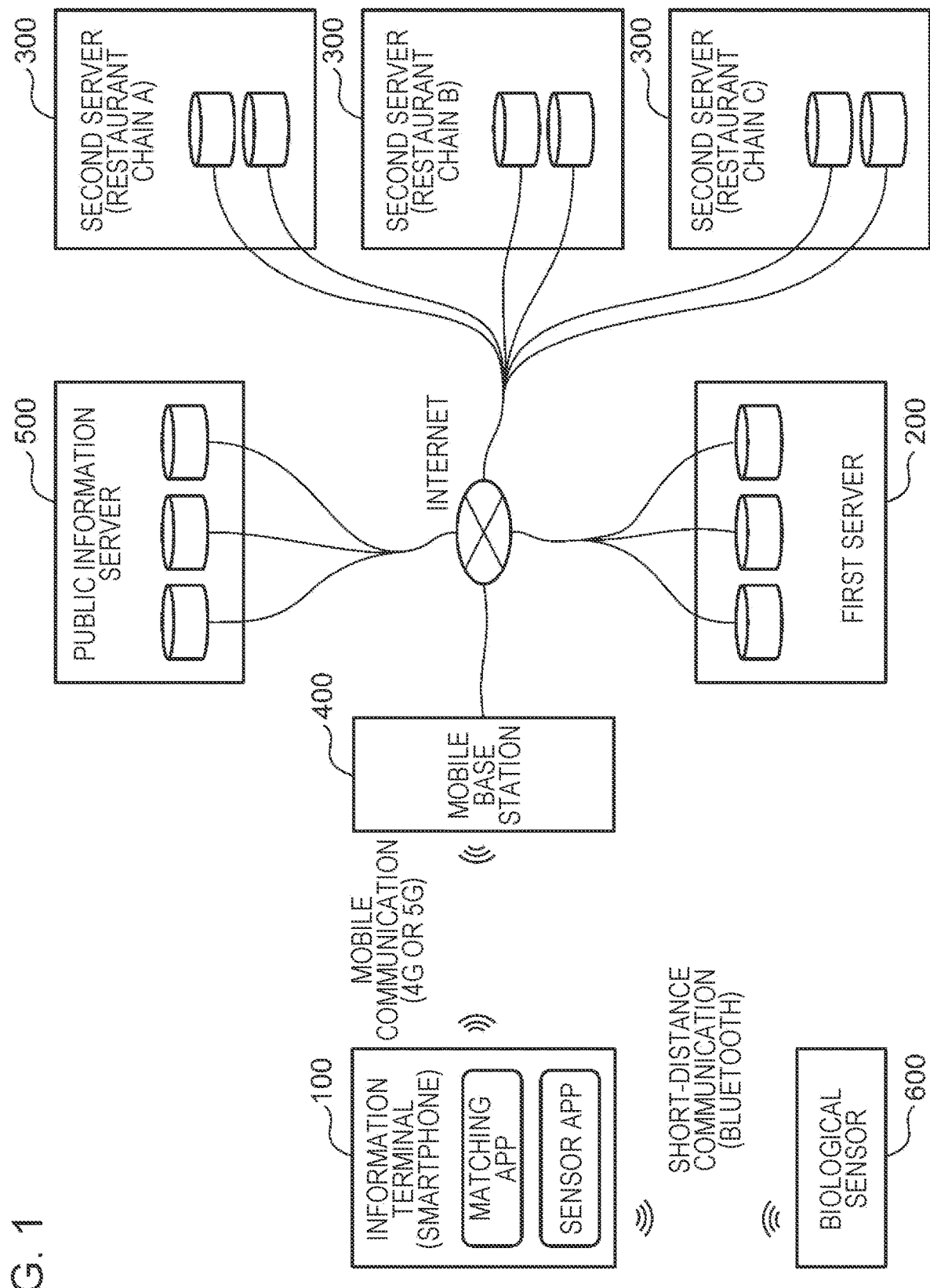
FIG. 1 is a diagram illustrating an example of the entirety of an information provision system in the present disclosure.

Underlying Knowledge Forming Basis of Present Disclosure

Today, with development of a restaurant industry, various chain stores that serve foods and drinks, such as family restaurants, hamburger shops, coffee shops, and Chinese restaurants, are being deployed on a nationwide scale. Different stores often share the same menu table if the stores belong to the same chain. Even when a user is visiting a store for a first time, therefore, the user can efficiently order foods and drinks using a familiar menu table if the store belongs to a chain familiar to the user.

If the user is visiting for a first time a store managed by a chain that the user has never used, however, the user needs to order foods and drinks using an unfamiliar menu table, which can be troublesome.

In the technique disclosed in Japanese Unexamined Patent Application Publication No. 2009-64348, information regarding order records of the user is obtained from an order record database, and an order proposal to be presented to the user is generated on the basis of the information regarding the order records. With the technique disclosed in this example of the related art, however, an order proposal is generated using only order records of the user at a store that the user is visiting. With the technique disclosed in this example of the related art, therefore, when the user is visiting a store for a first time, for example, it is difficult to generate an order proposal since there are no order records at the store. With the technique disclosed in this example of the related art, therefore, it is difficult to address the troublesomeness described above.

When it is difficult to generate an order proposal, a standard menu to be used at a store for general customers might be presented to the user's mobile terminal. Because mobile terminals have limitations in display area, however, foods and drinks that the user is not interested in might be preferentially displayed. In this case, the user needs to find desired foods and drinks through scrolling or the like, which can be troublesome.

One non-limiting and exemplary embodiment provides a technique for enabling a user to efficiently select foods and drinks that suit his/her taste using a terminal apparatus having a limitation in display area.

(1-1) A method for providing information according to an aspect of the present disclosure is a method for providing information in an information management system that manages taste information regarding a user including an order record at a first restaurant and that associates the taste information with identification information for identifying the user, the method including: obtaining, from a terminal apparatus, the identification information and a store identifier indicating a second restaurant in a chain different from a chain to which the first restaurant belongs; arranging, on a basis of the taste information associated with the identification information and the menu information regarding the second restaurant indicated by the store identifier, first menu items included in the menu information in order according to the taste information, the menu information including the first menu items and second menu items specified by the second restaurant, the menu information being obtained from a server associated with the second restaurant indicated by the store identifier over a network; and transmitting, to the terminal apparatus, the menu information including the first menu items arranged in the order and the second menu items, to display the first menu items arranged in the order in a first display area of a display screen of the terminal apparatus and display the second menu items specified by the second restaurant in a second display area of the display screen.

According to this aspect, the information management system manages taste information regarding a user including an order record at a first restaurant and associates the taste information with identification information for identifying the user. A store identifier indicating a second restaurant different from the first restaurant is obtained from a terminal apparatus used by the user. Menu items included in menu information regarding the second restaurant are then arranged in order according to the taste information regarding the user, and menu information regarding the menu items arranged in the order is displayed on a display screen of the terminal apparatus.

Consequently, the user can preferentially display, in the order according to the taste information, the menu items included in the menu information regarding the second restaurant on the display screen of the terminal apparatus that has a limitation in display area on the basis of the taste information including the order record at the first restaurant, which the user has used before, even when the user uses the second restaurant for a first time.

The user, therefore, can efficiently select foods and drinks that suit his/her taste even when the user uses the second restaurant for the first time, Furthermore, according to this aspect, since the first menu items arranged in the order according to the taste information are displayed in the first display area and the second menu items specified by the second restaurant are displayed in the second display area, menu items that reflect both the user's taste and the specification by the second restaurant can be displayed. Furthermore, menu items to be displayed tend to be fixed if the menu items are displayed only on the basis of the taste information, but since the second restaurant specifies menu items to be displayed, the second menu items include products specified by the second restaurant, for example, thereby diversifying displayed menu items.

(1-2) In the method, arrangement of the second menu items in the second display area may be specified by the second restaurant.

According to this aspect, since the second menu items are displayed in the arrangement specified by the second restaurant, the second restaurant can control order in which the second menu items are arranged. As a result, for example, the second restaurant can preferentially display, in the second display area, dishes that the second restaurant desires the user to select.

(1-3) In the method, when the order according to the taste information is first order, the first menu items may be arranged in the first order and displayed in the first display area, and when the order according to the taste information is second order, which is different from the first order, the first menu items may be arranged in the second order and displayed in the first display area. The second menu items may be displayed in the second display area in a same mode regardless of whether the order according to the taste information is the first order or the second order.

According to this aspect, the first menu items to be displayed in the first display area can vary depending on the taste information, whereas the second menu items to be displayed in the second display area are displayed independently of the taste information.

(1-4) In the method, the second restaurant may include a coffee shop in a chain different from the chain to which the first restaurant belongs.

According to this aspect, at a coffee shop in a certain chain, menu information in which menu items are arranged in order according to taste information including an order record at a coffee shop in another chain is displayed. Even when the user uses the coffee shop in the certain chain for a first time, therefore, the user can efficiently select foods and drinks that suit his/her taste.

(1-5) In the method, the second restaurant may include a hamburger shop in a chain different from the chain to which the first restaurant belongs.

According to this aspect, at a hamburger shop in a certain chain, menu information in which menu items are arranged in order according to taste information including an order record at a hamburger shop in another chain is displayed. Even when the user uses the hamburger shop in the certain chain for a first time, therefore, the user can efficiently select foods and drinks that suit his/her taste.

(1-6) The method may further include obtaining positional information regarding the terminal apparatus of the user and providing, on a basis of the positional information, the terminal apparatus with restaurant information indicating one or more restaurants in an area including a position indicated by the positional information. The store identifier may be selected on the terminal apparatus on a basis of the restaurant information.

According to this aspect, the user can select a desired one of restaurants around a position of the user. Menu items included in menu information regarding the selected restaurant are then displayed while being arranged in order according to taste information regarding the user. Even when the user uses the selected restaurant for a first time, therefore, the user can efficiently select foods and drinks that suit his/her taste.

(1-7) In the method, the positional information regarding the terminal apparatus of the user may be obtained using a global positioning system.

According to this aspect, since the positional information regarding the terminal apparatus is obtained using the global positioning system, the position of the user can be accurately identified, and restaurants around the user can be presented to the user.

(1-8) In the method, when there is no order record of the user at the second restaurant in the information management system, the first menu items included in the menu information regarding the second restaurant may be arranged in the order according to the taste information associated with the identification information on a basis of the taste information and the menu information regarding the second restaurant.

According to this aspect, when there is no order record of the user at the second restaurant, menu information based on taste information including an order record at the first restaurant is displayed. As a result, even when the user uses for a first time a chain to which the second restaurant belongs, the user can efficiently select foods and drinks that suit his/her taste.

(1-9) In the method, when there is an order record of the user at the second restaurant in the information management system, the first menu items included in the menu information regarding the second restaurant may be arranged in order according to the order record at the second restaurant on a basis of the order record at the second restaurant and the menu information regarding the second restaurant.

When the second restaurant is not a restaurant that the user uses for a first time, it might be more convenient for the user to generate menu information on the basis of an order record at the second restaurant, instead of taste information including an order record at the first restaurant. According to this aspect, when there is an order record of the user at the second restaurant, menu information in which menu items are arranged in order according to the taste information including the order record at the second restaurant is displayed. When the user has used the second restaurant before, therefore, the user can efficiently select foods and drinks that suit his/her taste using the menu information that reflects the order record at the second restaurant.

(1-10) In the method, when a number of order records of the user at the second restaurant is smaller than a certain value in the information management system, the first menu items included in the menu information regarding the second restaurant may be arranged in the order according to the taste information associated with the identification information on a basis of the taste information and the menu information regarding the second restaurant.

When the user is not using the second restaurant for a first time but has not used the second restaurant many times, menu information that sufficiently reflects the user's taste might not be generated if menu information is generated for the user on the basis of the order record at the second restaurant. According to this aspect, when the number of order records at the second restaurant is smaller than a certain value, menu information in which menu items are arranged on the basis of taste information including not only the order record at the second restaurant but also an order record at another restaurant is displayed. It is therefore possible to prevent menu information that does not sufficiently reflect the user's taste from being displayed at the second restaurant.

(1-11) In the method, when the number of order records of the user at the second restaurant is larger than or equal to the certain value in the information management system, the first menu items included in the menu information regarding the second restaurant may be arranged in order according to the order record at the second restaurant on a basis of the order record at the second restaurant and the menu information regarding the second restaurant.

When the user has used the second restaurant a certain number of times or more, it might be more convenient for the user to generate menu information on the basis of order records at the second restaurant, instead of taste information including an order record at the first restaurant. According to this aspect, when the number of order records at the second restaurant is larger than or equal to a certain value, menu information in which menu items are arranged on the basis of the order records at the second restaurant is displayed. When the user has used the second restaurant the certain number of times or more, therefore, the use can efficiently select foods and drinks that suit his/her taste using the menu information that reflects the order records at the second restaurant.

(1-12) In the method, when a latest order record of the user at the second restaurant precedes a certain period of time in the information management system, the first menu items included in the menu information regarding the second restaurant may be arranged in the order according to the taste information associated with the identification information on a basis of the taste information and the menu information regarding the second restaurant.

Even when the user is not using the second restaurant for a first time, the user's taste might have changed when, for example, the user has not used the second restaurant for a long time. In this case, menu information regarding the second restaurant might not be displayed desirably. According to this aspect, menu information that reflects taste information including an order record at the first restaurant is displayed in this case, and the user can efficiently select foods and drinks that suit his/her taste.

(1-13) In the method, when the latest order record of the user at the second restaurant is within the certain period of time in the information management system, the first menu items included in the menu information regarding the second restaurant may be arranged in order according to the order record at the second restaurant on a basis of the order record at the second restaurant and the menu information regarding the second restaurant.

When the user is not using the second restaurant for a first time and a last time that the user has used the second restaurant is not so long ago, it might be more convenient for the user to display menu information that reflects an order record at the second restaurant, instead of taste information based on an order record at the first restaurant. According to this aspect, since the menu information that reflects the order record at the second restaurant is displayed in this case, the user can efficiently select foods and drinks that suit his/her taste.

(1-14) A method for providing information according to another aspect of the present disclosure is a method for providing information in an information management system that manages taste information regarding a user including an order record at a first restaurant and that associates the taste information with identification information for identifying the user, the method including: obtaining positional information regarding a terminal apparatus of the user; providing, on a basis of the positional information, the terminal apparatus with restaurant information indicating one or more restaurants in an area including a position indicated by the positional information; obtaining, from the terminal apparatus, the identification information and a store identifier indicating, among the one or more restaurants, a second restaurant in a chain different from a chain to which the first restaurant belongs; arranging, on a basis of the taste information associated with the identification information and the menu information regarding the second restaurant, first menu items included in the menu information regarding the second restaurant indicated by the store identifier in order according to the taste information associated with the taste information on a basis of the taste information and the menu information, the menu information including the first menu items and second menu items specified by the second restaurant, the menu information being obtained from a server associated with the second restaurant indicated by the store identifier over a network; transmitting, to the terminal apparatus, the menu information including the first menu items arranged in the order and the second menu items, to display the first menu items arranged in the order in a first display area of a display screen of the terminal apparatus and display the second menu items specified by the second restaurant in a second display area of the display screen.

According to this aspect, the information management system manages taste information regarding a user including an order record at a first restaurant while associating the taste information with identification information for identifying the user. Restaurant information indicating one or more restaurants in an area including a position indicated by positional information regarding a terminal apparatus used by the user is presented on the basis of the positional information. A store identifier indicating, among the one or more restaurants, a second restaurant in a chain different from a chain to which the first restaurant belongs is obtained from the terminal apparatus. Menu items included in menu information regarding the second restaurant are then arranged in order according to the taste information regarding the user, and menu information regarding the menu items arranged in the order is displayed on a display screen of the terminal apparatus.

Consequently, the user can preferentially display, in the order according to the taste information, the menu items included in the menu information regarding the second restaurant on the display screen of the terminal apparatus that has a limitation in display area on the basis of the taste information including the order record at the first restaurant, which the user has used before, even when the user uses the second restaurant for a first time.

The user, therefore, can efficiently select foods and drinks that suit his/her taste even when the user uses the second restaurant for the first time, Furthermore, according to this aspect, since the first menu items arranged in the order according to the taste information are displayed in the first display area and the second menu items specified by the second restaurant are displayed in the second display area, menu items that reflect both the user's taste and the specification by the second restaurant can be displayed. Furthermore, menu items to be displayed tend to be fixed if the menu items are displayed only on the basis of the taste information, but since the second restaurant specifies menu items to be displayed, the second menu items include products specified by the second restaurant, for example, thereby diversifying displayed menu items.

(1-15) In the method, when a number of orders at the second restaurant within a set period of time is smaller than or equal to a certain value, the first menu items included in the menu information are arranged in the order according to the taste information on a basis of the taste information and the menu information regarding the second restaurant.

According to this aspect, when the number of orders at the second restaurant is smaller than or equal to a certain value, menu information in which menu items are arranged on the basis of taste information including not only an order record at the second restaurant but also an order record at another restaurant is displayed. It is therefore possible to prevent menu information that does not sufficiently reflects the user's taste from being displayed at the second restaurant.

(1-16) In the method, when a number of orders at the second restaurant within a set period of time is smaller than or equal to a certain value, the first menu items included in the menu information are arranged in the order according to the taste information on a basis of the taste information and the menu information regarding the second restaurant.

(1-17) In the method according to (1-1), the order record at the first restaurant may be stored in the information management system and associated with a store identifier indicating the first restaurant.

According to this aspect, an order record at the first restaurant and a store identifier indicating the first restaurant are stored and associated with each other. By using the store identifier indicating the first restaurant, therefore, the order record at the first restaurant can be easily referred to.

(1-18) In the method according to (1-14), the order record at the first restaurant may be stored in the information management system and associated with a store identifier indicating the first restaurant.

(1-19) In the method according to (1-1), the store identifier may be selected on the terminal apparatus.

According to this aspect, the user can select a store identifier using the terminal apparatus.

(1-20) In the method according to (1-14), the store identifier may be selected on the terminal apparatus.

(2-1) A method according to another aspect of the present disclosure is a method for controlling a terminal apparatus that communicates, over a network, with a first server which manages taste information regarding a user including an order record at a first restaurant and which associates the taste information with identification information for identifying the user, the method including: receiving, through an input device of the terminal apparatus, the identification information and selection of a store identifier indicating a second restaurant in a chain different from a chain to which the first restaurant belongs; obtaining, from the first server, taste information associated with the identification information; obtaining menu information regarding the second restaurant from a second server associated with the second restaurant indicated by the store identifier, the menu information including first menu items and second menu items specified by the second restaurant: arranging, on a basis of the taste information and the menu information regarding the second restaurant, the first menu items included in the menu information in order according to the taste information; and displaying the first menu items arranged in the order in a first display area of a display screen of the terminal apparatus and displaying the second menu items specified by the second restaurant in a second display area of the display screen.

According to this aspect, the same effect as in (1-1) can be produced even in a mode in which a terminal apparatus arranges menu items. Furthermore, according to this aspect, menu information regarding a second restaurant is obtained from the second server, whereas taste information is obtained from the first server. As a result, menu information that takes into consideration taste information regarding a user can be displayed at a second restaurant that the user is using for a first time without giving the taste information to a business operator that has not been authorized by the user.

(2-2) In the method, arrangement of the second menu items in the second display area may be specified by the second restaurant.

(2-3) In the method, when the order according to the taste information is first order, the first menu items may be arranged in the first order and displayed in the first display area, and when the order according to the taste information is second order, which is different from the first order, the first menu items may be arranged in the second order and displayed in the first display area. The second menu items may be displayed in the second display area in a same mode regardless of whether the order according to the taste information is the first order or the second order.

(2-4) In the method, the second restaurant may include a coffee shop in a chain different from the chain to which the first restaurant belongs.

(2-5) In the method, the second restaurant may include a hamburger shop in a chain different from the chain to which the first restaurant belongs.

(2-6) The method may further include outputting, over the network, positional information regarding the terminal apparatus used by the user to a third server, which manages information relating to the first and second restaurants and obtaining, from the third server on a basis of the positional information, restaurant information indicating one or more restaurants in an area including a position indicated by the positional information. The selection of the store identifier may be received on a basis of the restaurant information.

(2-7) In the method, the positional information regarding the terminal apparatus used by the user may be obtained using a global positioning system.

(2-8) The method may further include obtaining, from the first server, order record information indicating an order record of the user at the second restaurant. When there is no order record of the user at the second restaurant, the first menu items included in the menu information regarding the second restaurant may be arranged in the order according to the taste information on a basis of the taste information and the menu information regarding the second restaurant.

(2-9) In the method, when there is an order record of the user at the second restaurant, the first menu items included in the menu information regarding the second restaurant may be arranged in order according to the order record at the second restaurant on a basis of the order record at the second restaurant and the menu information regarding the second restaurant.

(2-10) The method may further include obtaining order record information indicating order records of the user at the second restaurant from the first server. When a number of order records of the user at the second restaurant is smaller than a certain value, the first menu items included in the menu information regarding the second restaurant may be arranged in the order according to the taste information on a basis of the taste information and the menu information regarding the second restaurant.

(2-11) In the method, when the number of order records of the user at the second restaurant is larger than or equal to the certain value, the first menu items included in the menu information regarding the second restaurant may be arranged in order according to the order record at the second restaurant on a basis of the order record at the second restaurant and the menu information regarding the second restaurant.

(2-12) The method may further include obtaining order record information indicating order records of the user at the second restaurant from the first server. When a latest order record of the user at the second restaurant precedes a certain period of time, the first menu items included in the menu information regarding the second restaurant may be arranged in the order according to the taste information associated with the identification information on a basis of the taste information and the menu information regarding the second restaurant.

(2-13) In the method, when the latest order record of the user at the second restaurant is within the certain period of time, the first menu items included in the menu information regarding the second restaurant may be arranged in order according to the order record at the second restaurant on a basis of the order record at the second restaurant and the menu information regarding the second restaurant.

(2-14) The method may further include obtaining order record information indicating order records of the user at the second restaurant from the first server. When a number of orders at the second restaurant within a set period of time is smaller than or equal to a certain value, the first menu items included in the menu information may be arranged in the order according to the taste information on a basis of the taste information and the menu information regarding the second restaurant.

(2-15) In the method, the order record at the first restaurant and a store identifier indicating the first restaurant may be stored in the first server and associated with each other.

(2-16) A terminal apparatus according to another aspect of the present disclosure performs the method according to any of (2-1) to (2-15).

(2-17) A program according to another aspect of the present disclosure causes a computer of a terminal apparatus to perform the method according to any of (2-1) to (2-15).

(2-18) In the program, the identification information for identifying the user may include a serial code of each of information terminals provided for the program.

According to this aspect, since the serial code of each of the information terminals provided for the program is used as identification information, character string information that seems meaningless to humans can be set as identification information, and personal information can be communicated with greater confidentiality.

(2-19) A storage medium according to another aspect of the present disclosure stores a program for causing a computer of a terminal apparatus to perform the method according to any of (2-1) to (2-15).

(3-1) A method for providing information according to another aspect of the present disclosure is a method for providing information in an information management system including a second server that communicates with a first server which manages taste information regarding a user including an order record at a first restaurant and which associates the taste information with identification information for identifying the user, the second server being associated with a second restaurant in a chain different from a chain to which the first restaurant belongs, the method including: obtaining, from a terminal apparatus, the identification information and a store identifier indicating the second restaurant; obtaining the taste information associated with the identification information from the first server, when the first server determines that there is permission from the user identified by the identification information; arranging first menu items included in menu information regarding the second restaurant in order according to the taste information on the basis of the taste information and the menu information, the menu information including the first menu items and second menu items specified by the second restaurant, the menu information being held in the second server; and transmitting, to the terminal apparatus, the menu information including the first menu items arranged in the order and the second menu items, to display the first menu items arranged in the order in a first display area of a display screen of the terminal apparatus and display the second menu items specified by the second restaurant in a second display area of the display screen.

According to this aspect, the same effect as in (1-1) can be produced even in a mode in which the second server arranges menu items.

(3-2) In the method, arrangement of the second menu items in the second display area may be specified by the second restaurant.

(3-3) In the method, when the order according to the taste information is first order, the first menu items may be arranged in the first order and displayed in the first display area, and when the order according to the taste information is second order, which is different from the first order, the first menu items may be arranged in the second order and displayed in the first display area. The second menu items may be displayed in the second display area in a same mode regardless of whether the order according to the taste information is the first order or the second order.

(3-4) In the method, the second restaurant may include a coffee shop in a chain different from the chain to which the first restaurant belongs.

(3-5) In the method, the second restaurant may include a hamburger shop in a chain different from the chain to which the first restaurant belongs.

(3-6) In the method, when there is no order record of the user at the second restaurant in the information management system, the first menu items included in the menu information regarding the second restaurant may be arranged in the order according to the taste information on a basis of the taste information and the menu information regarding the second restaurant.

(3-7) In the method, when there is an order record of the user at the second restaurant in the information management system, the first menu items included in the menu information regarding the second restaurant may be arranged in order according to the order record at the second restaurant on the basis of the order record at the second restaurant and the menu information regarding the second restaurant.

(3-8) In the method, when a number of order records of the user at the second restaurant is smaller than a certain value in the information management system, the first menu items included in the menu information regarding the second restaurant may be arranged in the order according to the taste information on a basis of the taste information and the menu information regarding the second restaurant.

(3-9) In the method, when the number of order records of the user at the second restaurant is larger than or equal to the certain value in the information management system, the first menu items included in the menu information regarding the second restaurant may be arranged in order according to the order record at the second restaurant on a basis of the order record at the second restaurant and the menu information regarding the second restaurant.

(3-10) In the method, when a latest order record of the user at the second restaurant precedes a certain period of time in the information management system, the first menu items included in the menu information regarding the second restaurant may be arranged in the order according to the taste information associated with the identification information on a basis of the taste information and the menu information regarding the second restaurant.

(3-11) In the method, when the latest order record of the user at the second restaurant is within the certain period of time in the information management system, the first menu items included in the menu information regarding the second restaurant may be arranged in order according to the order record at the second restaurant on a basis of the order record at the second restaurant and the menu information regarding the second restaurant.

(3-12) In the method, when a number of orders at the second restaurant within a set period of time is smaller than or equal to a certain value, the first menu items included in the menu information may be arranged in the order according to the taste information on a basis of the taste information and the menu information regarding the second restaurant.

(3-13) In the method, the order record at the first restaurant and a store identifier indicating the first restaurant may be stored in the first server and associated with each other.

(3-14) In the method, the store identifier may be selected on the terminal apparatus.

First Embodiment

It is expected that the Internet will continue to spread in our society and various sensors will become more familiar to us. As a result, it is expected that information regarding persons' conditions and activities, as well as information regarding entire cities, including buildings and transportation networks, will be digitized and become available in computer systems. Digitized data regarding persons (personal information) will be accumulated in the cloud via communication networks, managed, as big data, by information banks that have a mechanism for enabling third parties to access the data with the person's permission, and used for various purposes for individuals and society.

Such a highly information-oriented society is called "Society 5.0" in Japan. The highly information-oriented society is a society where economic development and solutions to social issues are expected through an information infrastructure (cyber-physical system) that highly integrates real space (physical space) and virtual space (cyber space).

When a person makes decisions in such a highly information-oriented society in various daily situations, the person can analyze the big data including the accumulated personal information and identify possible optimal options therefor according to the situation at the time.

In the following description, modes for achieving economic efficiency and personalization in a highly information-oriented society where such a cyber-physical system operates will be described with a theme of personal meals.

In Society 5.0, servers of business operators, which are called "information banks", singlehandedly manage personal information such as taste information indicating a user's taste by encrypting and concealing the personal information so that the personal information becomes inaccessible by third parties without the user's permission. Most of the personal information does not require the user's conscious input operation, and is continuously collected and updated from time to time under the management of the information banks.

An example of a personalized ordering system for foods and drinks transmits menu information from a restaurant server to a person's information terminal and presents a menu including foods and drinks that suit the user's taste on the information terminal as a recommended menu.

FIG. 1 is a diagram illustrating an example of the entirety of an information provision system in the present disclosure.

The information provision system illustrated in FIG. 1 is a system configured on the basis of Society 5.0 and provides a user, who is a consumer whose personal information is used, with a selection support service for supporting selection of a product or a service by presenting products or services suitable for the user. In a first embodiment, a service that supports ordering of foods and drinks will be described as the selection support service. More specifically, the information provision system presents an optimal menu to a user by matching menu information viewed by the user to order foods and drinks when eating out with personal information regarding the user.

The information provision system includes three apparatus groups. A first apparatus group includes an information terminal 100 (an example of a terminal apparatus) owned by the user, such as a smartphone. A matching application is installed on the information terminal 100. The matching application (hereinafter referred to as a "matching app") selects or recommends products or services suitable for a user using personal information regarding the user. Personal information herein broadly includes public or non-public information regarding a person. For example, personal information includes a name, a date of birth, an address, annual income, movables and immovables, physical information such as height and weight, genetic information, allergy information, medical information such as medical history and diagnosis charts, activity information such as the number of steps and calories burned, meal record information, vital sign information such as heartbeat and blood pressure, purchase information via stores and electronic commerce (EC) websites, word information regarding words used in searches using web search engines and artificial intelligence (AI) speakers, information regarding text and images sent and received by mail and social networking services (SNSs), movement record information, and/or the like. The information terminal 100 can be connected to the Internet via a mobile base station 400 by, for example, a mobile communication network called "4G" or "5G".

A second apparatus group includes a first server 200.

The first server 200 is a personal information server that stores personal information regarding the user while splitting the personal information between different locations and encrypting the split personal information. For example, the first server 200 manages the personal information regarding the user by storing the personal information in different storage devices on the cloud while fragmenting and encrypting the personal information. As a result, high security is ensured, and leakage of the personal information is prevented. The first server 200 also has a function of returning necessary data in response to an inquiry from a third party with the user's permission. Furthermore, the first server 200 has a function of securely sharing personal information selected by the user to a business operator authorized by the user. That is, the first server 200 has a function as an information bank. In this case, for example, the first server 200 stores a piece of data while splitting the piece of data between different storage devices. An example of the piece of data is a file containing personal information.

In the present embodiment, the first server 200 causes a specific business operator to share specific personal information with the user's permission. The first server 200 also has a function for providing the selection support service, which will be described later.

The matching app described above is developed and/or distributed by, for example, a company that manages the first server 200. The company evaluates, using personal information regarding the user, a degree of suitability of the user to products or services that might be used by the user. The company that manages the first server 200, a company that develops the matching app, and a company that distributes the matching app may be the same as or different from one another. The information provision system illustrated in FIG. 1 achieves the selection support service using the above-described matching app, but this is just an example. For example, the selection support service may be achieved using an application other than the matching app, a common browser, or the like, instead. In order to handle the personal information regarding the user securely, it is preferable to provide the selection support service using a dedicated application such as the matching app. This, however, is just an example, and when personal information whose degree of security importance is low, such as publicly available personal information, is handled, or when a function for ensuring security, such as hypertext transfer protocol secure (HTTPS) communication, is provided using an Internet browser, the selection support service may be provided by means other than the matching application.

The matching app handles personal information only inside the information terminal 100. The matching app presents the user with products or services that are estimated to be most suitable for the user under conditions such as a time, a place, and a situation. For example, the matching app provides a mediation function in economic activities such as purchase by the user.

The matching app opens up a recommendation function, which has been isolated to each service provider. For example, an example of a service provider famous in an EC market such as EC websites will be described. A large number of products are listed on the service provider's website. When a user searches for or purchases a particular product, other products that are highly relevant to that product (e.g., products that are often purchased together) are recommended to the user. The recommendation function for such purchase is effective only on the EC website of the service provider. The recommendation function, therefore, has no effect when the user purchases products on EC websites operated by other service providers, when the user orders meals at restaurants, or when the user plans family vacations.

It is expected in the future that personal information will be aggregated in information banks and a mechanism will be established in which anyone can access, under certain conditions, an enormous amount of a wide variety of accurate personal information obtained over a long period of time. In this case, a degree of suitability can be estimated, on the basis of searches or purchase histories on an EC website of a service provider and personal information regarding various users, for not only a product of the service provider but also any product or service. This makes it possible to recommend products or services that are more valuable to a user from among various options.

The first server 200 assumed in the present embodiment is a cloud server that, in order to achieve the above idea or function, stores personal information in different storage devices while splitting and encrypting the personal information and manages and controls access to the personal information from the outside.

A third apparatus group includes second servers 300 in which business operators manage data unique thereto. Each of the business operators owns or rents one of the second servers 300 and manages and/or provides information regarding products and/or services thereof. In the present embodiment, the business operators are companies that operate chain stores. In the example illustrated in FIG. 1, three second servers 300 are operated by restaurant chains A to C, respectively. Restaurant chain A is, for example, chain stores managed by company A, restaurant chain B is, for example, chain stores managed by company B, and restaurant chain C is, for example, chain stores managed by company C. Chain stores refer to a management form in which a large number of stores are operated and managed with a brand, a management policy, services, appearance, and the like given a sense of unity. Restaurants deployed as chain stores include family restaurants, coffee shops, and hamburger shops. The business operators may be ready-to-eat meal companies where customers can take out cooked food, such as lunch vendors and fast-food restaurants. Alternatively, the business operators may be business operators that sell foodstuffs for home cooking, such as supermarkets. The second servers 300 are, for example, cloud servers.

Although different companies manage restaurant chains A to C in the example illustrated in FIG. 1, this is just an example. The same company may manage restaurant chains A to C, instead. In addition, although there are three second servers 300 in the example illustrated in FIG. 1, this is just an example. There may be one, two, or four or more second servers 300, instead.

One of advantageous effects produced by the information provision system according to the present embodiment is that personal information is not given to business operators without the user's permission. This is because the first server 200, which has the function of an information bank, is configured to share specific pieces of information to only specific business operators with the user's permission.

It is troublesome, however, to let each of users determine how to operate personal information regarding the user. Even if there is a trust company that sets a data operation policy, it is difficult for the users to understand which pieces of data have been given and who has received the pieces of information, which can make the users feel uneasy.

In the present embodiment, therefore, the business operator that operates the first server 200 may be inhibited or restricted from using, that is, decrypting and interpreting, for example, the stored personal information without the user's permission.

Furthermore, when an information bank or an information intermediary that manages personal information and provides the matching app enters a market under an operation policy strict about privacy, the user may make a contract with the information bank or the information intermediary in order to receive the service. This makes it possible to prevent personal information from being given to a business operator without the user's permission.

The information provision system according to the present embodiment is a mode of an operation system in a next-generation information society that reduces a possibility that personal information including sensitive information will be known to a third party and that can use, with personal permission, an enormous amount of personal information which changes from moment to moment for matching with various services. The information provision system will be described hereinafter on this assumption.

The information provision system illustrated in FIG. 1 further includes a biological sensor 600 and a public information server 500.

The public information server 500 manages public information different from information regarding restaurants and personal information. The public information server 500 is connected to the Internet. For example, the public information includes map information, weather information, and traffic information. These pieces of information are used if necessary for matching.

The biological sensor 600 is a smartwatch or the like. The biological sensor 600 is worn by the user who owns the information terminal 100. The biological sensor 600 continuously measures vital sign information and/or activity information regarding the user. The biological sensor 600 transmits the vital sign information and/or the activity information measured thereby to the information terminal 100 through short-distance communication such as Bluetooth (registered trademark). The vital sign information and/or the activity information are stored and/or managed by a sensor app installed on the information terminal 100. The sensor app uploads, to the first server 200 in accordance with user account information, the collected vital sign information and/or activity information and time information indicating times at which the vital sign information and/or the activity information have been measured. The vital sign information and/or the activity information are thus accumulated.

The sensor app may give rights to access the stored and/or managed data to the matching app or an operating system (OS) of the information terminal 100. In this case, the vital sign information and/or the activity information are uploaded to the first server 200 via the matching app or the OS. The sensor app may store the vital sign information and/or the activity information in a memory of the information terminal 100 or by uploading the vital sign information and/or the activity information to the first server 200.

Figure 2:
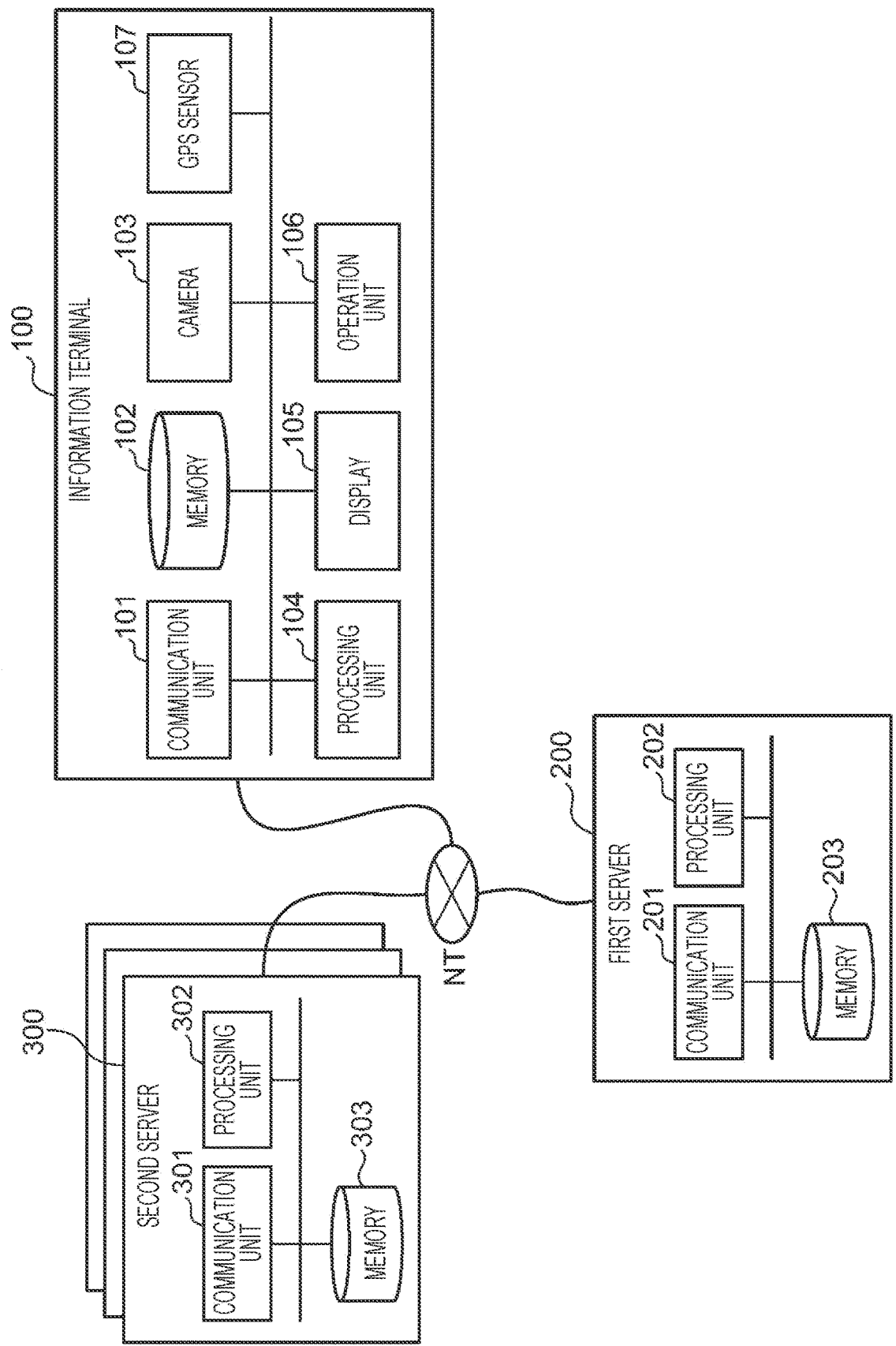
FIG. 2 is a diagram illustrating an example of a specific configuration of the information provision system according to a first embodiment.

FIG. 2 is a diagram illustrating an example of a specific configuration of the information provision system according to the present embodiment. The information provision system illustrated in FIG. 2 includes the information terminal 100, the first server 200, and the second servers 300 described with reference to FIG. 1. FIG. 2 does not illustrate the mobile base station 400 and the biological sensor 600 for convenience of description. The information terminal 100, the first server 200, and the second servers 300 are communicably connected to one another over a network NT. The network NT is a wide-area communication network including a mobile phone communication network and the Internet.

The information terminal 100 is achieved by a mobile information processing apparatus such as a smartphone or a tablet terminal. In the present embodiment, the information terminal 100 is carried by a user who orders foods and drinks at stores in restaurant chains. The information terminal 100 includes a communication unit 101, a memory 102, a camera 103, a processing unit 104, a display 105, an operation unit 106, and a global positioning system (GPS) sensor 107.

The communication unit 101 is achieved by a communication circuit that connects the information terminal 100 to the network NT. The communication unit 101 transmits, to the first server 200, a store identifier (ID) of a second restaurant in a chain different from one to which a first restaurant belongs while associating the store ID with identification information regarding the user, the first restaurant having been selected by the user using the operation unit 106. The first restaurant belongs to a restaurant chain that the user frequently uses. The second restaurant belongs to a restaurant chain different from the one to which the first restaurant belongs.

The communication unit 101 receives menu information, which will be described later, transmitted from one of the second servers 300. The processing unit 104 displays the menu information received by the communication unit 101 on the display 105. The communication unit 101 transmits, under the control of the processing unit 104, order information indicating foods and drinks ordered by the user to the second server 300. The memory 102 is achieved by a non-transitory storage device such as a flash memory. The communication unit 101 receives surrounding map information, which is map information regarding a surrounding area of a position of the information terminal 100 detected by the GPS sensor 107. The surrounding map information is displayed on the display 105.

The memory 102 stores, in advance, identification information for identifying the user.

The camera 103 is an imaging device achieved by a complementary metal-oxide-semiconductor (CMOS) sensor or the like. The camera 103 is used to capture an image of the user's face, for example, for face recognition.

The processing unit 104 is achieved by a processor such as a CPU. The processing unit 104 executes the OS of the information terminal 100, the matching app, a browser, and the like. The GPS sensor 107 detects the position of the information terminal 100 on the basis of a signal from a GPS satellite.

The display 105 is achieved by a liquid crystal display panel, an organic electroluminescent (EL) panel, or the like and displays various images. For example, the display 105 displays the menu information. The display 105 also displays the surrounding map information.

The operation unit 106 is achieved by an input device such as a touch panel. The operation unit 106 receives an operation performed by the user to select, among restaurants displayed in the surrounding map information, a restaurant that the user desires to visit. The operation unit 106 receives an instruction to select foods and drinks desired by the user in the menu information.

The configuration of the information terminal 100 has been described.

Next, the configuration of the first server 200 will be described. The first server 200 includes a communication unit 201, a processing unit 202, and a memory 203. The communication unit 201 is achieved by a communication circuit for connecting the first server 200 to the network NT. The communication unit 201 receives, from the information terminal 100, identification information for identifying the user of the information terminal 100 and a store ID indicating a second restaurant in a restaurant chain different from one to which a first restaurant belongs. The store ID is identification information regarding a store selected by the user who operates the information terminal 100. The communication unit 201 transmits individual menu information, which will be described later, generated by the processing unit 202 to the information terminal 100 owned by the user who has selected the second restaurant.

The processing unit 202 is achieved by a processor such as a CPU. The processing unit 202 processes personal information regarding the user stored in the memory 203.

The processing unit 202 provides the information terminal 100 with store information indicating one or more restaurants around the information terminal 100 owned by the user who has selected a second restaurant. The user of the information terminal 100 selects a second restaurant in the provided store information. The information terminal 100 transmits, to the first server 200, a store ID of the second restaurant selected by the user and the identification information regarding the user.

The processing unit 202 extracts, from the memory 203, taste information associated with the identification information regarding the user transmitted from the information terminal 100 and associated with the store ID. The processing unit 202 generates, on the basis of the extracted taste information and menu information regarding the second restaurant indicated by the store ID, individual menu information, which is menu information in which menu items are arranged in order according to the taste information. The individual menu information is displayed on the display 105 of the information terminal 100 owned by the user who has selected the second restaurant. The menu information regarding the second restaurant is standard menu information generated for a general customer in a restaurant chain to which the second restaurant belongs. In the standard menu information, menu items are arranged in certain order determined by the restaurant chain to which the second restaurant belongs. The menu items refer to foods and drinks served at the second restaurant.

If there are no order records, at the second restaurant, of the user who has selected the second restaurant, the processing unit 202 generates, on the basis of the taste information extracted from the memory 203 and the standard menu information, individual menu information in which the menu items included in the standard menu information are arranged in order according to the taste information. As a result, the user can efficiently select foods and drinks that suit his/her taste even when the user uses for a first time the restaurant chain to which the second restaurant belongs.

If there are order records, at the second restaurant, of the user who has selected the second restaurant, on the other hand, the processing unit 202 generates, on the basis of the order records at the second restaurant and the standard menu information regarding the second restaurant, individual menu information in which the menu items included in the standard menu information regarding the second restaurant are arranged in order according to the order records at the second restaurant. As a result, if the user has used the second restaurant before, the user can efficiently select foods and drinks that suit the user's taste using the individual menu information that reflects the order records at the second restaurant.

When the number of order records, at the second restaurant, of the user who has selected the second restaurant is smaller than a certain value, the processing unit 202 may generate, on the basis of the taste information associated with the identification information regarding the user and the standard menu information regarding the second restaurant, individual menu information in which the menu items included in the standard menu information regarding the second restaurant are arranged in the order according to the taste information.

In this case, when the number of order records, at the second restaurant, of the user who has selected the second restaurant is larger than or equal to the certain value, the processing unit 202 may generate, on the basis of the order records at the second restaurant and the standard menu information regarding the second restaurant, individual menu information in which the menu items included in the standard menu information regarding the second restaurant are arranged in order according to the order records at the second restaurant.

Furthermore, when a latest order record placed at the second restaurant by the user who has selected the second restaurant precedes a certain period, the processing unit 202 may generate, on the basis of the taste information associated with the identification information regarding the user and the standard menu information regarding the second restaurant, individual menu information in which the menu items included in the standard menu information regarding the second restaurant are arranged in the order according to the taste information.

It is assumed, for example, that the communication unit 201 has received a signal for requesting obtaining of personal information regarding an authorized user. The authorized user refers to a user directly permitted to read personal information stored in the first server 200 or a user indirectly permitted by trusted third party to read the personal information, the personal information having been requested by the information terminal 100 or one of the second servers 300. In this case, the processing unit 202 reads, in response to the request from the information terminal 100 or the second server 300, personal information regarding the authorized user stored in the memory 203 and causes the communication unit 201 to transmit the personal information. The personal information to be read may be the entirety of managed personal information or a part of the managed personal information relating to certain requested items (only a part of the personal information).

The memory 203 is achieved by nonvolatile storage devices such as hard disk drives. The memory 203 stores personal information regarding one or more users. The personal information includes taste information regarding the users. The taste information indicates each user's taste for foods and drinks. The taste information may include order records, purchase records, search records, taste prediction values (taste prediction information based on collaborative filtering or the like), and the like of each user for foods and drinks. In the present embodiment, the taste information will also be simply referred to as order records. The taste information (order records) is managed in an order record database D2 illustrated in FIG. 12 generated for each of the users and stored in the memory 203.

Activity record information indicates activity records of the users. Personal information is stored in the storage devices while being split and encrypted. The personal information stored in the memory 203 may include biological information, purchase record information, and the activity record information as well as the taste information. The biological information is information relating to each user's body, such as heart rate. The purchase record information indicates each user's records of purchasing products (articles) or services. The activity record information is, for example, time series data in which positional information regarding each user and time information are associated with each other.

Next, the configuration of each of the second servers 300 will be described. There are one or more second servers 300 for each restaurant chain. Each of the second servers 300 includes a communication unit 301, a processing unit 302, and a memory 303. The communication unit 301 is achieved by a communication circuit for connecting the second server 300 to the network NT. The communication unit 301 transmits standard menu information to the first server 200 in response to a request from the information terminal 100. The processing unit 302 is achieved by a processor such as a CPU. The processing unit 302 processes standard menu information stored in the memory 303. The memory 303 is achieved by a nonvolatile storage device such as a hard disk drive. The memory 303 stores the standard menu information.

Ordering for Foods and Drinks Based on Individual Menu Information

Figure 3:
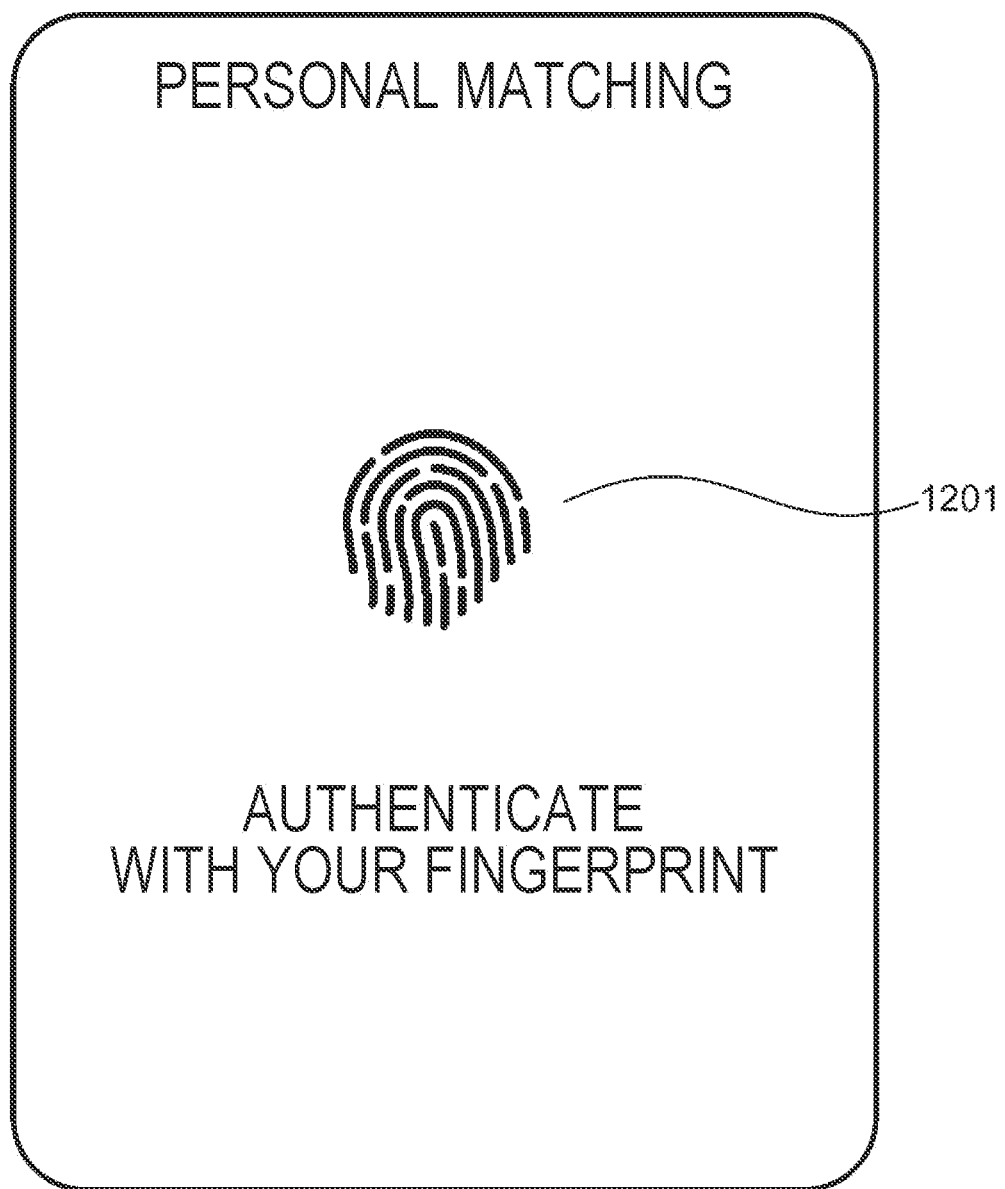
FIG. 3 is a diagram illustrating an example of an authentication screen displayed on an information terminal immediately after a user who is to order foods and drinks activates a matching app.

Ordering for foods and drinks based on individual menu information starts when the matching app is activated. FIG. 3 is a diagram illustrating an example of an authentication screen G1 displayed on the information terminal 100 immediately after the user who is to order foods and drinks activates the matching app. The authentication screen G1 is a screen on which the user is authenticated through fingerprint recognition. A fingerprint image 1201 schematically indicating a fingerprint is displayed at the center of the authentication screen G1, and a message, "Authenticate with your fingerprint", is displayed under the fingerprint image 1201. The authentication screen G1 thus prompts the user to perform fingerprint recognition. "Personal matching" is displayed at a top of the authentication screen G1. The user can thus understand that the authentication screen G1 is a screen of the matching app. This holds true for FIGS. 4 and 5, which will be referred to later.

Figure 4:
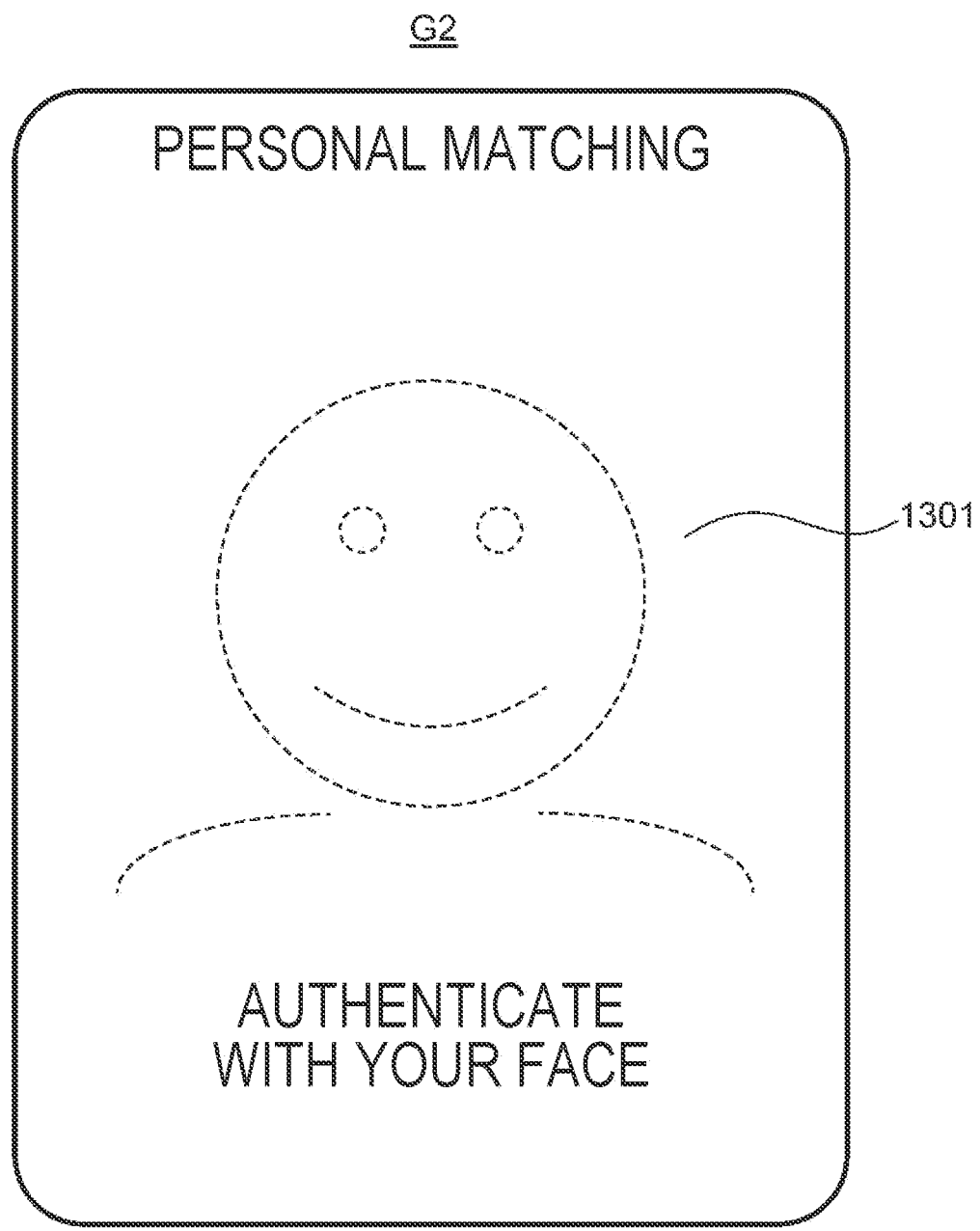
FIG. 4 is a diagram illustrating an authentication screen in another example.

FIG. 4 is a diagram illustrating an authentication screen G2 in another example. The authentication screen G2 is an example of a screen for authenticating the user through face recognition. Broken lines 1301 schematically indicating a contour of a face are displayed at the center of the authentication screen G2 so that the information terminal 100 can capture an image of the user's face from the front in an appropriate size. The user adjusts a direction and a position of the information terminal 100 such that the user's face from the front fits into the broken lines 1301.

If there is a method for authenticating the user by which necessary authentication accuracy can be achieved with a smaller burden on the user than the above methods for authenticating the user, the method may be employed, instead. As a method for authenticating the user, two-step authentication, which is generally said to have high security strength, may be employed, or a method in which a user ID and a password are input may be employed, instead.

Figure 5:
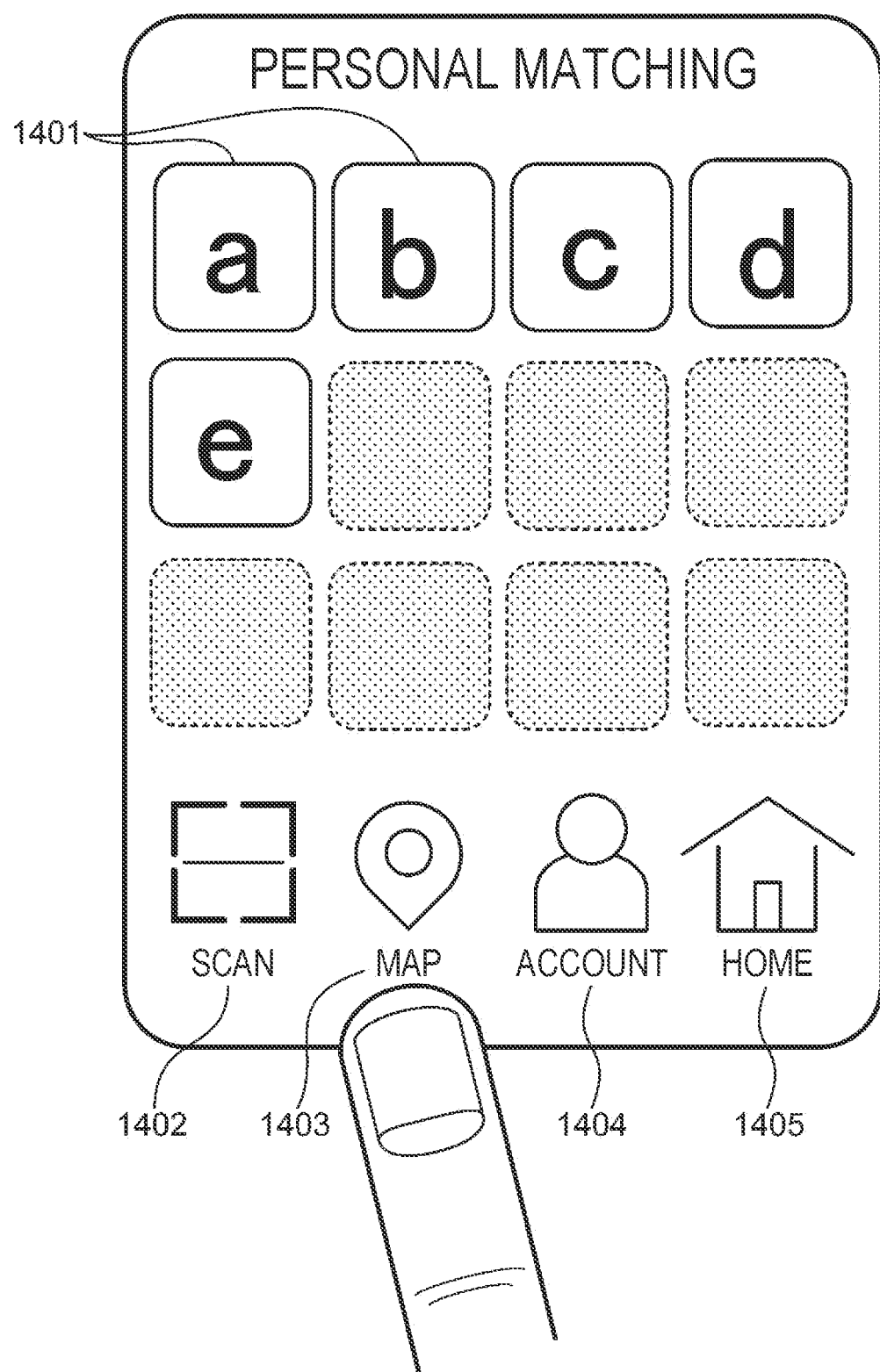
FIG. 5 is a diagram illustrating an example of a home screen displayed immediately after the user is authenticated for the matching app.

FIG. 5 is a diagram illustrating an example of a home screen G3 displayed immediately after the user is authenticated for the matching app. An app name "personal matching" is displayed at a top of the home screen G3, and tile objects 1401 are arranged in a middle in a matrix. The tile objects 1401 are associated with association functions or other applications incorporated into the matching app. The other applications are, for example, applications activated in the matching app. In this example, five tile objects 1401 indicated by a, b, c, d, and e are displayed. These tile objects 1401 are associated with dedicated functions (e.g., applications of certain restaurants available in the matching app) for matching with products or services of various business operators in association with the matching app. The user can thus use the five association functions indicated by a, b, c, d, and e. Grayed-out tile objects 1401 are vacant tile objects for which no association function has been installed. A scan button 1402, a map button 1403, an account button 1404, and a home button 1405 are displayed at a bottom of the home screen G3 from the left. These four buttons are fixed buttons provided for all users. The scan button 1402 is used to read a quick response (QR) code (registered trademark), a near-field communication (NFC) tag, a radio-frequency identification (RFID) tag, or the like associated with a service provided by a business operator such as a restaurant. The map button 1403 is used to display a map screen including store information regarding stores that are located around the current position of the information terminal 100 and that have registered with the matching app and/or information regarding products or services provided at the stores. The account button 1404 is used to register and edit account information regarding the user. The registration and editing of the account information include, for example, settings for personal authentication and settings for the association functions with the first server 200. The home button 1405 is used to return to the home screen G3.

As described above, the tile objects 1401 indicating the dedicated functions for associating with services provided by other business operators through the matching app are arranged in the middle of the home screen G3. The user can display, remove, or move these tile objects 1401 as desired. The user, therefore, can obtain, among products and/or services provided by a large number of business operators (e.g., appliance stores, digital versatile disc (DVD) and Blu-ray disc (registered trademark) rental stores, bookstores, coffee shops, taxis, etc.), products and/or services suitable for the user on the basis of personal information using a matching app.

Figure 6:
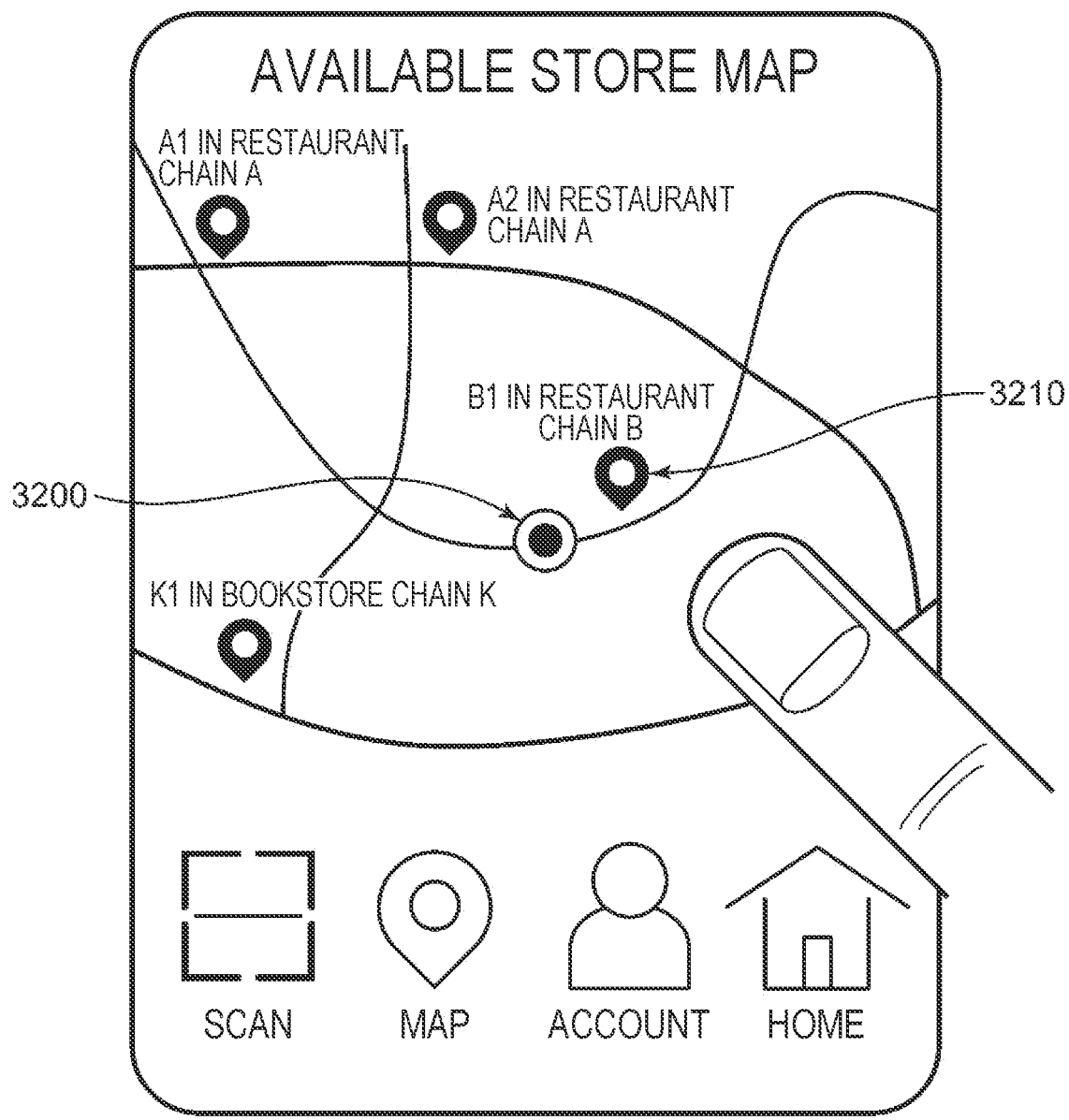
FIG. 6 is a diagram illustrating an example of a map screen displayed on the information terminal.

FIG. 6 is a diagram illustrating an example of a map screen G4 displayed on the information terminal 100. The map screen G4 is displayed when the user selects the map button 1403 in the home screen G3. The map screen G4 includes a map of an area including the current position of the information terminal 100. Store information in the area available in the matching app is also displayed in the map screen G4. Here, an icon 3200 indicating a current position of the user, stores A1 and A2 in restaurant chain A, store K1 in bookstore chain K, and store B1 in restaurant chain B are displayed.

The user selects a store to visit on the map screen G4. In this example, the user selects store B1, which is indicated by an icon 3210, in restaurant chain B closest to the current position thereof. The user touches the icon 3210, for example, to select store B1 in restaurant chain B. The user touches the icon 3210, and the matching app obtains connection information regarding store B1 in restaurant chain B indicated by the icon 3210 and a store ID of store B1. The matching app also obtains the identification information (user ID) regarding the user from the memory 102. As described later with reference to FIG. 18, the user ID is stored in a "user_account.xml" file under an "account" directory of the information terminal 100. The connection information is, for example, address information (e.g., a URL) for communicating with the second server 300 for restaurant chain B.

The matching app obtains individual menu information for the user on the basis of the obtained store ID and user ID in cooperation with the first server 200 and the second server 300 for restaurant chain B.

More specifically, the matching app transmits, to the first server 200, a request to obtain an individual menu including the store ID and the user ID. Upon receiving the request, the first server 200 transmits, to the second server 300 for restaurant chain B on the basis of the store ID, a request to obtain standard menu information regarding a standard menu that can be provided by store B1. Upon receiving the request, the second server 300 transmits the standard menu information regarding restaurant chain B to the first server 200. The standard menu information is stored in a "ResB.html" file and a "ResB.css" file of the second server 300, which will be described later with reference to FIG. 18.

Upon receiving the standard menu information regarding restaurant chain B, the first server 200 obtains, from the memory 203, order records of the user at restaurant chain B in order to optimize the obtained standard menu information for the user corresponding to the user ID. It is assumed here that the memory 203 does not store order records of the user at restaurant chain B.

In this case, for example, the first server 200 obtains, from the memory 203, order records of the user at another restaurant chain. The first server 200 then changes order of display of foods and drinks in the standard menu of restaurant chain B such that foods and drinks ordered more by the user in the order records at the other restaurant are displayed earlier. It is assumed, for example, that the user has frequently ordered "caffe mocha" at another restaurant. In this case, the first server 200 displays "caffe mocha" earlier in the individual menu information regarding restaurant chain B so that the user can easily order "caffe mocha". Furthermore, in this case, the first server 200 may change a mode in which "caffe mocha" is displayed from a default mode so that the user can easily find "caffe mocha" on the basis of the size and/or color of letters "caffe mocha".

The first server 200 transmits the individual menu information regarding restaurant chain B generated in the above manner to the information terminal 100.

Figure 7:
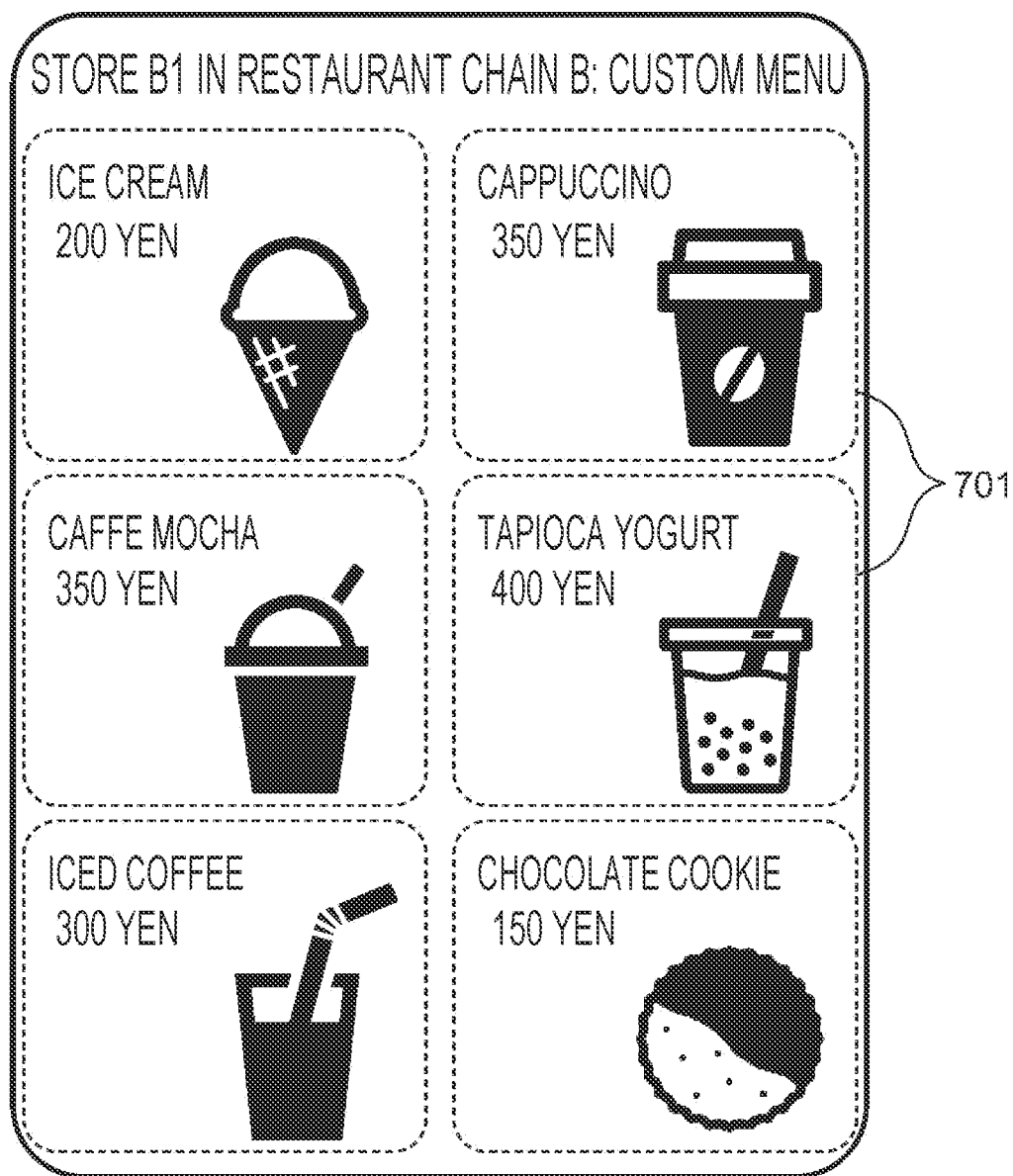
FIG. 7 is a diagram illustrating an individual menu screen, which is an example of a display screen for individual menu information displayed on the information terminal.

FIG. 7 is a diagram illustrating an individual menu screen G5, which is an example of a display screen for individual menu information displayed on the information terminal 100. The individual menu screen G5 is an individual menu screen for restaurant chain B selected by the user on the map screen G4. "Restaurant chain B store B1 custom menu" is displayed at a top of the individual menu screen G5. This means that a menu in the individual menu screen G5 is a menu personalized in consideration of the standard menu information regarding restaurant chain B to which store B1 selected by the user belongs and the order records of the user stored in the memory 203.

In this example, the memory 203 does not store order records of the user at restaurant chain B but stores order records of the user at another restaurant chain. The order records of the user at the other restaurant chain indicate that the user has ordered ice cream, cappuccino, caffe mocha, tapioca yogurt, iced coffee, and a chocolate cookie more in this order. In the individual menu screen G5, therefore, tile objects 701 indicating the foods and the drinks are arranged in this order.

Since foods and drinks that suit the user's taste are displayed at such positions that the user can easily order the foods and the drinks, the user can efficiently select foods and drinks that suit his/her taste. In the example illustrated in FIG. 7, priority of display of the tile objects 701 is the highest at an upper-left position and the lowest at a lower-right position. This, however, is just an example, and priority of display may be the highest at an upper-right position and the lowest at a lower-left position, instead.

Although the tile objects 701 are displayed in a matrix of three rows and two columns in the example illustrated in FIG. 7, this is just an example. The tile objects 701 may be displayed in a matrix of three rows and one column or four rows and two columns, instead. Furthermore, in the example illustrated in FIG. 7, tile objects 701 indicating foods and drinks that are not displayed in an initial screen can be displayed through scrolling. The initial screen refers to a screen displayed first when the individual menu screen G5 is displayed.

Alternatively, design of the individual menu screen G5 with which the user can easily order foods and drinks may be as follows. For example, tile objects 701 indicating foods and drinks ordered most may be displayed in the initial screen of the individual menu screen G5, for example, and, in the initial screen, tile objects 701 indicating foods and drinks ordered most may be arranged at the center. After the tile objects 701 are arranged in such a manner, tile objects 701 indicating foods and drinks ordered most may be displayed larger, in a different color, with a different thickness of boundary lines, and/or with item names, prices, and/or item images decorated.

Figure 8:
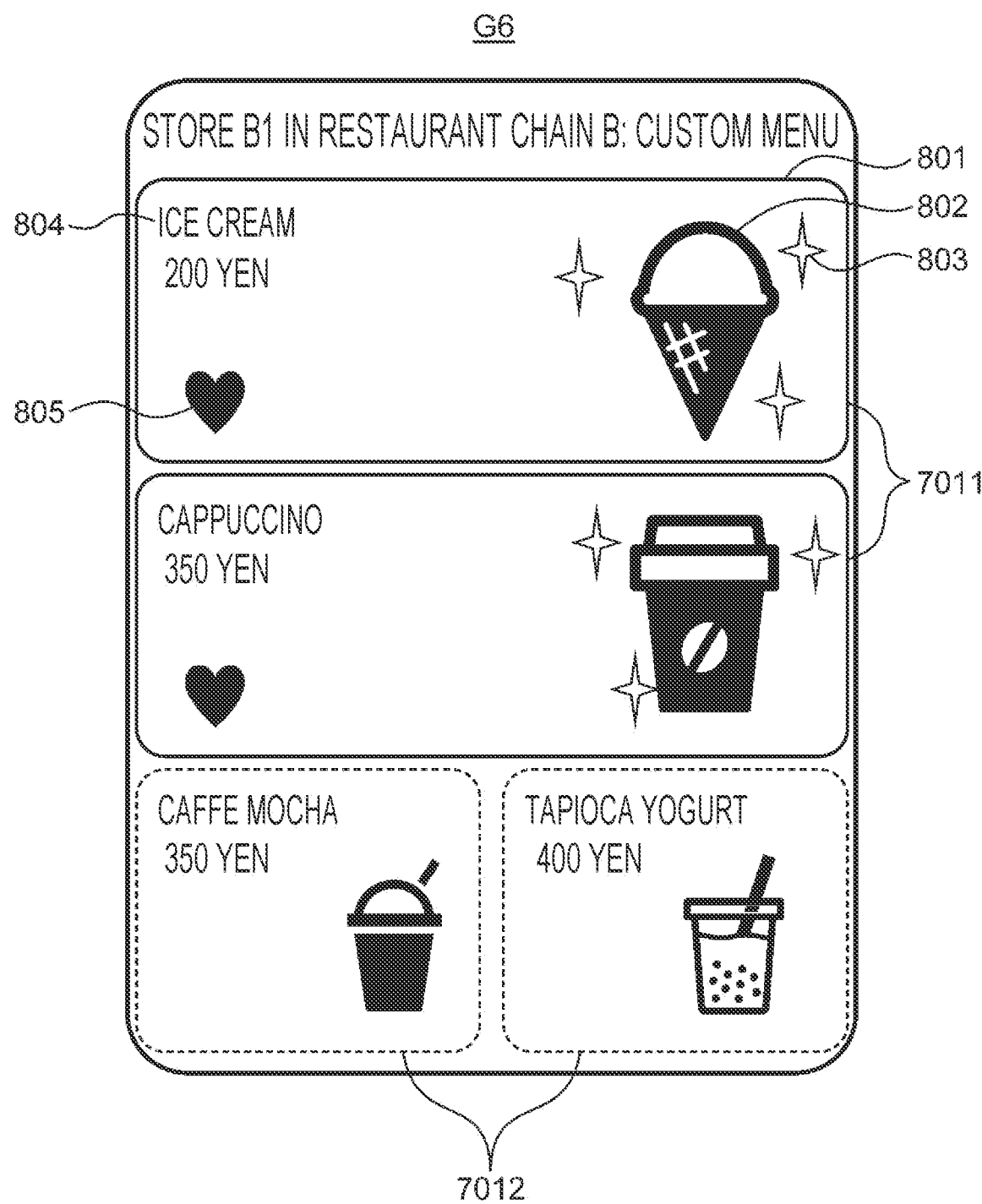
FIG. 8 is a diagram illustrating an individual menu screen, which is another example of the display screen for individual menu information displayed on the information terminal.

FIG. 8 is a diagram illustrating an individual menu screen G6, which is another example of the display screen for individual menu information displayed on the information terminal 100. In the individual menu screen G6, tile objects 7011 indicating a certain number of (here, top two) foods and drinks (here, ice cream and cappuccino) ordered most are arranged above tile objects 7012 indicating other foods and drinks (here, caffe mocha and tapioca yogurt). The tile objects 7012 indicating caffe mocha and tapioca yogurt are arranged in a third row of the individual menu screen G6.

The tile objects 7011 are also displayed larger than the tile objects 7012. Furthermore, frames 801 of the tile objects 7011 are thicker than ones of the tile objects 7012 and decorated. The frames 801 may be decorated, for example, a mode in which the frames 801 are displayed in a prominent color such as gold or red. Furthermore, images 802 in the tile objects 7011 indicating foods and drinks are larger than ones in the tile objects 7012. Furthermore, in the tile objects 7011, marks 803 (here, star marks) for highlighting the images 802 indicating foods and drinks are displayed. Furthermore, in the tile objects 7011, character strings 804 indicating names of foods and drinks are displayed larger than in the tile objects 7012. The character strings 804 may be highlighted by giving shadows, instead. Furthermore, in the tile objects 7011, marks 805 (here, heart marks) indicating favorites are displayed.

In FIG. 8, a reason why the tile object 7011 indicating ice cream is arranged above the tile object 7011 indicating cappuccino is that the user has ordered ice cream more than cappuccino. In FIG. 8, tile objects 7012 indicating foods and drinks that are not displayed in an initial screen may be displayed through scrolling. In this case, the user may vertically scroll the individual menu screen G6 to move all tile objects vertically. Alternatively, the user may horizontally scroll a field where the tile objects 7012 are displayed to move only the tile objects 7012 with the tile objects 7011 fixed.

Figure 9:
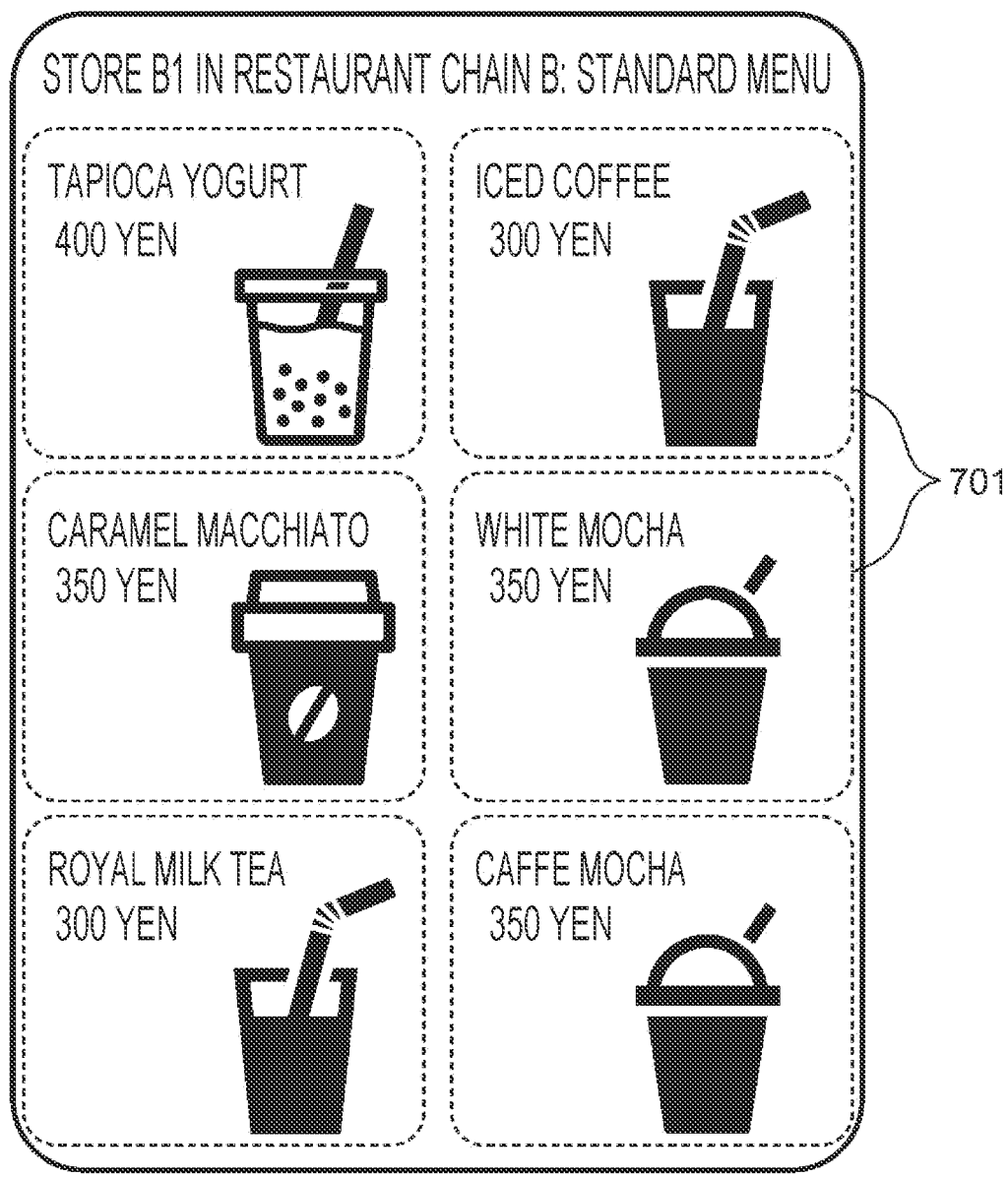
FIG. 9 is a diagram illustrating a standard menu screen, which is an example of a display screen for standard menu information displayed on the information terminal.

FIG. 9 is a diagram illustrating a standard menu screen G7, which is an example of a display screen for standard menu information displayed on the information terminal 100. In the standard menu screen G7, standard menu information regarding store B1 in restaurant chain B, which is not optimized for each user, is displayed.

"Restaurant chain B store B1 standard menu" is displayed at a top of the standard menu screen G7. This means that a menu displayed in the standard menu screen G7 is a standard menu of restaurant chain B. Tile objects 701 are arranged in the standard menu screen G7, for example, in a matrix of three rows and two columns. Here, tile objects 701 indicating popular foods and drinks of restaurant chain B are arranged at such positions that the user can easily order the foods and the drinks. More specifically, tile objects 701 indicating most popular foods and drinks are arranged at upper-left positions, and tile objects 701 indicating least popular foods are arranged at lower-right positions. The standard menu screen G7 is configured to display, through scrolling, tile objects 701 that are not displayed in an initial screen.

The tile objects 701 are arranged in the standard menu screen G7 without taking into consideration taste information regarding each of the users, and it is troublesome for the user to find tile objects 701 indicating desired foods and drinks.

In the individual menu screens G5 and G6, on the other hand, foods and drinks that suit the user's taste are arranged at such positions that the user can easily order the foods and the drinks, and it is more likely for the user to be able to easily find tile objects 701 indicating foods or drinks that the user desires. Furthermore, in the individual menu screens G5 and G6, tile objects 701 indicating foods and drinks most ordered by the user are displayed at positions of highest priority on the basis of the order records of the user stored in the first server 200. Even if the user has not used not only store B1 selected by the user but also any of stores in restaurant chain B, to which store B1 belongs, therefore, the tile objects 701 are arranged in the individual menu screens G5 and G6 in order that takes into consideration the user's taste.

It is assumed, for example, that the user frequently visits store A1 in restaurant chain A and the user has ordered foods and drinks at store A1 while displaying an individual menu screen that takes into consideration order records thereof on the information terminal 100. In this case, even if the user visits store B1 in restaurant chain B for a first time, the user can display, on the information terminal 100, the individual menu screen G5 or G6, in which foods and drinks are arranged in order similar to that in the individual menu screen for familiar restaurant chain A. As a result, the user can promptly find desired foods and drinks and feel comfortable. Furthermore, since an individual menu screen in which foods and drinks are arranged in familiar order is displayed even at a store in a chain that the user visits for a first time, the user will be surprised and get more interested in ordering.

Figure 10:
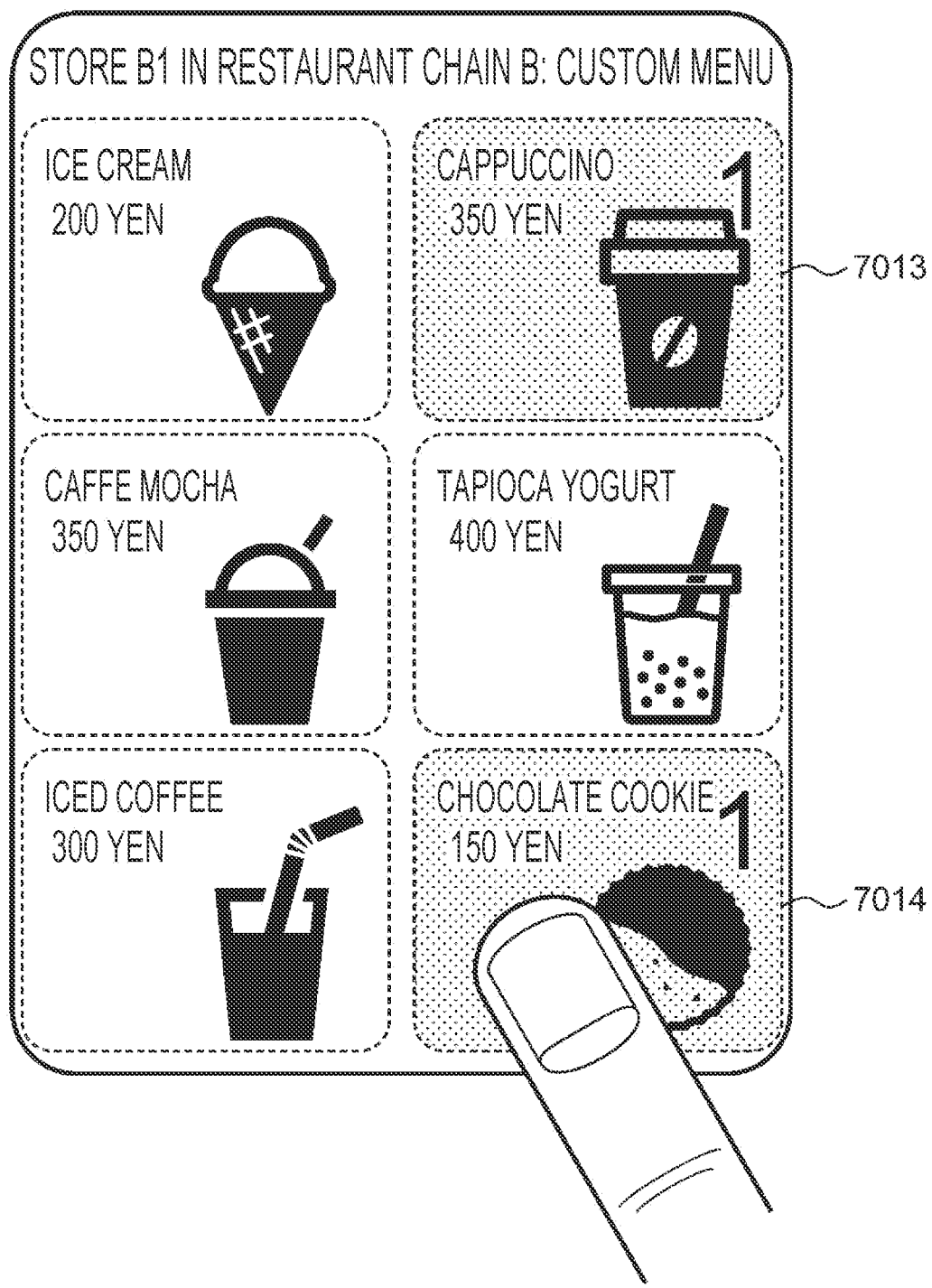
FIG. 10 is a diagram illustrating how the user orders a food and a drink on the individual menu screen illustrated in FIG. 7.

FIG. 10 is a diagram illustrating how the user orders a food and a drink on the individual menu screen G5 illustrated in FIG. 7. Here, the user selects a tile object 7013 indicating cappuccino and a tile object 7014 indicating a chocolate cookie. A color of the tile objects 7013 and 7014, therefore, is changed from a first color to a second color, which indicates that a corresponding item has been selected. Furthermore, since the tile objects 7013 and 7014 have been selected once each, numbers "1", which indicate the number of items ordered using the tile objects 7013 and 7014, are displayed.

Figure 11:
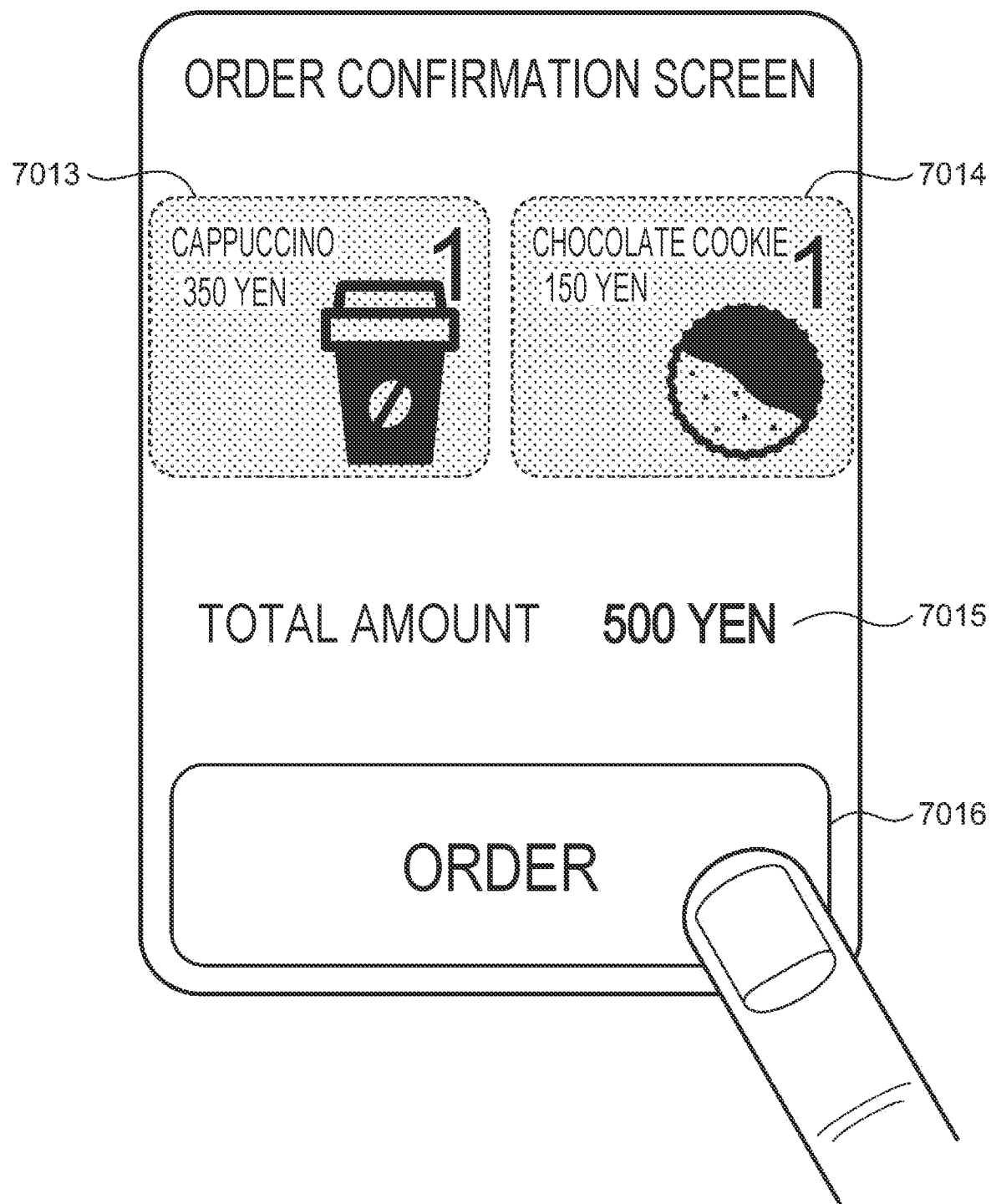
FIG. 11 is a diagram illustrating an example of an order confirmation screen displayed when the user confirms the order of the food and the drink selected in FIG. 10.

FIG. 11 is a diagram illustrating an example of an order confirmation screen G8 displayed when the user confirms the order for the food and the drink selected in FIG. 10. The order confirmation screen G8 is displayed when the user presses a "proceed to order" button, which is not illustrated, in the individual menu screen G5 illustrated in FIG. 10. In the order confirmation screen G8, the tile object 7013 indicating cappuccino and the tile object 7014 indicating a chocolate cookie selected in the individual menu screen G5 are displayed. A total amount field 7015 indicating the total amount of money to be paid for the food and the drink is displayed under the tile objects 7013 and 7014. Since the user has selected one cappuccino and one chocolate cookie and the total amount is 500 yen, "500 yen" is displayed in the total amount field 7015. An order button 7016 for confirming the order is displayed under the total amount field 7015. The user who is satisfied with details of the order displayed in the order confirmation screen G8 touches the order button 7016 to complete the order.

Ordering

Figure 15:
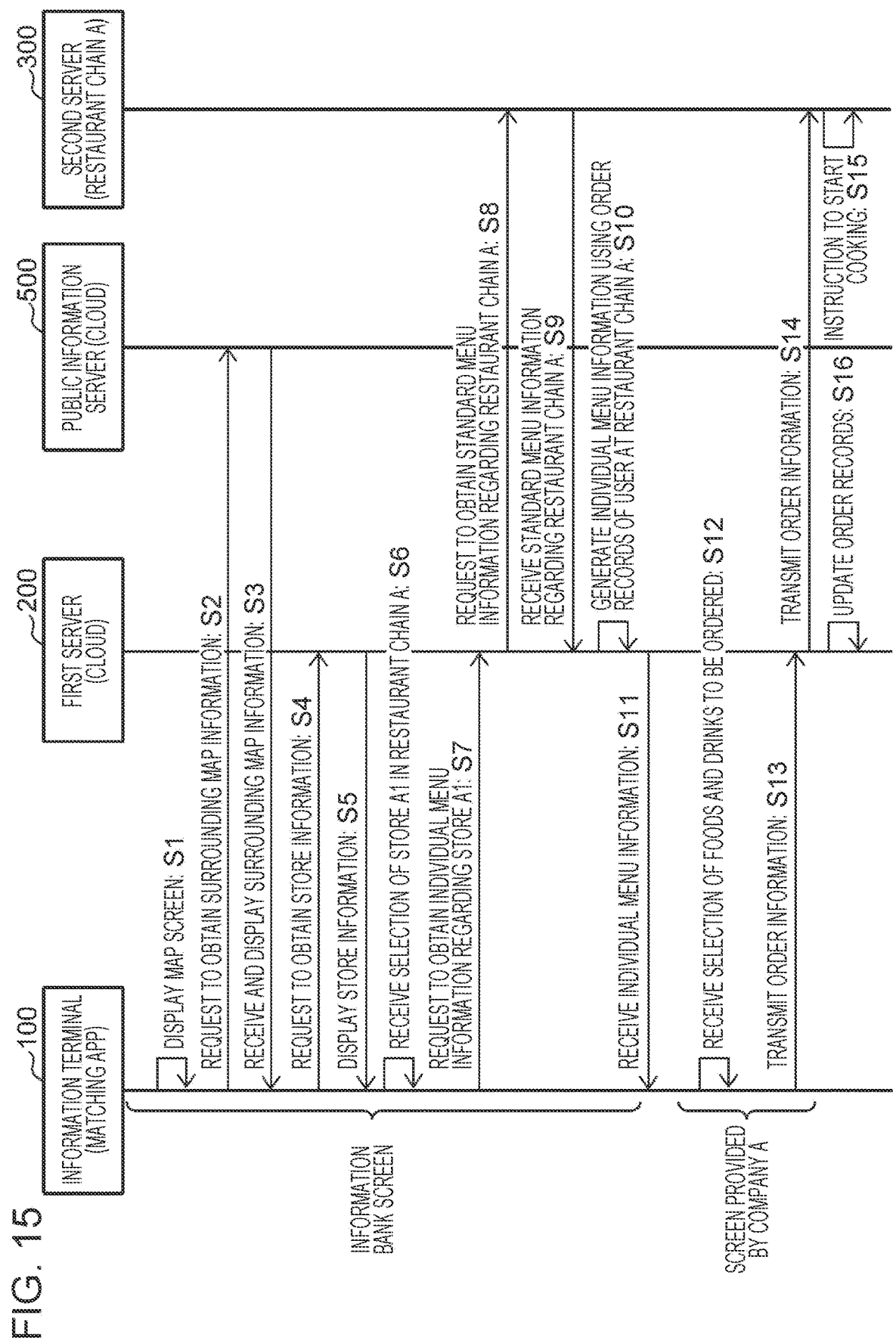
FIG. 15 is a sequence diagram illustrating an example of a process performed by the information provision system when the user who is visiting a store in a familiar chain orders foods and drinks.

FIG. 15 is a sequence diagram illustrating an example of a process performed by the information provision system when the user who is visiting a store in a familiar chain orders foods and drinks.

In step S1, the information terminal 100 receives an instruction to activate the matching app from the user, activates the matching app, and displays the map screen G4 on the display 105. More specifically, when activated, the matching app displays the authentication screen G1 or G2 and authenticates the user. If the user is successfully authenticated, the matching app displays the home screen G3. If the user touches the map button 1403 in the home screen G3, the matching app displays the map screen G4.

In step S2, the matching app obtains positional information indicating the current position of the information terminal 100 detected by the GPS sensor 107 and transmits, to the public information server 500, a request to obtain surrounding map information, which is map information regarding a surrounding area including the position.

Upon receiving the request, the public information server 500 obtains the current position of the information terminal 100 from the positional information included in the request, extracts, from a map database, map information regarding an area within a certain range from the position as surrounding map information, and transmits the map information to the matching app. Upon receiving the surrounding map information, the matching app displays the map screen G4 including a map indicated by the surrounding map information (step S3). The certain range indicating the area is a range within which the user who is going to eat out can visit a store on foot or by car from the current position, such as a radius of 1 km or 2 km.

After displaying the map screen G4, the matching app transmits, to the first server 200, a request to obtain store information regarding stores that are included in the map indicated by the received surrounding map information and that are registered in the first server 200 (step S4).

Upon receiving the request, the first server 200 extracts store information regarding stores included in the map from the memory 203 and transmits the store information to the matching app. The memory 203 stores a store database including store information regarding stores. The store information includes a store ID and a name of each of the stores, a chain to which the store belongs, and positional information and connection information regarding the store. The first server 200, therefore, may identify stores included in the area of the map indicated by the request to obtain store information from the positional information regarding stores stored in the store database.

Upon receiving the extracted store information, the matching app displays the store information on the map in the map screen G4 (step S5). As a result, as indicated by the map screen G4 illustrated in FIG. 6, stores included in a surrounding area of the current position of the user are displayed on the map indicating the surrounding area.

In step S6, the matching app receives an instruction given by the user to select store A1 in restaurant chain A among the stores displayed in the map screen G4. It is assumed here that the user frequently visits store A1.

In step S7, the matching app transmits a request to obtain individual menu information regarding store A1 to the first server 200. The request includes a store ID of store A1, connection information regarding store A1, a user ID of the information terminal 100, and the like.

Upon receiving the request, the first server 200 transmits, to a second server 300 for restaurant chain A or store A1, a request to obtain standard menu information regarding restaurant chain A to which store A1 belongs (step S8).

Upon receiving the request, the second server 300 of restaurant chain A or store A1 transmits standard menu information regarding store A1 to the first server 200. The first server 200 receives the standard menu information regarding store A1 (step S9). The standard menu information regarding store A1 transmitted here may be menu information common to stores in restaurant chain A or menu information partly different between the stores in restaurant chain A.

Upon receiving the standard menu information regarding store A1, the first server 200 collects order records, at the stores in restaurant chain A, of the user stored in the memory 203 and generates individual menu information regarding store A1 (step S10). The first server 200 transmits the generated individual menu information regarding store A1 to the information terminal 100 (matching app), and the matching app receives the individual menu information (step S11).

In the steps up to step S11, various screens displayed on the information terminal 100 are designed in a style defined by a manager (information bank) of the first server 200. In step S12 and later steps, however, various screens displayed on the information terminal 100 are designed in a style defined by restaurant chain A.

Alternatively, in step S12 and the later steps, the various screens displayed on the information terminal 100 may be screens in which materials (text explaining foods, photographs of foods, etc.) prepared by restaurant chain A are laid out in a style defined by the manager (information bank) of the first server 200, instead. In this case, unified user experience can be offered to the user who uses the matching app.

In step S12, the matching app displays an individual menu screen indicating the received individual menu information regarding store A1 and receives, from the user, an instruction to select foods and drinks to be ordered.

In step S13, the matching app transmits order information indicating ordered foods and drinks to the first server 200. Upon receiving the order information, the first server 200 transmits the order information to the second server 300 for restaurant chain A (step S14). Upon receiving the order information, the second server 300 instructs, by displaying the order information on a display of a store terminal of store A1, for example, a staff member at store A1 to start cooking (step S15).

In step S16, the first server 200 stores the order information in the memory 203 to update the order records of the user (step S16).

Although a server with which the matching app communicates in the steps other than the obtaining of surrounding map information is the first server 200 in the sequence diagram of FIG. 15, the present disclosure is not limited to this. For example, the matching app may access a third server other than the first server 200 in order to obtain store information, instead.

Figure 16:
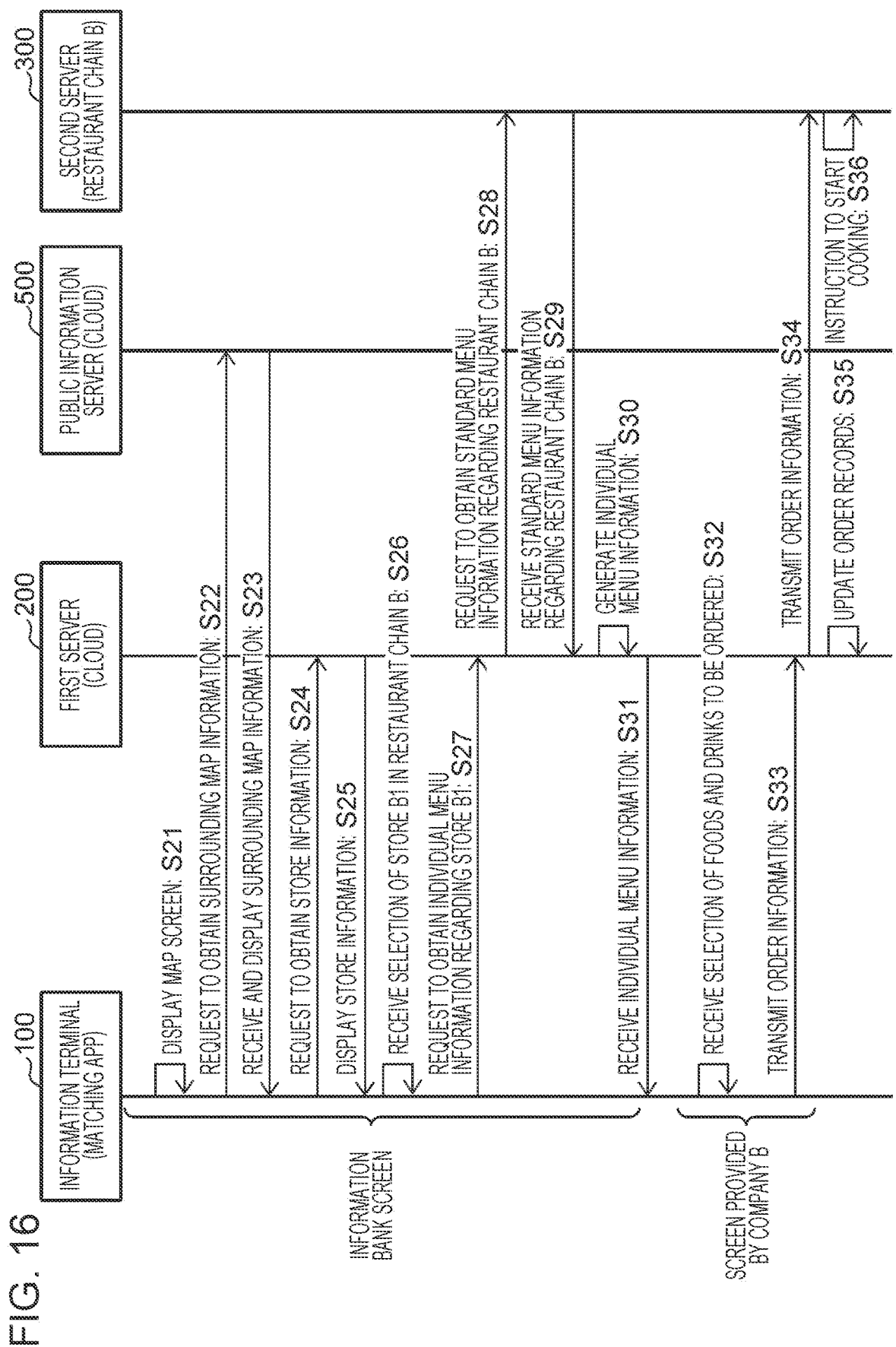
FIG. 16 is a sequence diagram illustrating an example of a process performed by the information provision system when the user's order for foods and drinks is received in consideration of whether a store that the user is visiting belongs to a restaurant chain that the user uses for a first time.

FIG. 16 is a sequence diagram illustrating an example of a process performed by the information provision system when the user's order for foods and drinks is received in consideration of whether a store that the user is visiting belongs to a restaurant chain that the user uses for a first time.

Steps S21 to S25 are the same as steps S1 to S5 illustrated in FIG. 15, respectively. In step S26, the matching app receives, from the user, an instruction to select store B1 in restaurant chain B among the stores displayed in the map screen G4.

In step S27, the matching app transmits, to the first server 200, a request to obtain individual menu information regarding store B1. The request includes the store ID of store B1, connection information regarding store B1, and the user ID of the information terminal 100.

Upon receiving the request, the first server 200 transmits, to a second server 300 for restaurant chain B, a request to obtain standard menu information regarding restaurant chain B to which store B1 belongs (step S28).

Upon receiving the request, the second server 300 for restaurant chain B transmits the standard menu information regarding store B1 to the first server 200. The first server 200 receives the standard menu information regarding restaurant chain B (step S29). The standard menu information regarding restaurant chain B transmitted here may be menu information common to stores in restaurant chain B or menu information partly different between the stores in restaurant chain B.

Upon receiving the standard menu information regarding restaurant chain B, the first server 200 generates individual menu information regarding store B1 for the user on the basis of order records of the user (step S30). More specifically, if the order records of the user at restaurant chain B do not satisfy a reference condition C1, which will be described later, the first server 200 generates individual menu information regarding store B1 using order records of the user about foods and drinks that are the same as or similar to foods and drinks served at store B1 in restaurant chain B. If the order records of the user at restaurant chain B satisfy the reference condition C1, on the other hand, the first server 200 generates individual menu information regarding store B1 for the user using order records of the user at restaurant chain B. Details of step S30 will be described later with reference to a flowchart of FIG. 17.

The first server 200 transmits, to the information terminal 100 (matching app), the generated individual menu information regarding store B1, and the matching app receives the individual menu information (step S31).

In the steps up to step S31, various screens displayed on the information terminal 100 designed in a style defined by the manager (information bank) of the first server 200 are used. In step S32 and later steps, however, various screens displayed on the information terminal 100 are designed in a style defined by restaurant chain B.

Alternatively, in step S32 and the later steps, the various screens displayed on the information terminal 100 may be screens in which materials (text explaining foods, photographs of foods, etc.) prepared by restaurant chain B are laid out in a style defined by the manager (information bank) of the first server 200, instead. In this case, unified user experience can be offered to the user who uses the matching app.

In step S32, the matching app displays the individual menu screen G5 or G6 indicating the received individual menu information regarding store B1 and receives, from the user, an instruction to select foods and drinks to be ordered.

Steps S33 to S36 are the same as steps S12 to S16 illustrated in FIG. 15, respectively, except that foods and drinks are ordered at store B1, not store A1, in steps S33 to S36.

Figure 17:
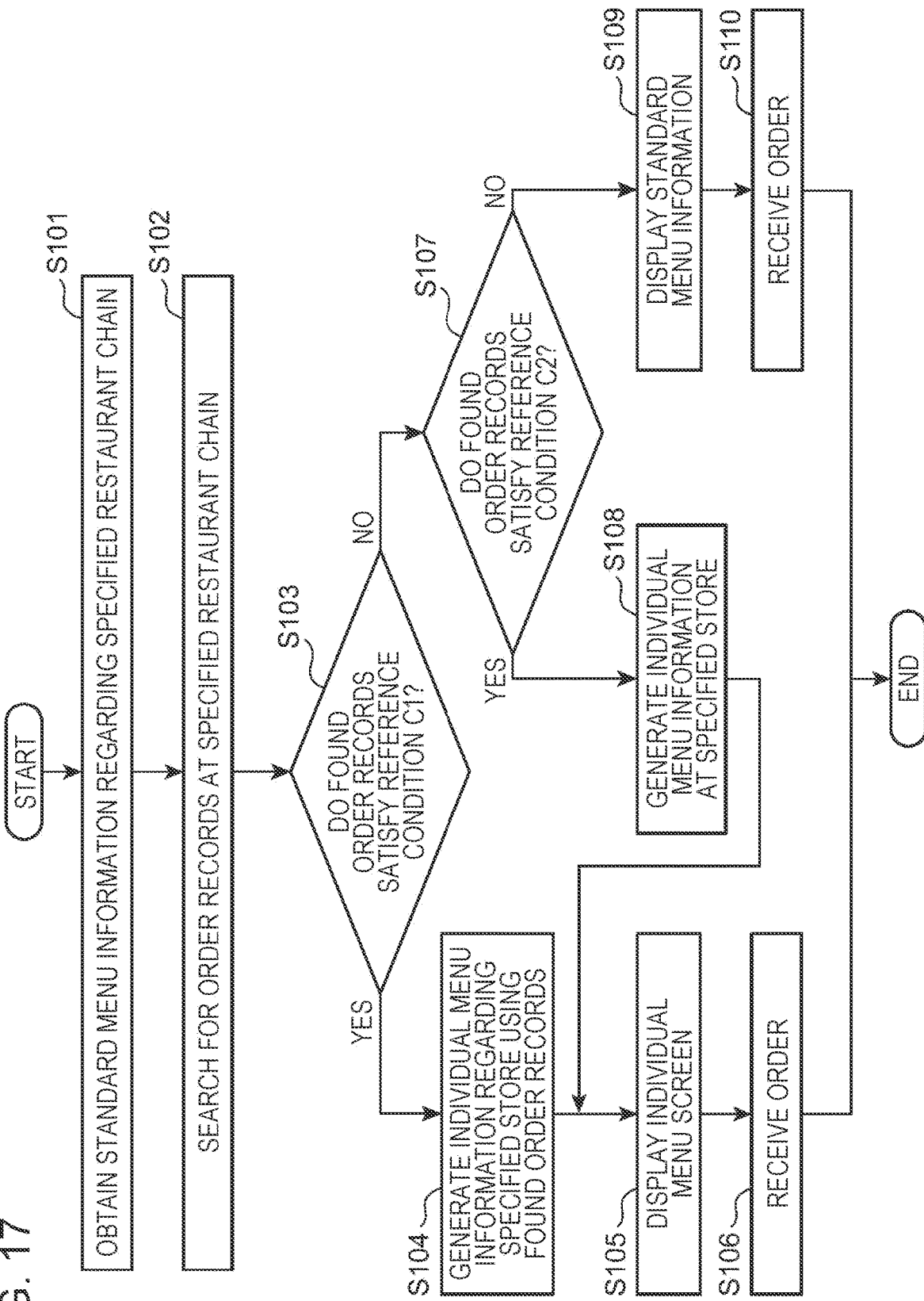
FIG. 17 is a diagram illustrating an example of a process at a time when step S30 in the sequence diagram of FIG. 16 is focused upon.

FIG. 17 is a diagram illustrating an example of a process performed by the information provision system at a time when step S30 in the sequence diagram of FIG. 16 is focused upon.

In step S101, the first server 200 obtains, from the second server 300, standard menu information regarding a specified restaurant chain. This step corresponds to step S29 illustrated in FIG. 16. The specified restaurant chain is a restaurant chain to which a store selected by the user on the map screen G4 belongs.

FIG. 13 is a diagram illustrating an example of the data configuration of standard menu information D1. In the standard menu information D1, "name", "price", and "time limit" are associated with one another for each of one or more foods and drinks. "Name" indicates a name of a food or a drink, such as "blended coffee" or "American coffee". "Price" indicates a price of a food or a drink. "Time limit" indicates whether a food or a drink is an item on sale for a limited time. "Yes" indicates an item on sale for a limited time, and "no" indicates a constantly available item. For example, "special Mont Blanc white caffe latte" is a drink served in a particular period, and "time limit" is "yes".

FIG. 17 will be referred to again. In step S102, the first server 200 searches order records of the user stored in the memory 203 for ones at the specified restaurant chain.

In step S103, the first server 200 determines whether the found order records satisfy the reference condition C1. The reference condition C1 may include at least one of following (a) to (d) in a period of time set by the company that manages the first server 200, the company that develops the matching app, the company that distributes the matching app, a company that provides the service (here, restaurant chain B), or the user. The period of time may be, for example, a limited period such as past three years, past two years, or a past one year or an unlimited period.

(a) The number of orders for foods and drinks at the specified restaurant chain is larger than or equal to a threshold Ta (b) The number of days when the user has ordered foods and drinks at the specified restaurant chain (the number of times that the user has visited the specified restaurant chain) is larger than or equal to a threshold Tb (c) The number of foods and drinks (the number of dishes) ordered at the specified restaurant chain is larger than or equal to a threshold Tc (d) The total amount of money paid for foods and drinks ordered at the specified restaurant chain (order amount) is larger than or equal to a threshold Td For each of the thresholds Ta to Td, for example, a predetermined value with which the user is considered to visit the specified restaurant chain frequently is used. Alternatively, a predetermined value with which the user is considered to be visiting the specified restaurant chain essentially for a first time may be used for each of the thresholds Ta to Td.

The period of time is provided as a condition in order to take into consideration a possibility that the user has not visited the specified restaurant chain for a long time and the user's taste has changed during that time or that stores in the specified restaurant chain have updated a menu. The user's taste might change, for example, when the user becomes more conscious about health.

If the found order records satisfy the reference condition C1 (YES in step S103), the first server 200 generates individual menu information regarding a specified store for the user using the found order records as priority indices (step S104). The specified store is a store selected by the user on the map screen G4. If the specified store is store B1 and the user frequently visits store B1 or any of the other stores in restaurant chain B, for example, a result of step S103 becomes YES. In this case, for example, the first server 200 may increase, on the basis of the number of orders based on the found order records, priority of foods and drinks ordered more. In addition, the first server 200 may rank foods and drinks in descending order of a possibility of being ordered while taking into consideration surrounding conditions of the user at a time of ordering. For example, appeal priority of foods and drinks in an individual menu may be determined on the basis of the number of orders under surrounding conditions ("day", "season", "temperature", "humidity", "weather", "place", "store", "biological information regarding user", and/or "amount of activity of user") similar to ones of current ordering. In this case, foods and drinks are not recommended regardless of conditions just because the number of orders for the foods and the drinks is the largest. The first server 200 may then generate individual menu information by rearranging menu items in the standard menu information regarding restaurant chain B such that the user can easily order prioritized foods and drinks. The individual menu information is transmitted to the information terminal 100.

FIG. 12 is a diagram illustrating an example of the data configuration of an order record database D2 storing order records. FIG. 12 illustrates an order record database D2 for the user who has specified a store. In each of order records of the order record database D2, for example, details of the user's order in each visit to a store are stored. In the order record database D2, "order time information", "store ID", "store name", and "ordered item names" are associated with one another. The order record database D2 is encrypted and managed while being split into "userID_FoodHistory_1.json" to "userID_FoodHistory_N.json" files illustrated in FIG. 18, which will be referred to later.

"Order time information" indicates a time at which the user has ordered foods and drinks. "Store ID" is identification information regarding a store that the user has visited. "Store name" indicates a name of a store that the user has visited. Here, "store name" also includes a name of a restaurant chain to which the store belongs. "Ordered item names" indicate names of foods and drinks ordered by the user. In a first order record, for example, information indicating that the user has ordered cappuccino and ice cream at Kadoma store in restaurant chain A at 13:15:45 on Jan. 3, 2020.

Although the above-described surrounding conditions are not illustrated, information regarding surrounding conditions may also be stored in order records. "Day" indicates a day of ordering, "season" indicates a season of ordering, "temperature" indicates a temperature around the user at a time of ordering, "humidity" indicates a humidity around the user at a time of ordering, "weather" indicates weather around the user at a time of ordering (sunny, rainy, cloudy, etc.), "place" is information (an address, GPS information, etc.) indicating a place of ordering, "store" is information for identifying a store at which the user has ordered foods and drinks, "biological information regarding user" is biological information (blood pressure, heart rate, etc.) regarding the user at a time of ordering, and "amount of activity of user" is activity information (the number of steps, calories consumed, etc.) regarding the user.

If the specified restaurant chain is restaurant chain B, the first server 200 may refer to the order record database D2 and collect the number of orders for each of foods and drinks included in the standard menu information D1 regarding restaurant chain B. The first server 200 may then rank the foods and the drinks included in the standard menu information D1 from a result of the collection and generate individual menu information.

In step S105, the information terminal 100 displays an individual menu screen indicating the individual menu information. In step S106, the information terminal 100 receives, from the user, an instruction to select foods and drinks to be ordered.

If the found order records do not satisfy the reference condition C1 in step S103 (NO in step S103), the first server 200 determines whether the order records of the user satisfy a reference condition C2 (step S107).

The reference condition C2 may include at least one of following (e), (f), and (g) in a period of time set by the company that manages the first server 200, the company that develops the matching app, the company that distributes the matching app, the company that provides the service (here, restaurant chain B), or the user. The period of time may be a limited period such as past three years, past two years, or past one year or an unlimited period.

(e) The sum of count values is larger than or equal to a threshold Te (f) The number of foods and drinks whose count values are larger than or equal to a threshold Tf is larger than or equal to a certain value (g) The sum of order amounts is larger than or equal to a threshold Tg A count value indicates the number of times that each of foods and drinks included in standard menu information regarding a specified restaurant chain appears in the "ordered item names" field of the order record database D2. A count value is measured through text matching in which the number of times that a character string to be searched for appears in a target text. If a character string "cappuccino" included in standard menu information appears 29 times in the "ordered item names" field of the order record database D2 within a set period of time (e.g., three years), for example, a count value of "cappuccino" is 29. When standard menu information separately includes "dan dan noodles" and "Chinese dumplings" and the "ordered item names" field of the order record database D2 includes "dan dan noodles & Chinese dumplings set", for example, count values of "dan dan noodles" and "Chinese dumplings" may each be increased by 1.

The sum of count values is the sum of count values of foods and drinks for the user. In the example illustrated in FIG. 14, the sum of count values of foods and drinks for the user is 2+29+11+3=45 with respect to illustrated items, namely from "blended coffee" to "special Mont Blanc white caffe latte".

A count value of each of foods and drinks included in a standard menu increases if the "ordered item names" field of the order record database D2 includes a food or a drink whose character string is the same as or similar to that of the food or the drink included in the standard menu. "Blended coffee" and "original blended coffee", for example, are determined to be similar to each other because one character string includes another. The sum of count values is the sum of count values of foods and drinks.

If the threshold Tf is 10, foods and drinks whose count values are larger than or equal to the threshold Tf are "cappuccino" and "caffe mocha" in the example of the order record database D2. In this case, if the certain value in the condition (f) is 2, it is determined that the order records of the user satisfy the condition (f).

If the order records satisfy the reference condition C2 (YES in step S107), the first server 200 generates individual menu information regarding the specified store using the order records of the user (step S108). In this case, the first server 200 may generate individual menu information such that it becomes easier for the user to order foods and drinks whose count values, that is, number of orders, are larger. After step S108, the process proceeds to step S105, and step S105 and a later step is performed.

The sum of order amounts is the sum of prices of foods and drinks multiplied by the number of orders. The sum of order amounts are 2*350+29*350+11*350+3*150=15,150 yen with respect to the items illustrated in FIGS. 13 and 14.

FIG. 14 is a table illustrating the number of orders placed by a certain user for foods and drinks included in standard menu information. In the table, "total number of orders" indicates the number of orders for each of the foods and the drinks at all restaurant chains including a specified restaurant chain. "Number of orders at specified restaurant chain" indicates the number of orders placed by the user for each of the foods and drinks at a restaurant chain to which a store selected by the user on the map screen G4 belongs.

Because the number of orders at the specified restaurant chain is zero for every one of the foods and the drinks, it can be seen that the user has never visited the restaurant chain. It is therefore difficult to generate individual menu information that suits the user's taste on the basis of order records at the restaurant chain. The number of orders for "cappuccino" and "caffe mocha", however, is large in the "total number of orders" field, and the user's taste is evident.

The first server 200, therefore, generates individual menu information while referring to "total number of orders". As a result, the first server 200 can generate individual menu information that suits the user's taste. In the example illustrated in FIG. 14, "total number of orders" for "cappuccino" and "caffe mocha" is larger than that of any other food or drink. Even if the user uses a specified restaurant for a first time, therefore, these drinks are displayed in an initial screen of an individual menu screen in such a manner that the user can easily order the drinks. A food or a drink whose "total number of orders" is small, such as "American coffee", may be removed from the initial screen of the individual menu screen. Alternatively, when tile objects 701 indicating foods and drinks whose "total number of orders" is large can be displayed in the initial screen of the individual menu screen, "American coffee" may also be displayed. In this case, a tile object 701 indicating a food or a drink whose "total number of orders" is small, such as "American coffee", may be displayed smaller than tiles objects 701 indicating "cappuccino" and "caffe mocha".

If the order records satisfy the reference condition C2, the count value of each of the foods and the drinks may be calculated while excluding the number of orders at the specified restaurant chain from "total number of orders" illustrated in FIG. 14. Alternatively, if the order records satisfy the reference condition C2, the count value of each of the foods and the drinks may be calculated while weighting the number of orders at the specified restaurant chain and the number of orders at other restaurant chains differently (e.g., weighting the number of orders at the specified restaurant chain more heavily than the number of orders at the other restaurant chains) in "total number of orders" illustrated in FIG. 14. Alternatively, if the order records satisfy the reference condition C2, the count value of each of the foods and the drinks may be calculated using "total number of orders" at certain one or more restaurant chains other than the specified restaurant chain in "total number of orders" illustrated in FIG. 14. The certain one or more restaurant chains are restaurant chains that the user frequently visits.

FIG. 17 will be referred to again. In step S107, if the order records of the user do not satisfy the reference condition C2 (NO in step S107), the first server 200 displays, on the information terminal 100, a standard menu screen for the restaurant chain to which the store selected by the user on the map screen G4 belongs (step S109).

By providing branching at step S107, generation of individual menu information can be prevented, for example, when the number of order records of the user stored in the order record database D2 is small and it is difficult to estimate the user's taste from the order record database D2.

In step S110, the information terminal 100 receives, from the user who has viewed the standard menu screen, an instruction to select foods and drinks to be ordered.

Example of Information Processing when User Orders Using Individual Menu

Next, an example of information processing when the user orders foods and drinks using an individual menu screen will be described. When an interface for communicating information and a data structure to be handled are unique to a restaurant chain or a store, various pieces of data handled in the information provision system might be available at store A1 in restaurant chain A but might be unavailable at restaurant chain B, or might be unavailable at both other stores in restaurant chain A and restaurant chain B. In order to avoid such situations, a general-purpose solution for enabling many users to order foods and drinks using individual menus at many restaurants will be described.

Figure 18:
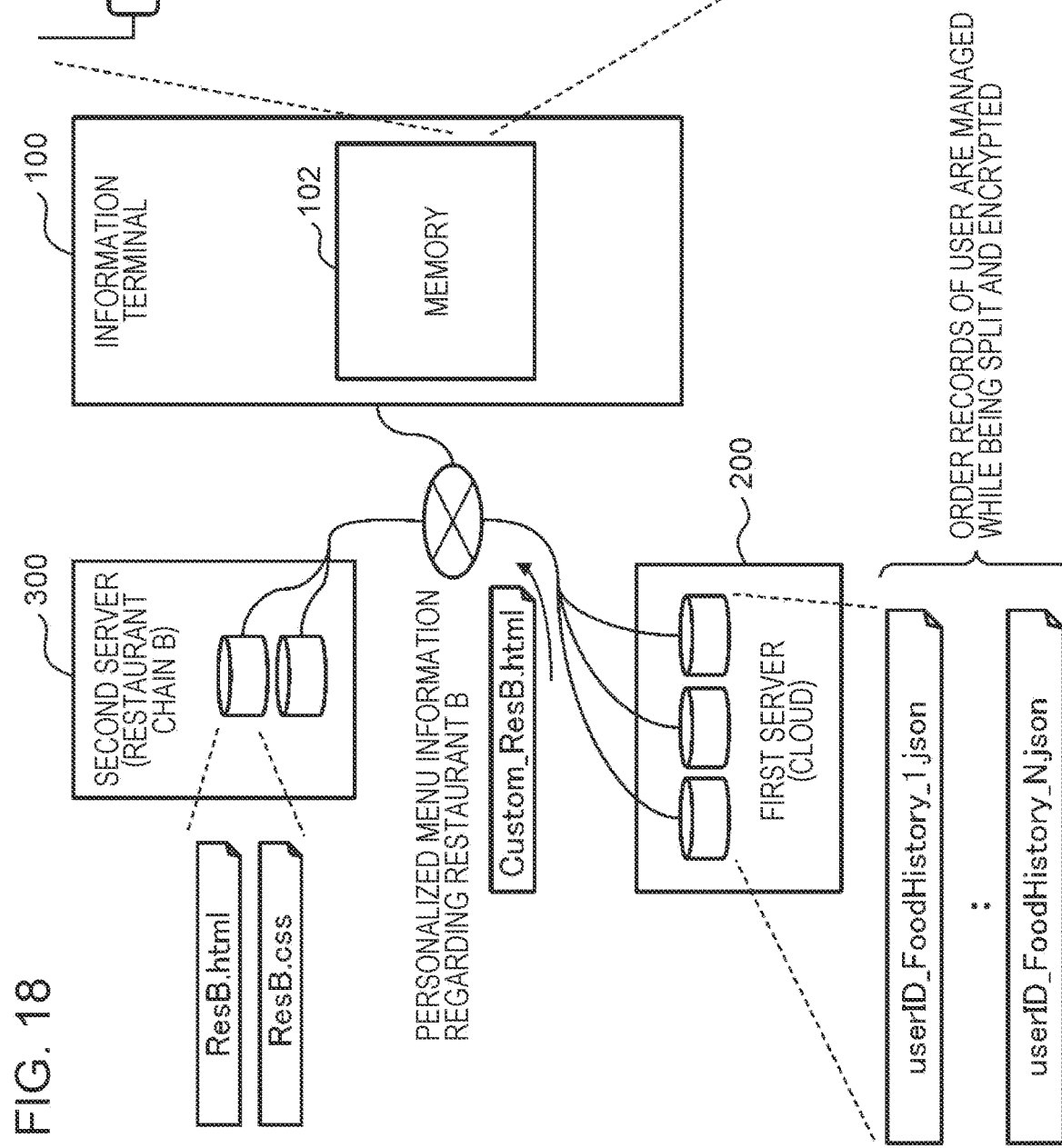
FIG. 18 is a diagram illustrating an example of a specific mode for implementing the information provision system according to the first embodiment.

FIG. 18 is a diagram illustrating an example of a specific mode for implementing the information provision system according to the present embodiment. The memory 102 of the information terminal 100 includes a "matching_app" directory, which is a location storing files necessary to execute the matching app. There are an "account" directory, a "main" directory, and a "matching_temp" directory under the "matching_app" directory. The "account" directory stores information necessary for user accounts and/or user authentication. The "main" directory stores information necessary for the matching app to achieve basic functions including drawing of the home screen. The "matching_temp" directory temporarily stores information necessary for matching.

The "account" directory stores a "user_account.xml" file containing information necessary for accounts and/or user authentication. In the "user_account.xml" file, unique account names (e.g., user IDs specified by users) and authentication information (e.g., passwords, fingerprint feature values, and/or face feature values) are encrypted and recorded as information for identifying the users.

Each of the account names is not limited to a user ID specified by a user and may be information with which the user who uses the matching app can be uniquely identified. For example, a serial code unique to each set of the matching app may be employed, the serial code being embedded in a program of the matching app or distributed along with the matching app. The serial code unique to each set of the matching app is a serial code uniquely given to an information terminal 100 on which the matching app is installed. Alternatively, each of the account names may be a unique account name generated by the matching app on the basis of random numbers when the matching app is activated for a first time or the account name is registered. In this case, the matching app may automatically generate an account name while confirming, with the first server 200, that the account name is not one of existing account names that have been registered.

When character string information meaningless to humans is set as an account name, personal information of increased secrecy can be communicated.

The "main" directory stores a "main.html" file containing content information necessary to achieve the basic functions of the matching app and a "main.css" file containing a style (e.g., a user interface (UI) design) for displaying screens.

The second server 300 for restaurant chain B stores a "ResB.html" file containing content information to reply with and a "ResB.css" file containing a style (e.g., a UI design) for displaying screens for the content information. For example, the "ResB.html" file may include the standard menu information D1 illustrated in FIG. 13. Alternatively, an external file referred to with the "ResB.html" file may store the standard menu information D1.

An enormous amount of a wide variety of personal information regarding the user is accumulated in the first server 200 while being split and encrypted. For example, the order record database D2 for the user used in the present disclosure may be stored in physically different storage devices in the first server 200 as N JavaScript object notation (JSON)-format files, namely a "userID_FoodHistory_1.json" file, a "userID_FoodHistory_2.json", . . . , and a "userID_FoodHistory_N.json" file. In each of the N files, "userID" at a beginning of a filename is identification information for identifying the user and "FoodHistory" is identification information for identifying the order record database D2 described with reference to FIG. 12. A number at an end of the filename is an identification number of the file obtained as a result of the splitting.

If the first server 200 can receive a request for order records of the user along with an appropriate permission (e.g., access permission information), the first server 200 can correctly restore data from the N files, encrypt the data by converting the data into a certain description format (.json), and transmit the data to the information terminal 100.

Figure 19:
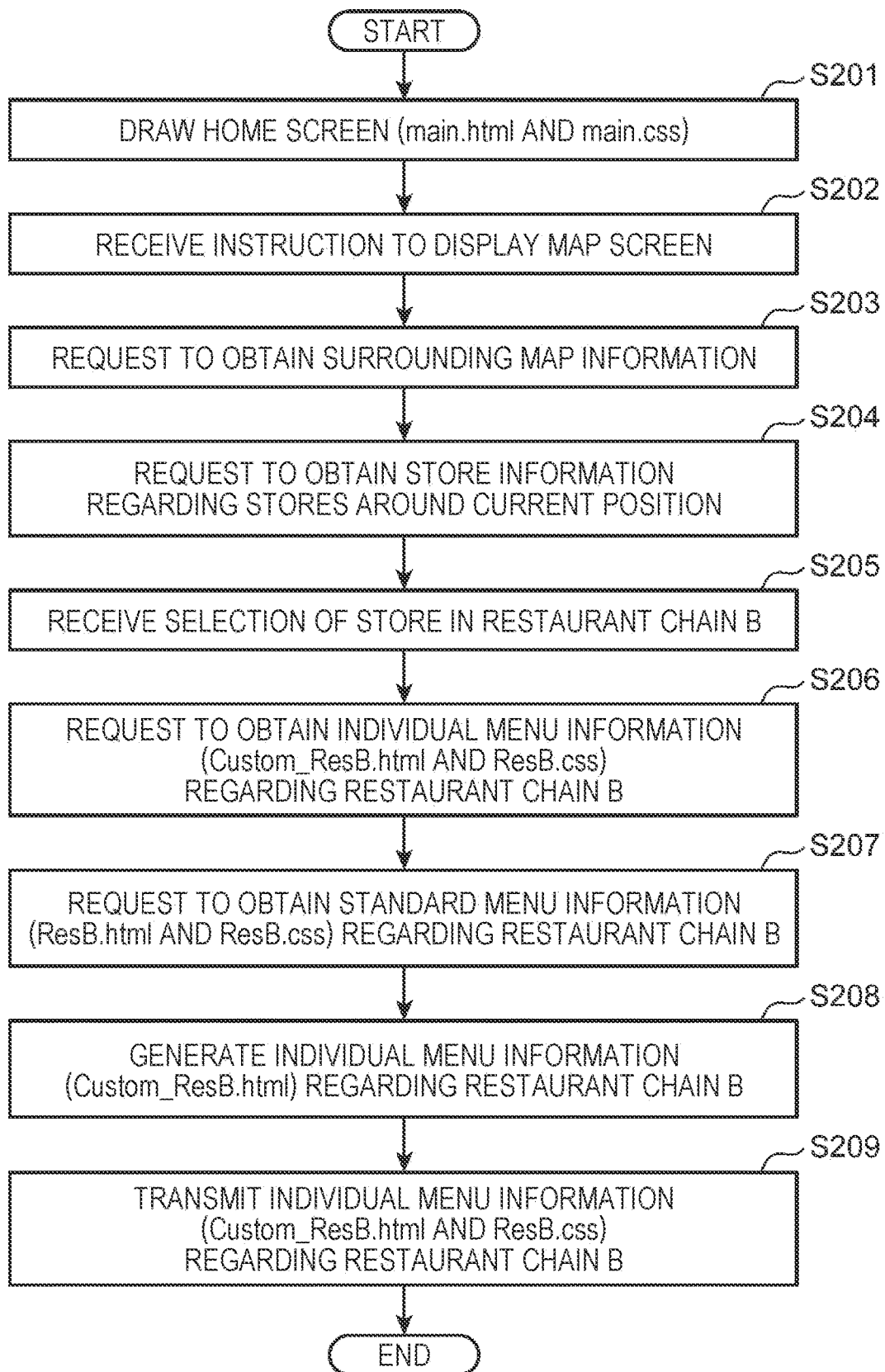
FIG. 19 is a flowchart illustrating an example of a process performed by the matching app on files until an individual menu screen is displayed after the matching app is activated.

How the matching app handles files when controlling screens using a hypertext markup language (HTML) will be described with reference to a flowchart of FIG. 19. FIG. 19 is a flowchart illustrating an example of a process performed by the matching app on the files until an image of an individual menu is displayed after the matching app is activated.

In step S201, the matching app is activated and draws the home screen. The matching app draws the home screen using the "main.html" file and the "main.css" file in the "main" directory immediately after the activation. As a result, the home screen G3 illustrated in FIG. 5 is drawn.

In step S202, the matching app receives, from the user who is viewing the home screen G3, an instruction to display the map screen G4.

In step S203, the matching app transmits, to the public information server 500, a request to obtain surrounding map information at a current position to display the map screen G4 indicating the surrounding map information.

In step S204, the matching app transmits, to the first server 200, a request to obtain store information regarding stores in an area indicated by the surrounding map information to display the store information in the map screen G4. As a result, the icon 3210 and the like indicating the stores are displayed.

In step S205, the matching app receives, from the user, an instruction to select store B1 in restaurant chain B.

In step S206, the matching app transmits, to the first server 200, a request to obtain individual menu information regarding restaurant chain B.

In step S207, the first server 200 transmits, to the second server 300 for restaurant chain B, a request to obtain standard menu information (ResB.html and ResB.css) regarding restaurant chain B.

In step S208, the first server 200 generates individual menu information regarding restaurant chain B from the order records of the user. The generated individual menu information is newly stored under the "matching_temp" directory as a "Custom_ResB.html" file.

In step S209, the first server 200 transmits the individual menu information regarding restaurant chain B to the matching app.

Various screens are thus drawn using HTML/cascading style sheets (CSS) files. When a single matching app presents, from among products or services provided by a large number of unspecified business operators, products or services that suit an enormous amount of a wide variety of personal information regarding a user, therefore, information expected by the business operators can be displayed in styles (e.g., UI designs) expected by the business operators.

When a user who has finished ordering foods and drinks using an individual menu returns to the home screen of the matching app, or when a certain period of time has elapsed since a user finished ordering foods and drinks using an individual menu, files temporarily stored in the "matching_temp" directory may all be removed for the sake of safety.

Second Embodiment

In the first embodiment, the first server 200 generates individual menu information. In a second embodiment, on the other hand, the information terminal 100 generates individual menu information.

In the second embodiment, the same components as in the first embodiment will be given the same reference numerals, and description thereof is omitted.

First, a configuration according to the second embodiment will be described with reference to FIG. 2. Since the information terminal 100 generates individual menu information in the second embodiment, the configuration of the information terminal 100 will be mainly described hereinafter.

The GPS sensor 107 of the information terminal 100 obtains positional information regarding the information terminal 100. The communication unit 101 transmits the obtained positional information to the public information server 500 (third server). The public information server 500 obtains restaurant information (store information) indicating one or more restaurants in an area including a position indicated by the received positional information.

The display 105 displays the map screen G4 including the store information.

The operation unit 106 (an example of an input device) of the information terminal 100 receives an operation for selecting a store ID indicating the second restaurant through the map screen G4.

The processing unit 104 obtains, using the communication unit 101, menu information (standard menu information) regarding the second restaurant from a second server 300 for the second restaurant indicated by the store ID.

The processing unit 104 of the information terminal 100 obtains, from the first server 200 using the communication unit 101, taste information associated with a user ID of the user.

The processing unit 104 arranges menu items in order according to the taste information on the basis of the taste information and the standard menu information regarding the second restaurant.

The processing unit 104 displays menu information (individual menu information) regarding the arranged menu items on the display 105.

If there are no order records, at the second restaurant, of the user who has selected the second restaurant, the processing unit 104 generates individual menu information in which the menu items included in the standard menu information regarding the second restaurant are arranged in the order according to the taste information on the basis of the taste information and the standard menu information regarding the second restaurant. The user, therefore, can efficiently select foods and drinks that suit his/her taste even if the user is using a chain to which the second restaurant belongs for a first time.

If there are order records, at the second restaurant, of the user who has selected the second restaurant, on the other hand, the processing unit 104 generates individual menu information in which the menu items included in the standard menu information regarding the second restaurant are arranged in order according to the order records at the second restaurant on the basis of the order records at the second restaurant and the standard menu information regarding the second restaurant. If the user has used the second restaurant before, therefore, the user can efficiently select foods and drinks that suit his/her taste using individual menu information that reflects order records at the second restaurant.

When the number of order records, at the second restaurant, of the user who has selected the second restaurant is smaller than a certain value, the processing unit 104 may generate individual menu information in which the menu items included in the standard menu information regarding the second restaurant are arranged in the order according to the taste information corresponding to the user ID of the user on the basis of the taste information and the standard menu information regarding the second restaurant. As a result, even when the number of order records at the second restaurant is smaller than the certain value, the user can efficiently select foods and drinks that suit his/her taste using the individual menu information that reflects the taste information. The certain value is a predetermined value with which the user is considered to visit the second restaurant frequently or a predetermined value with which the user is considered to be visiting the second restaurant for a first time.

When the number of order records, at the second restaurant, of the user who has selected the second restaurant is larger than or equal to the certain value, on the other hand, the processing unit 104 may generate individual menu information in which the menu items included in the standard menu information regarding the second restaurant are arranged in order according to the order records at the second restaurant on the basis of the order records at the second restaurant and the standard menu information regarding the second restaurant. When the number of order records at the second restaurant is larger than or equal to the certain value, therefore, the user can efficiently select foods and drinks that suit his/her taste using the individual menu information that reflects the order records at the second restaurant.

Furthermore, when a latest order record, at the second restaurant, of the user who has selected the second restaurant precedes a certain period of time, the processing unit 104 may generate individual menu information in which the menu items included in the standard menu information regarding the second restaurant are arranged in the order according to the taste information corresponding to the user ID of the user on the basis of the taste information and the standard menu information regarding the second restaurant. Even if the user has not visited the second restaurant for a long time, therefore, the user can efficiently select foods and drinks that suit his/her taste using the individual menu information that reflects the taste information. The certain period of time may be a limited period such as past three years, past two years, or past one year or an unlimited period.

Furthermore, when the number of orders placed by the user at the second restaurant within a set period of time is smaller than or equal to a certain value, the processing unit 104 may generate individual menu information in which the menu items included in the standard menu information regarding the second restaurant are arranged in the order according to the taste information corresponding to the user ID of the user on the basis of the taste information and the standard menu information regarding the second restaurant. Even when the number of orders placed by the user at the second restaurant within the set period of time is smaller than or equal to the certain value, therefore, the user can efficiently select foods and drinks that suit his/her taste using the individual menu information that reflects the taste information. The set period of time may be a limited period such as past three years, past two years, or past one year or an unlimited period. The certain value may be a predetermined value with which the user is considered to visit the second restaurant frequently or a predetermined value with which the user is considered to visit the second restaurant essentially for a first time.

Figure 20:
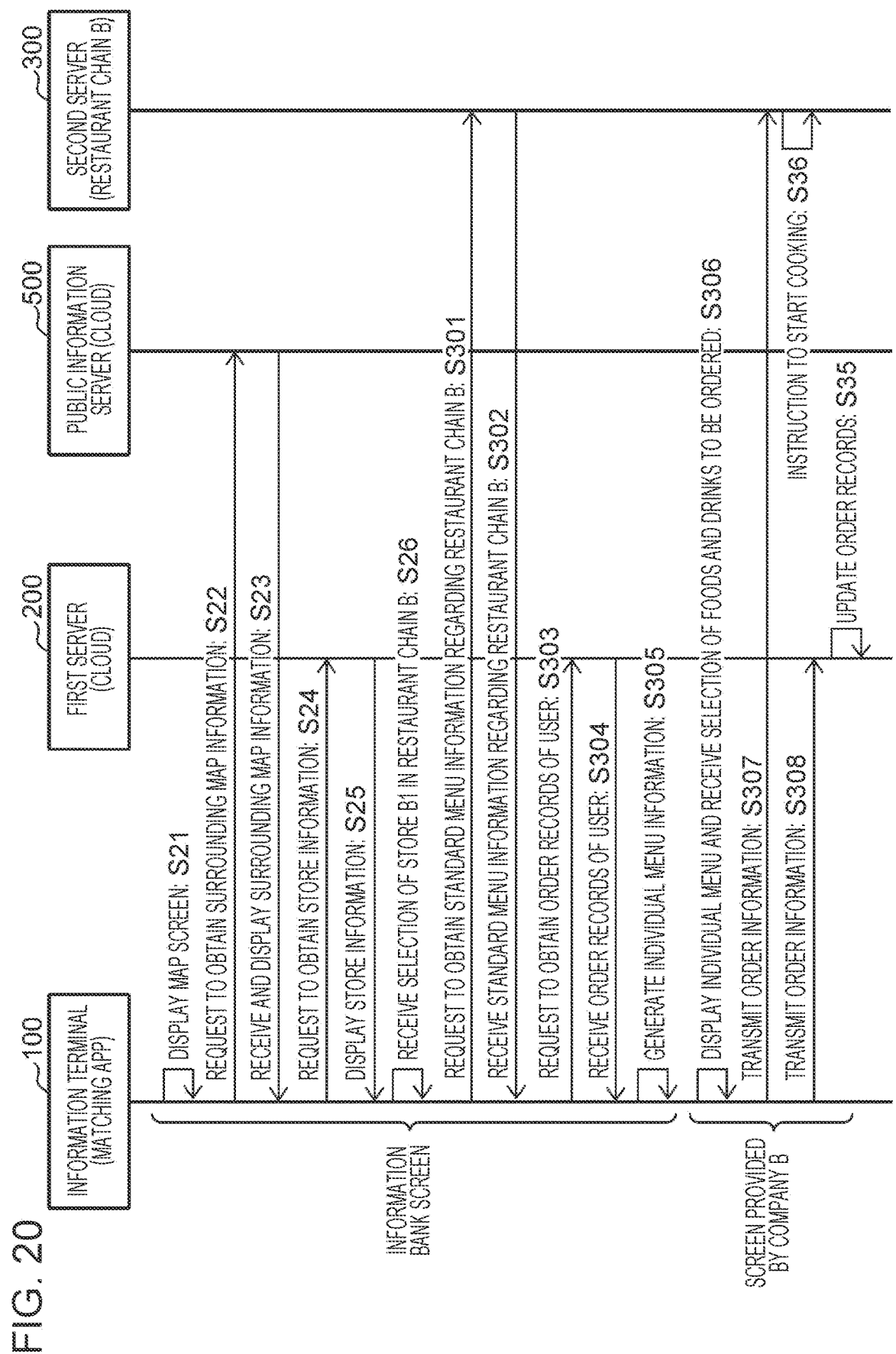
FIG. 20 is a sequence diagram illustrating an example of a process performed by an information provision system according to a second embodiment when the user's order for foods and drinks is received in consideration of whether a store that the user is visiting belongs to a restaurant chain that the user uses for a first time.

FIG. 20 is a sequence diagram illustrating an example of a process performed by the information provision system according to the second embodiment when the user's order for foods and drinks is received in consideration of whether a store that the user is visiting belongs to a restaurant chain that the user uses for a first time. In FIG. 20, the same steps as in FIG. 16 are given the same reference numerals, and description thereof is omitted. Steps S21 to S26 are the same as in FIG. 16.

In step S301 after step S26, the information terminal 100 (matching app) transmits a request to obtain individual menu information regarding store B1 to the second server 300. The request includes the store ID of store B1 and the user ID of the information terminal 100.

Upon receiving the request, the second server 300 for restaurant chain B transmits the standard menu information regarding store B1 to the information terminal 100. The information terminal 100 receives the standard menu information regarding restaurant chain B (step S302). The standard menu information regarding restaurant chain B transmitted here may be menu information common to the stores in restaurant chain B or menu information partly different between the stores in restaurant chain B.

In step S303, upon receiving the standard menu information regarding restaurant chain B, the information terminal 100 transmits, to the first server 200, a request to obtain order records (an example of taste information) of the user. Upon receiving the request, the first server 200 reads the order records of the user from the memory 203 and transmits the order records to the information terminal 100. Here, the first server 200 may determine whether a user indicated by a user ID is an authorized user. If determining that the user indicated by the user ID is an authorized user, the first server 200 may read the order records of the user from the memory 203 and transmit the order records to the information terminal 100. If determining that the user indicated by the user ID is not an authorized user, on the other hand, the first server 200 may transmit, to the information terminal 100, information indicating that the personal information is inaccessible.

If determining that the user indicated by the user ID is not an authorized user, the first server 200 may transmit, to the information terminal 100, a message asking whether to permit the user indicated by the user ID to read the personal information. If information indicating permission is transmitted from the information terminal 100 in response to the message, the first server 200 may read the order records of the user from the memory 203 and transmit the order records to the information terminal 100.

In step S304, the information terminal 100 receives the order records.

In step S305, the information terminal 100 generates individual menu information regarding store B1 for the user on the basis of the order records of the user.

More specifically, if the order records of the user at restaurant chain B do not satisfy the reference condition C1 (e.g., if it can be determined that the user is visiting restaurant chain B for a first time), the first server 200 generates individual menu information regarding store B1 using order records of the user about foods and drinks that are the same as or similar to the foods and the drinks served at store B1 in restaurant chain B.

If the order records of the user at restaurant chain B satisfy the reference condition C1 (e.g., if it can be determined that the user visits restaurant chain B frequently), on the other hand, the first server 200 generates individual menu information regarding store B1 for the user using the order records of the user at restaurant chain B. Details of this process have been described with reference to the flowchart of FIG. 17.

In the steps up to step S305, various screens displayed on the information terminal 100 are designed in a style defined by the manager (information bank) of the first server 200. In step S306 and later steps, on the other hand, various screens displayed on the information terminal 100 are designed in a style defined by restaurant chain B.

In step S306, the information terminal 100 displays the individual menu screen G5 or G6 indicating the received individual menu information regarding store B1 and receives, from the user, an instruction to select foods and drinks to be ordered.

In step S307, the information terminal 100 transmits order information indicating the ordered foods and drinks to the second server 300. Upon receiving the order information, the second server 300 instructs, by displaying the order information on a display of a store terminal of store B1, for example, a staff member at store B1 to start cooking (step S36).

In step S308, the information terminal 100 also transits the order information to the first server 200.

Upon receiving the order information, the first server 200 stores the order information in the memory 203 to update the order records of the user (step S35).

According to the second embodiment, even when the information terminal 100 generates individual menu information, menu information that takes into consideration taste information regarding the user can be displayed at the second restaurant that the user is using for a first time while keeping business operators that have not been authorized by the user from accessing the taste information.

Modifications

The above description is just an example, and those skilled in the art may implement various applications of the present disclosure. The following modifications may be applied to third to sixth embodiment, which will be described later.

(1) When the first server 200 obtains order information for store B1 in restaurant chain B selected by the user on the map screen G4, the first server 200 may monitor the current position of the information terminal 100. When a distance between the information terminal 100 and store B1 becomes smaller than or equal to a certain value, the first server 200 may transmit the order information to the second server 300 of restaurant chain B. As a result, store B1 can promptly provide foods and drinks for the user when the user arrives at store B1.

(2) In each of the above embodiments, each of the components may be achieved by dedicated hardware or by executing a software program corresponding to the component. Each of the components may be achieved by reading and executing a software program stored in a storage medium such as a hard disk or a semiconductor memory using a program execution unit such as a CPU or a processor, instead.

(3) Count values need not be calculated for foods and drinks that are included in the standard menu information D1 illustrated in FIG. 13 and for which time limits are provided. That is, count values may be calculated only for foods and drinks whose "time limit" is No in standard menu information, and individual menu information may be generated on the basis of a result of the calculation.

(4) In the present disclosure, a case where individual menu information is generated at a store in a second restaurant chain at which the user has never or hardly ever placed an order using personal information such as order records at stores in a first restaurant chain at which the user has placed orders and a result of comparison between names of foods and drinks served at stores in the second restaurant chain and names of foods and drinks served at the stores in the first restaurant chain has been described as an example. Information used in combination with personal information in order for the first server 200 to generate individual menu information, however, is not limited to the above example.

For example, the first server 200 may generate individual menu information using statistical information estimated from big data including purchase records of users who have placed orders at both stores in the first restaurant chain and the stores in the second restaurant chain, instead. In this case, if it is determined, from personal information regarding a user who is using a service, that the user has frequently ordered an item A at the stores in the first restaurant chain, for example, the first server 200 generates individual menu information in which an item X takes priority in display, that is, the item X is displayed at a position of high priority, for example, on the basis of statistical information obtained by analyzing big data, the statistical information indicating "users who order the item A at the stores in the first restaurant chain frequently orders the item X at the stores in the second restaurant chain".

Although information obtained by analyzing big data is called "statistical information" above, a term used is not limited to this. For example, the information may be called "correlation information indicating a correlation between an item served at the stores in the first restaurant chain and an item served at the stores in the second restaurant chain" or simply called "information generated using big data". Information obtained from other users and that is used as big data may be, for example, used for an analysis or the like after being converted into anonymous information with which the users are not identified. Alternatively, when generating the statistical information, the first server 200 may anonymize personal information associated with a user who is using a service used to generate an individual menu.

(5) In the present disclosure, an example has been described where the first server 200 generates individual menu information in which foods and drinks are arranged in order according to taste information regarding the user estimated from purchase records of the user or the like. In the following description, a method in which the first server 200 controls or specifies, through individual menu information, order of foods and drinks displayed on a terminal apparatus in an individual menu will be described while taking some examples. That is, a method for providing information in which the first server 200 generates, on the basis of taste information regarding a user including order records at a first restaurant and menu information regarding a second restaurant, individual menu information for arranging, on a display screen of a terminal apparatus, menu items included in the menu information regarding the second restaurant in order according to the taste information, transmits the individual menu information to the terminal apparatus to display menu information regarding the menu items arranged in the order on the display screen of the terminal apparatus will be described with reference to some examples. A method used by the first server 200 to control or specify order of foods and drinks displayed in an individual menu and that can be implemented in the above embodiments is not limited to the above example. That is, the first server 200 may use any method insofar as order of foods and drinks displayed in an individual menu can be changed in accordance with taste information estimated from personal information such as order records.

In a first example, when generating individual menu information, the first server 200 stores foods and drinks, which are menu items, in the individual menu information in order in which the foods and the drinks are to be displayed.

In a second example, when generating individual menu information, the first server 200 directly specifies a display position in a screen for each of foods and drinks to be displayed in an individual menu.

In a third example, the first server 200 stores each of foods and drinks to be displayed in an individual menu in individual menu information while associating the food or the drink with a position in order of display. In this case, an app or a browser on the terminal apparatus that has received the individual menu information may determine, on the basis of a certain display screen generation rule, for example, the number of foods and drinks, display sizes of the foods and the drinks corresponding to the positions in the order of display, display positions of the foods and the drinks corresponding to the positions in the order of display, and the like in accordance with the size of an area in which the individual menu is to be displayed or the display size of a font specified by the user and generate a display screen for the individual menu by disposing objects indicating the foods and the drinks in accordance with the positions in the order of display included in the individual menu information.

In a fourth example, the first server 200 may store, in the individual menu information for each of the foods and the drinks, one or more parameters that have been generated on the basis of personal information regarding the user and that are available in determining the position of the food or the drink in the order of display instead of directly storing the position of the food or the drink in the order of display in the individual menu information. Upon receiving the individual menu information, the app or the browser on the terminal apparatus calculates the position of the food or the drink in the order of display from the one or more parameters in accordance with a certain display position calculation rule or a display position calculation rule specified by the user from among more than one candidate. With this configuration, the app or the browser on the terminal apparatus does not simply display a display screen for an individual menu in accordance with generated individual menu information but can adjust a method for displaying an individual menu or positions of foods and drinks in order of display in accordance with a type of terminal apparatus used by the user or settings made by the user. The service, therefore, can be provided more flexibly.

(6) In the present disclosure, a mode in which files that define UI designs and whose filename extensions are ".css" are prepared, for example, and a style is changed by switching a file that defines a UI design to be used for display has been described as an example of changing a style on a screen of the matching app. The style, however, may be changed using a method other than that in which the file that defines a UI design to be used for display is switched, instead. For example, the style may be changed by uniquely setting a font of text, the size of the font, colors of a background and the text, a logo, menu images, designs of buttons, the layout of menus, the display size of the menus, UIs for selecting foods and drinks and confirming orders, and/or the like to be uniquely used by each of restaurant chains A and B in display of the menu screen of the matching app, instead. The font of the text, the size of the font, the colors of the background and the text, the logo, the menu images, the designs of the buttons, the layout of the menus, the display size of the menu, the UIs for selecting foods and drinks and confirming orders, and/or the like to be used for the menu screen can be set in an HTML file provided by each of business operators that provide a service using the matching app, such as restaurant chains A and B. At this time, CSS files specified by the matching app are used for an individual menu display screen of the matching app, but a file provided by a business operator that provides a service is used as an HTML file to be displayed in a screen area provided to display an individual menu. As a result, designs of windows and frames of the matching app become the same as those in other display screens of the matching app, and each of the business operators that provide a service can set the design of the screen area in which an individual menu is displayed. As a result, the user can easily determine whether a business operator of a service with which the user is placing an order is restaurant chain A or restaurant chain B. Furthermore, even though a business operator that provides a service can set a style for an individual menu screen, positions and order of items in a menu to be displayed can be changed on the basis of taste information including order records at different restaurant chains and that are managed by a manager (information bank). The user, therefore, can efficiently select foods and drinks that suit his/her taste using individual menu information that reflects the taste information.

(7) Although the matching app uses taste information including order records at restaurants in different chains in the above description, the restaurants in different chains need not be restaurants in chains including more than one store in the present disclosure. For example, order records used by the matching app may be order records at a restaurant that does not belong to a chain including more than one store. That is, according to the present disclosure, positions and order of items in a menu to be displayed can be changed between restaurants that serve different menus on the basis of taste information including order records at different restaurants, and the user can efficiently select foods and selects that suit his/her taste using individual menu information that reflects the taste information.

The above modifications (1) to (7) can also be applied when a mode in which the information terminal 100 generates individual menu information is employed.

Although the information provision system and the method for providing information according to one or more aspects have been described on the basis of embodiments, the present disclosure is not limited to the embodiments. The scope of the present disclosure may also include modes obtained by modifying the above embodiments in ways conceivable by those skilled in the art and modes constructed by combining together components from different embodiments, insofar as the spirit of the present disclosure is not deviated from.

Third Embodiment

In the first embodiment, the first server 200 generates individual menu information. In a third embodiment, on the other hand, the second server 300 generates individual menu information. An information provision system according to the third embodiment includes an information management system including the second server 300.

In the third embodiment, the same components as in the first embodiment will be given the same reference numerals, and description thereof is omitted.

First, a configuration according to the third embodiment will be described with reference to FIG. 2. Since the second server 300 generates individual menu information in the third embodiment, the configuration of the second server 300 will be mainly described hereinafter.

The communication unit 301 of the second server 300 receives, from the information terminal 100, identification information for identifying the user of the information terminal 100. The communication unit 301 may also receive a store ID indicating a second restaurant belonging to a chain different from one to which a first restaurant belongs. The store ID is identification information (includes chain information regarding the restaurant and/or information for identifying the store) regarding a store selected by the user who operates the information terminal 100. The communication unit 301 transmits individual menu information generated by the processing unit 302 to the information terminal 100 owned by the user who has selected the second restaurant.

The processing unit 302 of the second server 300 obtains, from the first server 200, taste information corresponding to a received user ID. The first server 200 transmits the taste information if the user has permitted the second server 300 to access the taste information. Personal information regarding the user, therefore, can be prevented from leaking from the first server 200 without the user's permission. If the user has inhibited the second server 300 or a restaurant chain that uses the second server 300 from accessing the taste information, on the other hand, the first server 200 does not transmits the taste information. In this case, the second server 300 may transmit a standard menu of the second restaurant to the information terminal 100.

The processing unit 302 obtains standard menu information regarding the second restaurant from the memory 303 and arranges menu items in order according to taste information on the basis of the taste information and the standard menu information.

The processing unit 302 transmits, to the information terminal 100 using the communication unit 301, menu information (individual menu information) regarding the arranged menu items. The display 105 of the information terminal 100 then displays an individual menu.

If there are no order records, at the second restaurant, of the user who has selected the second restaurant, the processing unit 302 generates individual menu information in which the menu items included in the standard menu information regarding the second restaurant are arranged in the order according to the taste information on the basis of the taste information and the standard menu information regarding the second restaurant. The user, therefore, can efficiently select foods and drinks that suit his/her taste even if the user is using a chain to which the second restaurant belongs for a first time.

If there are order records, at the second restaurant, of the user who has selected the second restaurant, on the other hand, the processing unit 302 generates individual menu information in which the menu items included in the standard menu information regarding the second restaurant are arranged in order according to the order records at the second restaurant on the basis of the order records at the second restaurant and the standard menu information regarding the second restaurant. If the user has used the second restaurant before, therefore, the user can efficiently select foods and drinks that suit his/her taste using individual menu information that reflects order records at the second restaurant.

When the number of order records, at the second restaurant, of the user who has selected the second restaurant is smaller than a certain value, the processing unit 302 may generate individual menu information in which the menu items included in the standard menu information regarding the second restaurant are arranged in the order according to the taste information corresponding to a user ID of the user on the basis of the taste information and the standard menu information regarding the second restaurant. As a result, even when the number of order records at the second restaurant is smaller than the certain value, the user can efficiently select foods and drinks that suit his/her taste using the individual menu information that reflects the taste information. The certain value is a predetermined value with which the user is considered to visit the second restaurant frequently or a predetermined value with which the user is considered to be visiting the second restaurant for a first time.

When the number of order records, at the second restaurant, of the user who has selected the second restaurant is larger than or equal to the certain value, on the other hand, the processing unit 302 may generate individual menu information in which the menu items included in the standard menu information regarding the second restaurant are arranged in order according to the order records at the second restaurant on the basis of the order records at the second restaurant and the standard menu information regarding the second restaurant. When the number of order records at the second restaurant is larger than or equal to the certain value, therefore, the user can efficiently select foods and drinks that suit his/her taste using the individual menu information that reflects the order records at the second restaurant.

Furthermore, when a latest order record, at the second restaurant, of the user who has selected the second restaurant precedes a certain period of time, the processing unit 302 may generate individual menu information in which the menu items included in the standard menu information regarding the second restaurant are arranged in the order according to the taste information corresponding to the user ID of the user on the basis of the taste information and the standard menu information regarding the second restaurant. Even if the user has not visited the second restaurant for a long time, therefore, the user can efficiently select foods and drinks that suit his/her taste using the individual menu information that reflects the taste information. The certain period of time may be a limited period such as past three years, past two years, or past one year or an unlimited period.

Furthermore, when the number of orders placed by the user at the second restaurant within a set period of time is smaller than or equal to a certain value, the processing unit 302 may generate individual menu information in which the menu items included in the standard menu information regarding the second restaurant are arranged in the order according to the taste information corresponding to the user ID of the user on the basis of the taste information and the standard menu information regarding the second restaurant. Even when the number of orders placed by the user at the second restaurant within the set period of time is smaller than or equal to the certain value, therefore, the user can efficiently select foods and drinks that suit his/her taste using the individual menu information that reflects the taste information. The set period of time may be a limited period such as past three years, past two years, or past one year or an unlimited period. The certain value may be a predetermined value with which the user is considered to visit the second restaurant frequently or a predetermined value with which the user is considered to visit the second restaurant for a first time.

Next, the first server 200 will be described. The memory 203 of the first server 200 stores access information regarding each of users. The access information indicates whether each of the users permits the second server 300 to access taste information regarding the user. The access information includes "access permitted", "access not permitted", or "no setting".

If access information regarding a user for a second server 300 or a business operator who uses the second server 300 is "access permitted" and the communication unit 201 receives, from the second server 300 or the business operator who uses the second server 300, a request to obtain taste information regarding the user, the processing unit 202 transmits the taste information regarding the user to the second server 300 or the business operator who uses the second server 300. If access information regarding a user for a second server 300 or a business operator who uses the second server 300 is "access not permitted" and the communication unit 201 receives, from the second server 300 or the business operator who uses the second server 300, a request to obtain taste information regarding the user, the processing unit 202 does not transmit the taste information regarding the user to the second server 300. If access information regarding a user is "no setting" and the communication unit 201 receives, from a second server 300 or a business operator who uses the second server 300, a request to obtain taste information regarding the user, the processing unit 202 transmits, to the information terminal 100 using the communication unit 201, a message asking the user whether to permit access to the taste information.

Figure 21:
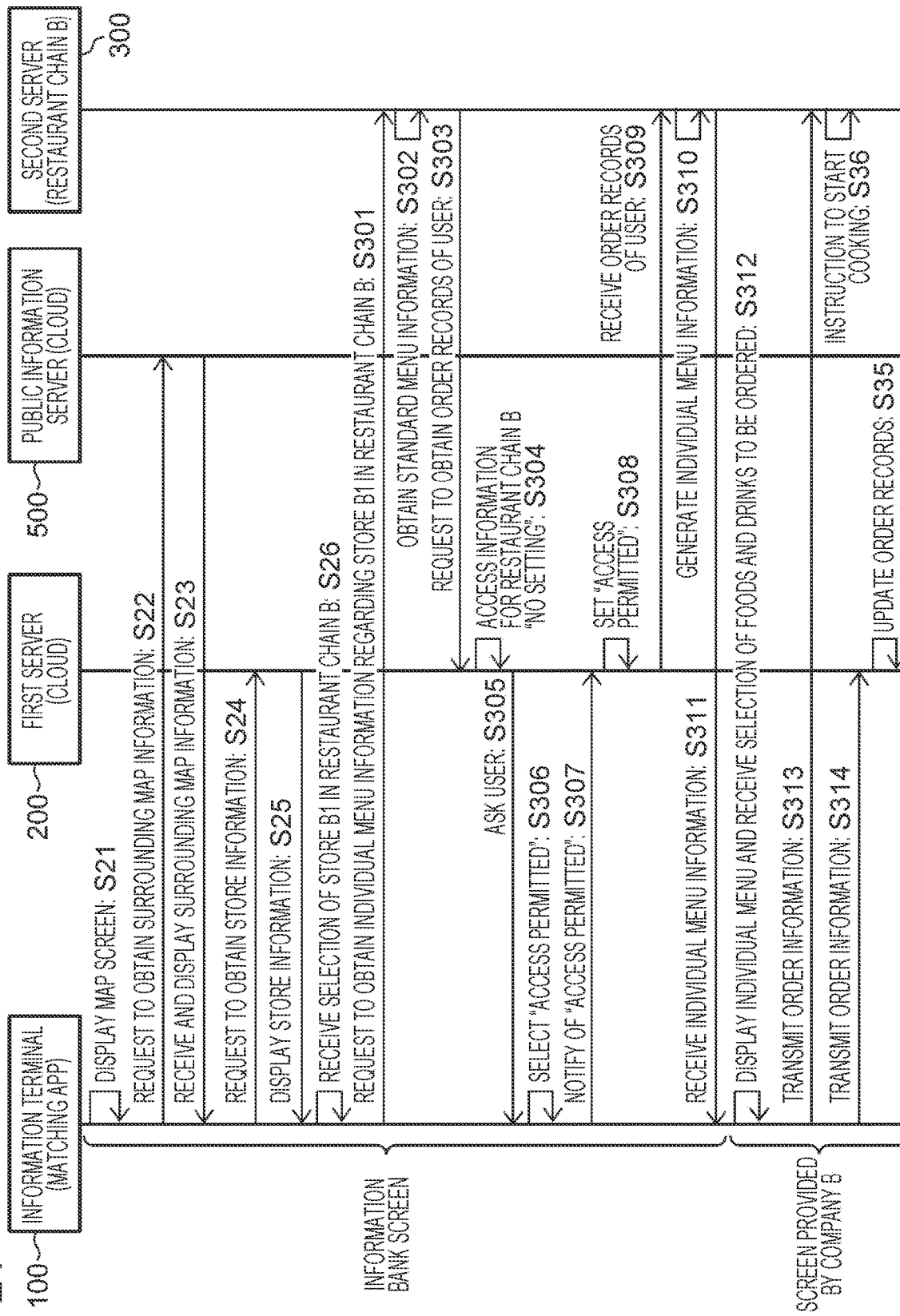
FIG. 21 is a sequence diagram illustrating an example of a process performed by an information provision system according to a third embodiment when the user's order for foods and drinks is received in consideration of whether a store that the user is visiting belongs to a restaurant chain that the user uses for a first time.

FIG. 21 is a sequence diagram illustrating an example of a process performed by the information provision system according to the third embodiment when the user's order for foods and drinks is received in consideration of whether a store that the user is visiting belongs to a restaurant chain that the user uses for a first time. In FIG. 21, the same steps as in FIG. 16 are given the same reference numerals, and description thereof is omitted. It is assumed in FIG. 21 that the user has set, to "no setting", access information for controlling whether to permit a second server 300 or restaurant chain B that uses the second server 300 to access taste information (order records) regarding the user.

Steps S21 to S26 are the same as in FIG. 16.

In step S301 after step S26, the information terminal 100 (matching app) transmits a request to obtain individual menu information regarding store B1 to the second server 300. The request includes the store ID of store B1 and the user ID of the information terminal 100.

In step S302, the second server 300 obtains, from the memory 303, the standard menu information regarding restaurant chain B. The standard menu information regarding restaurant chain B obtained here may be menu information common to the stores in restaurant chain B or menu information partly different between the stores in restaurant chain B.

In step S303, the second server 300 transmits, to the first server 200, a request to obtain order records (an example of taste information; may be any information indicating taste information) of the user.

In step S304, the first server 200 reads the access information regarding the user from the memory 203 and checks that the access information regarding the user for restaurant chain B is "no setting".

In step S305, the first server 200 transmits, to the information terminal 100, a message asking the user whether to permit restaurant chain B to access the order records. The display 105 of the information terminal 100 displays the message.

In step S306, the information terminal 100 receives, from the user who has read the message, an operation for setting the access information to "access permitted".

In step S307, the information terminal 100 transmits, to the first server 200, notification information indicating that the access information has been set to "access permitted".

Upon receiving the notification information indicating that the access information has been set to "access permitted", the first server 200 sets, in step S308, the access information regarding the user stored in the memory 203 for restaurant chain B to "access permitted". As a result, the first server 200 reads the order records of the user from the memory 203 and transmits the order records to the second server 300.

In step S309, the second server 300 receives the order records of the user.

In step S310, the second server 300 generates individual menu information regarding the user for store B1 on the basis of the order records of the user.

More specifically, if the order records of the user at restaurant chain B do not satisfy the reference condition C1 (e.g., if it can be determined that the user is visiting restaurant chain B for a first time), the second server 300 generates individual menu information regarding store B1 using order records of the user about foods and drinks that are the same as or similar to foods and drinks served at store B1 in restaurant chain B.

If the order records of the user at restaurant chain B satisfy the reference condition C1 (e.g., if it can be determined that the user visits restaurant chain B frequently), on the other hand, the second server 300 generates individual menu information regarding store B1 for the user using the order records of the user at restaurant chain B. Details of this process have been described with reference to the flowchart of FIG. 17. The second server 300 transmits the generated individual menu information to the information terminal 100.

In step S311, the information terminal 100 receives the individual menu information.

In the steps up to step S311, various screens displayed on the information terminal 100 are designed in a style defined by the manager (information bank) of the first server 200. In step S312 and later steps, however, various screens displayed on the information terminal 100 are designed in the style defined by restaurant chain B. Alternatively, text and photographs explaining foods served at restaurant chain B laid out in a style defined by the manager of the first server 200 may be used.

In step S312, the information terminal 100 displays the individual menu screen G5 or G6 indicating the received individual menu information regarding store B1 and receives an instruction to select foods and drinks to be ordered.

In step S313, the information terminal 100 transmits order information indicating the ordered foods and drinks to the second server 300. Upon receiving the order information, the second server 300 instructs, by displaying the order information on a display of a store terminal of store B1, for example, a staff member at store B1 to start cooking (step S36). This processing may be replaced by transmission, by the first server 200 that has received the order information in the next step S314, of the order information to the second server 300.

In step S314, the information terminal 100 also transmits the order information to the first server 200.

Upon receiving the order information, the first server 200 stores the order information in the memory 203 to update the order records of the user (step S35).

Figure 22:
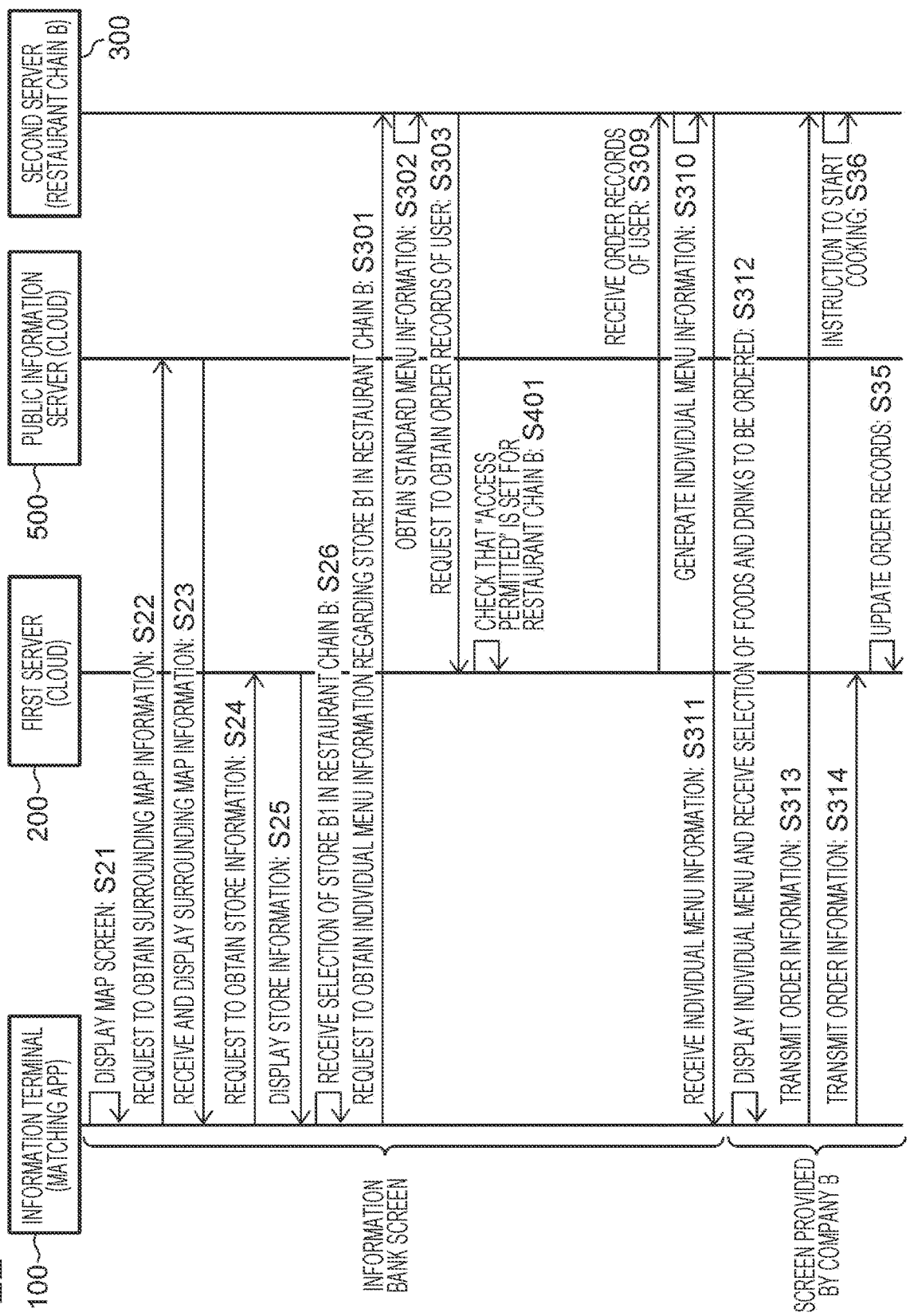
FIG. 22 is a sequence diagram illustrating another example of the process performed by the information provision system according to the third embodiment when the user's order for foods and drinks is received in consideration of whether a store that the user is visiting belongs to a restaurant chain that the user uses for a first time.

FIG. 22 is a sequence diagram illustrating another example of the process performed by the information provision system according to the third embodiment when the user's order for foods and drinks is received in consideration of whether a store that the user is visiting belongs to a restaurant chain that the user uses for a first time.

In FIG. 22, the same steps as in FIG. 21 are given the same reference numerals, and description thereof is omitted. It is assumed in FIG. 22 that the user has set, to "access permitted", access information for controlling whether to permit restaurant chain B to access the taste information (order records) regarding the user.

Steps S21 to S26 and steps S301 to S303 are the same as in FIG. 21.

In step S401 after step S303, upon receiving the request to obtain the order records of the user, the first server 200 reads the access information regarding the user from the memory 203 and checks that the access information regarding the user for restaurant chain B (or the second server 300 used by restaurant chain B) has been set to "access permitted". As a result, the first server 200 reads the order records of the user from the memory 203 and transmits the order records to the second server 300.

Step S309 and the later steps are the same as in FIG. 21.

Figure 23:
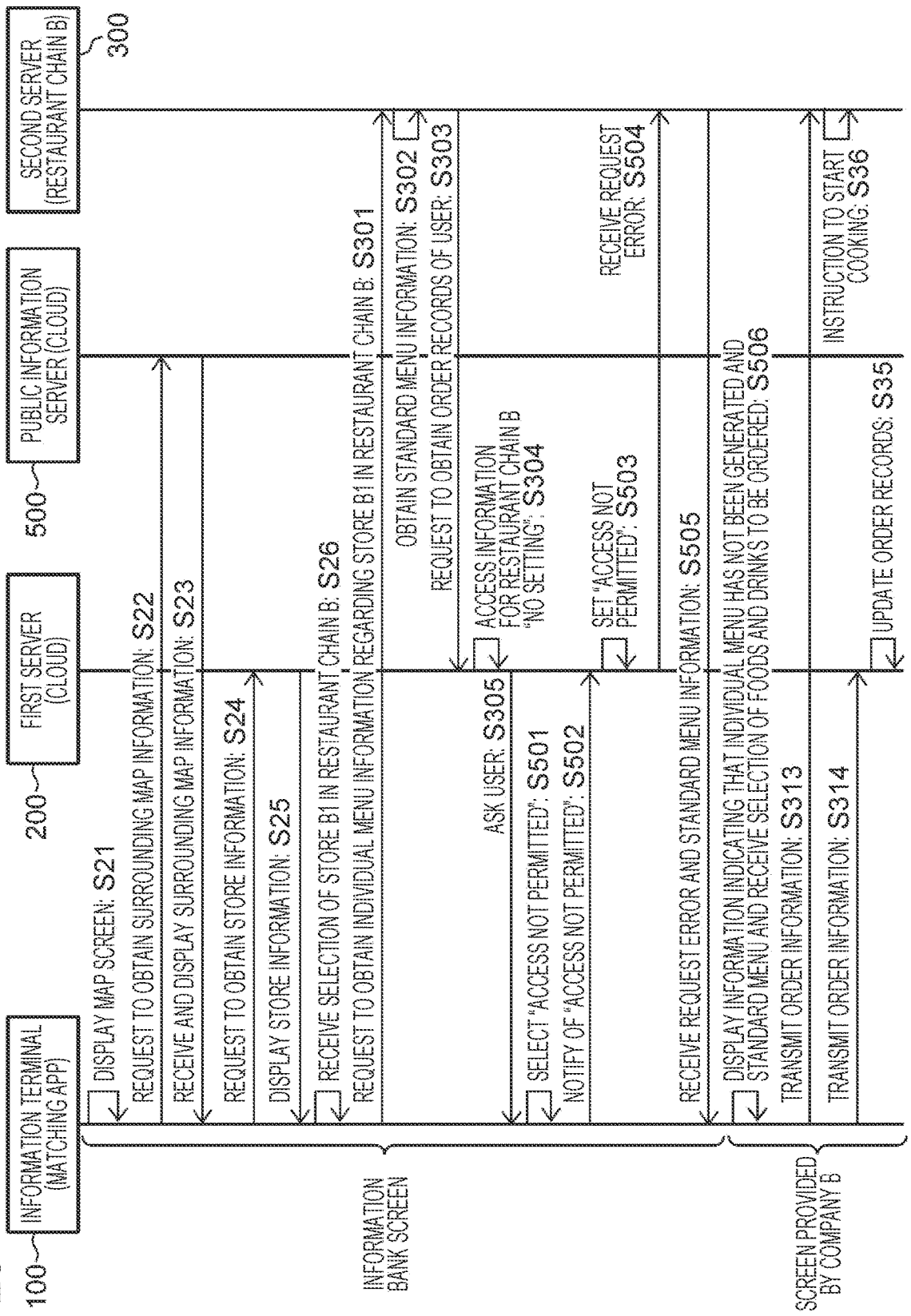
FIG. 23 is a sequence diagram illustrating yet another example of the process performed by the information provision system according to the third embodiment when the user's order for foods and drinks is received in consideration of whether a store that the user is visiting belongs to a restaurant chain that the user uses for a first time.

FIG. 23 is a sequence diagram illustrating yet another example of the process performed by the information provision system according to the third embodiment when the user's order for foods and drinks is received in consideration of whether a store that the user is visiting belongs to a restaurant chain that the user uses for a first time.

In FIG. 23, the same steps as in FIG. 21 are given the same reference numerals, and description thereof is omitted. It is assumed in FIG. 23 that the user has set, to "no setting", access information regarding the user for controlling whether to permit restaurant chain B to access the taste information (order records) regarding the user.

Steps S21 to S26 and steps S301 to S305 are the same as in FIG. 21. In step S501 after step S305, the information terminal 100 receives, from the user who has read the message, an operation for selecting "access not permitted" for the access information.

In step S502, the information terminal 100 transmits, to the first server 200, notification information indicating that the user has selected "access not permitted" for the access information.

In step S503, upon receiving the notification information indicating that the user has selected "access not permitted", the first server 200 sets the access information regarding the user for restaurant chain B or the second server 300 used by restaurant chain B to "access not permitted", the access information being stored in the memory 203. As a result, the first server 200 transmits a request error to the second server 300. The request error is information for notifying the second server 300 that it is difficult to respond to the request to obtain order records.

In step S504, the second server 300 receives the request error. Upon receiving the request error, the second server 300 reads the standard menu information regarding restaurant chain B from the memory 303 and transmits the read standard menu information and the request error to the information terminal 100.

In step S505, the information terminal 100 receives the standard menu information and the request error (information indicating that restaurant chain B is no longer permitted to access the taste information (order records) regarding the user).

In step S506, the information terminal 100 displays information indicating that an individual menu has not been generated and the standard menu screen G7 on the display 105 and receives, from the user, an instruction to select foods and drinks to be ordered.

Step S313 and the later steps are the same as in FIG. 21.

According to the third embodiment, even when the second server 300 generates individual menu information, menu information that takes into consideration taste information regarding the user can be displayed at a second restaurant that the user is using for a first time while keeping business operators that have not been authorized by the user from accessing the taste information.

Fourth Embodiment

A fourth embodiment is characterized in that when the first server 200 generates individual menu information, the first server 200 obtains standard menu information in advance.

In the fourth embodiment, the same components as in the first to third embodiments will be given the same reference numerals, and description thereof is omitted.

First, a configuration according to the fourth embodiment will be described with reference to FIG. 2. Since the first server 200 generates individual menu information in the fourth embodiment, the configuration of the first server 200 will be mainly described hereinafter.

Before the information terminal 100 obtains a store ID, the processing unit 202 obtains, over the network, menu information from a second server 300 associated with a second restaurant indicated by the store ID and stores the obtained menu information in the memory 203.

Figure 24:
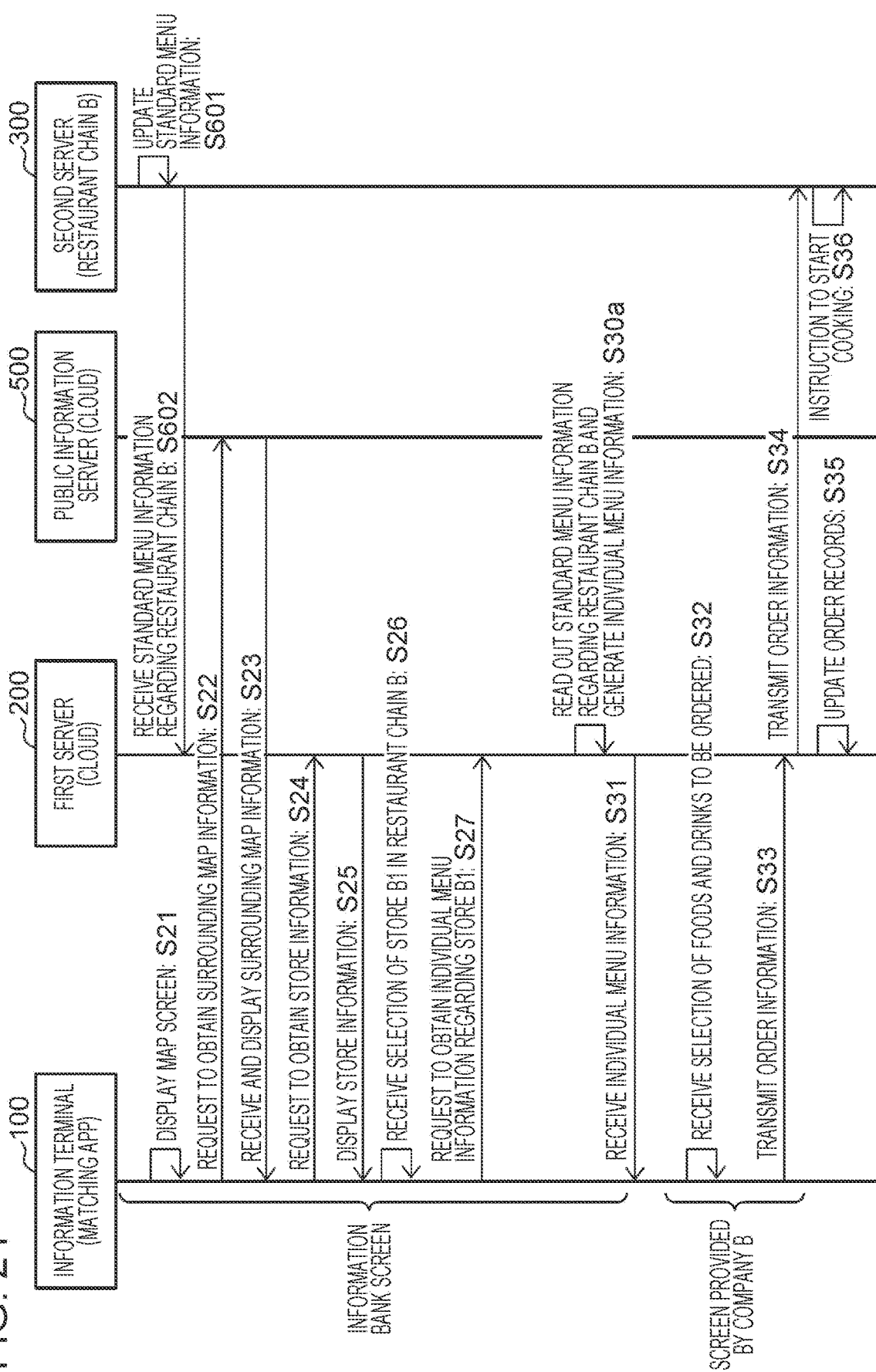
FIG. 24 is a sequence diagram illustrating an example of a process performed by an information provision system according to a fourth embodiment.

Next, a process according to the fourth embodiment will be described. FIG. 24 is a sequence diagram illustrating an example of a process performed by an information provision system according to the fourth embodiment. In FIG. 24, the same steps as in FIG. 16 are given the same reference numerals, and description thereof is omitted. Steps S21 to S27 and S31 to S36 are the same as in FIG. 16.

In the fourth embodiment, the first server 200 obtains standard menu information in advance before obtaining a store ID (step S27). In FIG. 24, therefore, the process for obtaining standard menu information (steps S28 and S29) in FIG. 16 is omitted, and steps S601 and S602 are provided at a beginning, instead.

In step S601, the second server 300 updates the standard menu information and transmits the updated standard menu information to the first server 200. In step S602, the first server 200 receives the standard menu information and stores the standard menu information in the memory 203.

As a result, the first server 200 can promptly generate individual menu information as soon as the first server 200 receives a request to obtain individual menu information.

In step S30a, after receiving a request to obtain individual menu information regarding store B1, the first server 200 reads the standard menu information regarding store B1 from the memory 203 and generates individual menu information regarding store B1 for a user on the basis of the read standard menu information and order records of the user.

More specifically, if the order records of the user at restaurant chain B do not satisfy the reference condition C1 (e.g., if it can be determined that the user is visiting restaurant chain B for a first time), the first server 200 generates the individual menu information regarding store B1 using order records of the user about foods and drinks that are the same as or similar to foods and drinks served at store B1 in restaurant chain B.

If the order records of the user at restaurant chain B satisfy the reference condition C1 (e.g., if it can be determined that the user visits restaurant chain B frequently), on the other hand, the first server 200 generates the individual menu information regarding store B1 for the user using order records of the user at restaurant chain B. Details of this process have been described above with reference to the flowchart of FIG. 17.

The standard menu information may be transmitted in step S602 in FIG. 24 at any time before the request to obtain individual menu information is transmitted (step S27).

For example, the standard menu information may be transmitted before step S21, or between step S24 and step S27.

Although the standard menu information is transmitted after the standard menu information is updated in FIG. 24, this is just an example. For example, the first server 200 may obtain standard menu information regarding a store that can be displayed on the information terminal 100 when receiving a request to obtain store information from the information terminal 100 (step S24), instead. Here, an example of the store that can be displayed is one of the stores displayed in the map screen G4 illustrated in FIG. 6. The first server 200 may obtain standard menu information regarding each of the stores displayed in the map screen G4 by transmitting a request to obtain standard menu information to a second server 300 corresponding to the store.

Fifth Embodiment

A fifth embodiment is characterized in that when the information terminal 100 generates individual menu information, the information terminal 100 obtains standard menu information in advance.

In the fifth embodiment, the same components as in the first to fourth embodiments will be given the same reference numerals, and description thereof is omitted.

First, a configuration according to the fifth embodiment will be described with reference to FIG. 2. Since the information terminal 100 generates individual menu information in the fifth embodiment, the configuration of the information terminal 100 will be mainly described hereinafter.

Before the processing unit 104 receives selection of a store ID, the processing unit 104 obtains, over the network, menu information from a second server 300 associated with a second restaurant indicated by the store ID and stores the obtained menu information in the memory 102.

Figure 25:
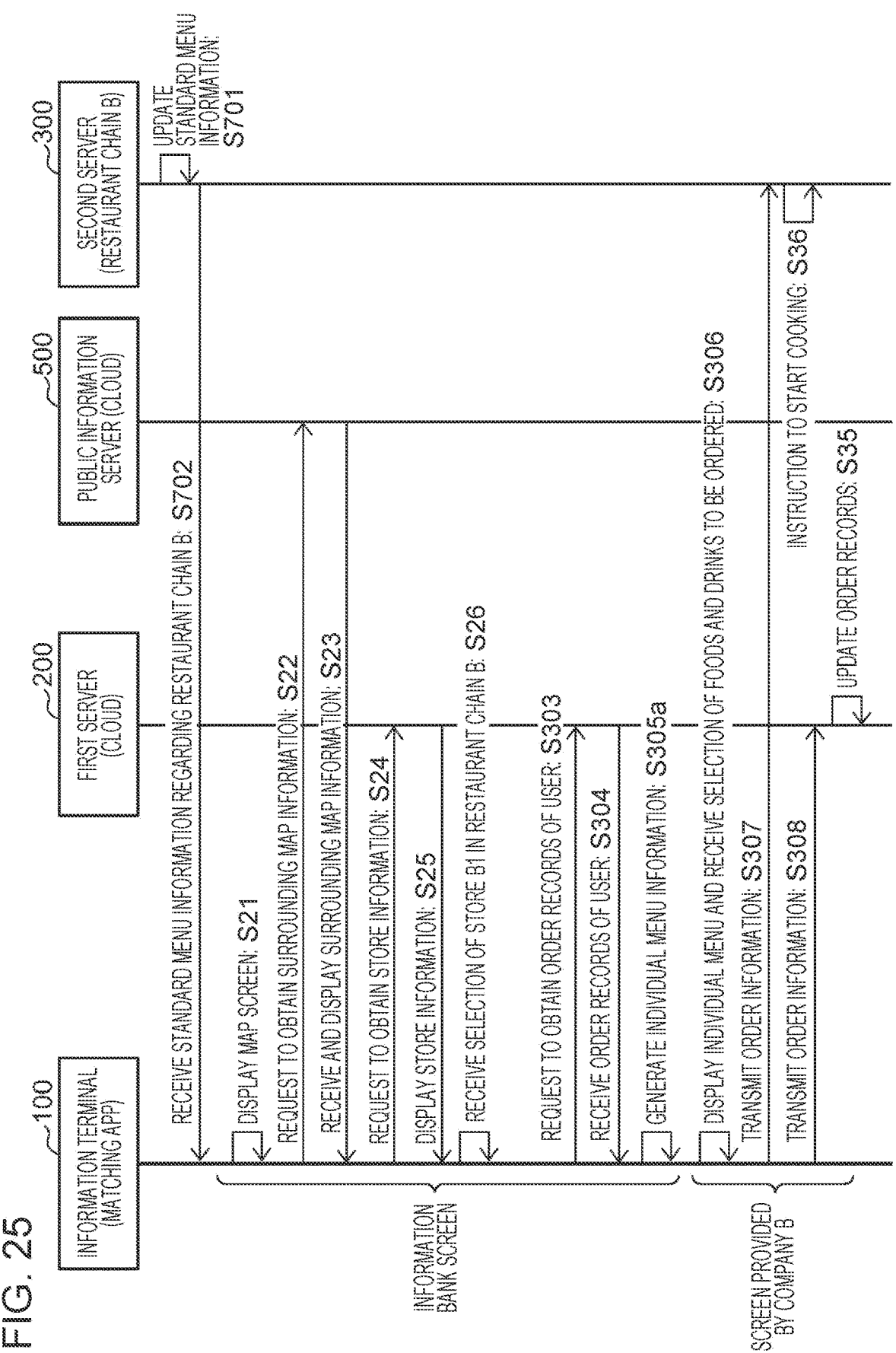
FIG. 25 is a sequence diagram illustrating an example of a process performed by an information provision system according to a fifth embodiment.

Next, a process according to the fifth embodiment will be described. FIG. 25 is a sequence diagram illustrating an example of a process performed by an information provision system according to the fifth embodiment. In FIG. 25, the same steps as in FIG. 20 are given the same reference numerals, and description thereof is omitted. Steps S21 to S26, S303, S304, S306 to S308, S35, and S36 are the same as in FIG. 20.

In the fifth embodiment, the information terminal 100 obtains standard menu information in advance before the information terminal 100 receives selection of store B1 from the user (step S26). In FIG. 25, therefore, the process for obtaining standard menu information (steps S301 and S302) in FIG. 20 is omitted, and steps S701 and S702 are provided at a beginning, instead.

In step S701, the second server 300 updates the standard menu information and transmits the updated standard menu information to the information terminal 100. In step S702, the information terminal 100 receives the standard menu information and stores the standard menu information in the memory 102.

As a result, the information terminal 100 can promptly generate individual menu information as soon as the user selects store B1.

In step S305a, after the information terminal 100 receives order records of the user, the information terminal 100 reads the standard menu information regarding store B1 from the memory 102 and generates individual menu information regarding store B1 for the user on the basis of the read standard menu information and the order records of the user.

More specifically, if the order records of the user at restaurant chain B do not satisfy the reference condition C1 (e.g., if it can be determined that the user is visiting restaurant chain B for a first time), the information terminal 100 generates the individual menu information regarding store B1 using order records of the user about foods and drinks that are the same as or similar to foods and drinks served at store B1 in restaurant chain B.

If the order records of the user at restaurant chain B satisfy the reference condition C1 (e.g., if it can be determined that the user visits restaurant chain B frequently), on the other hand, the information terminal 100 generates the individual menu information regarding store B1 for the user using order records of the user at restaurant chain B. Details of this process have been described above with reference to the flowchart of FIG. 17.

The standard menu information may be transmitted in step S702 in FIG. 25 at any time before the information terminal 100 receives the selection of store B1 from the user (step S26).

For example, the standard menu information may be transmitted before step S21, or between step S24 and step S303.

Although the standard menu information is transmitted after the standard menu information is updated in FIG. 25, this is just an example. For example, standard menu information regarding a store that can be displayed on the information terminal 100 may be obtained when the matching app on the information terminal 100 has transmitted a request to obtain store information (step S24), instead. Here, an example of the store that can be displayed is one of the stores displayed in the map screen G4 illustrated in FIG. 6. The information terminal 100 may obtain standard menu information regarding each of the stores displayed in the map screen G4 by transmitting a request to obtain standard menu information to a second server 300 corresponding to the store.

Furthermore, the matching app on the information terminal 100 may update the standard menu information by detecting the current position of the information terminal 100 on the basis of a GPS signal or the like and requesting and obtaining standard menu information regarding a nearby store from a second server 300 in advance.

Figure 26:
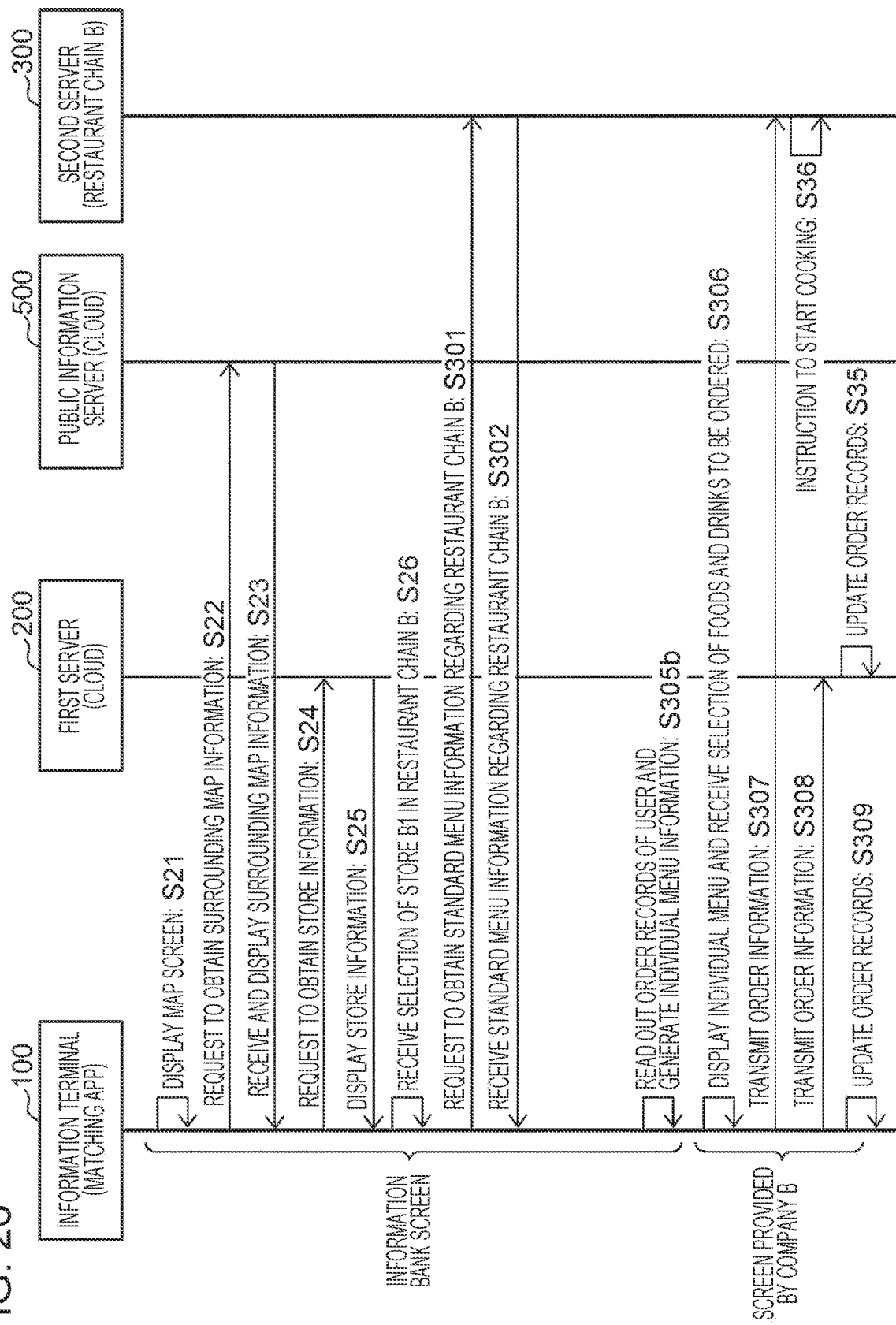
FIG. 26 is a diagram illustrating a modification of the process performed by the information provision system according to the fifth embodiment.

FIG. 26 is a diagram illustrating a process performed by the information provision system according to a modification of the fifth embodiment. In FIG. 26, the same steps as in FIG. 20 are given the same reference numerals, and description thereof is omitted. In the modification, a time at which the standard menu information is obtained is the same as in FIG. 20. In the modification, not only the first server 200 but also the information terminal 100 stores order information, which is taste information. In FIG. 26, therefore, the process where the information terminal 100 obtains the order records of the user from the first server 200 (steps S303 and S304) is omitted.

In step S305b, after the information terminal 100 obtains the standard menu information, the information terminal 100 reads the order records of the user from the memory 102 and generates individual menu information for the user using the read order records and the standard menu information.

Steps S306, S307, S308, S35, and S36 are then performed as in FIG. 20. In step S309, the information terminal 100 updates the order records stored in the memory 102 by storing current order information.

It is possible that part (from a certain period in the past) or all of the order records of the user or part (only product identification information regarding products that have been ordered the most, etc.) or all of the taste information regarding the user in selection of foods is securely cached, or securely stored and accumulated, in the memory 102 of the information terminal 100. This is called decentralized personal data store (PDS), which is different from centralized PDS, where personal information is managed at one place in a centralized manner. In this case, after an order is confirmed in step S306, the information terminal 100 securely accumulates order records in the memory 102 (step S309). Personal information (taste information) is thus accumulated in the memory 102 of the information terminal 100 and used for a next matching process.

Not by obtaining taste information (order records) from an external server over an external communication network as necessary but by using taste information securely stored in the information terminal 100, advantages such as avoidance of a risk of leakage of taste information from a communication path, reduction of a cost of communication with the outside (communication fees), and reduction of time taken to generate individual menu information are expected.

In FIG. 26, as in FIG. 25, the information terminal 100 may obtain standard menu information in advance. In this case, the information terminal 100 (matching app) can obtain both taste information (order records) needed to generate an individual menu and the standard menu information regarding restaurant chain B from the memory 102 and generate an individual menu in step S305a.

Sixth Embodiment

A sixth embodiment is characterized in that an individual menu screen includes a first display area, where first menu items, which are arranged in order according to taste information regarding the user, are displayed, and a second display area, where second menu items, which are specified by a second restaurant, are displayed.

In the sixth embodiment, the same components as in the first embodiment will be given the same reference numerals, and description thereof is omitted.

First, a configuration according to the sixth embodiment will be described with reference to FIG. 2. Since the first server 200 generates individual menu information in the sixth embodiment, the configuration of the first server 200 will be mainly described hereinafter.

The processing unit 202 of the first server 200 arranges first menu items included in menu information regarding a second restaurant indicated by a store ID of a second restaurant selected by the user in order according to taste information associated with identification information regarding the user on the basis of the taste information and the menu information.

Menu information includes first menu items arranged in order according to taste information regarding the user and second menu items specified by a second restaurant and is obtained, over the network, from a second server 300 associated with a second restaurant indicated by a store ID.

The processing unit 202 transmits, to the information terminal 100, menu information including first menu items arranged in order according to taste information and second menu items in order to display the first menu items in the first display area of a display screen of the information terminal 100 in the order according to the taste information and the second menu items specified by the second restaurant in the second display area of the display screen.

Here, the arrangement of the second menu items in the second display area may be fixed without using the taste information, or may be varied using the taste information. For example, the second menu items may be products that are specified by the second restaurant and that are arranged in accordance with the user's taste.

If the order according to the taste information is first order, the first menu items may be displayed in the first display area in the first order, and if the order according to the taste information is second order, which is different from the first order, the first menu items may be displayed in the first display area in the second order.

The second menu items may be displayed in the second display area in the same manner regardless of the order according to the taste information is the first order or the second order.

Figure 27:
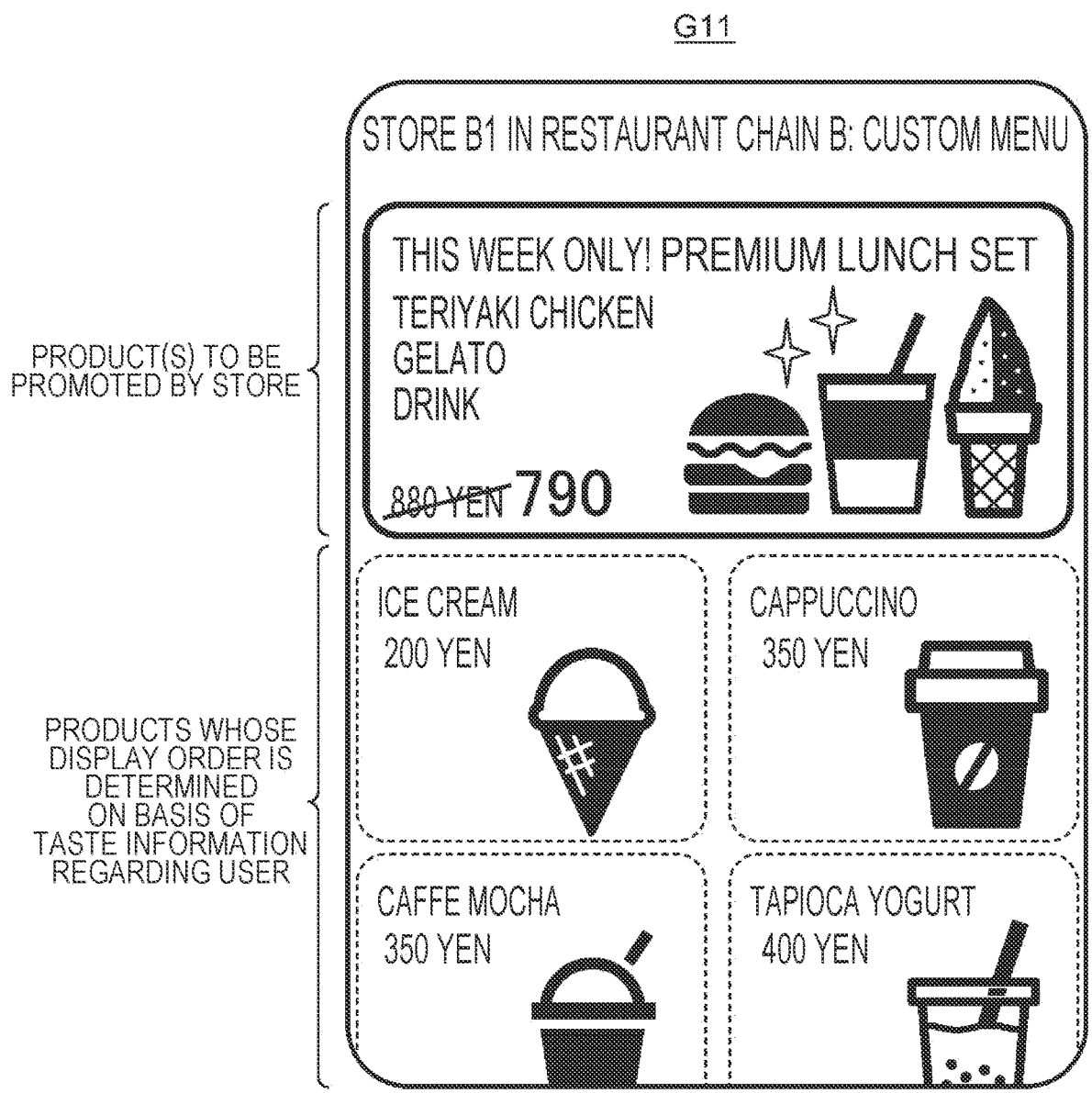
FIG. 27 is a diagram illustrating a first example of an individual menu screen according to a sixth embodiment.

FIG. 27 is a diagram illustrating an individual menu screen G11 in a first example of the sixth embodiment. In the individual menu screen G11, products specified by a restaurant or a store specified by the user are employed as some of products (dishes) included in individual menu information.

In the individual menu screen G11, "premium lunch set" displayed prominently at a top of the screen is a product specially offered by store B1 in restaurant chain B to the user, and other products, namely "ice cream", "cappuccino", "caffe mocha", and "tapioca yogurt", are products frequently ordered by the user in the past.

In the individual menu screen G11, the four products "ice cream", "cappuccino", "caffe mocha", and "tapioca yogurt" are displayed in order according to taste information regarding the user calculated from past order records (the table of FIG. 12 or 14) of the user. "Ice cream", "cappuccino", "caffe mocha", and "tapioca yogurt", for example, are arranged in descending order of the number of times that the product was ordered in the past. The order of display is from the top to the bottom, and from the left to the right when vertical positions are the same.

"Premium lunch set", on the other hand, may or may not be based on the number of times that the product was ordered in the past unlike the four products, and is displayed in the individual menu screen G11 with priority over the four products since the product has been specified by the store. That is, although it has been described that products are displayed in order according to taste information regarding the user, this need not be applied to all products displayed in the individual menu screen G11 and may be applied to only some of the products. As a result, it becomes possible for the store to promote, at any display positions and in any display modes, products that the store desires to sell or advertise. In addition, when products displayed in an individual menu screen have been fixed as a result of accumulation of a certain amount of taste information, the user's interest can be newly attracted by adding an eye-catching product.

Display priority of a product may be lowered as the number of operations (page feed etc.) or the amount of operation (the amount of screen scrolling etc.) necessary to display the product on the display of the information terminal 100 after a top page (initial display screen) of the individual menu screen G11 is displayed.

A product with high display priority may be displayed at a position that can be reached from the top page with a small number of operations or a small amount of operation. A product with low display priority, on the other hand, may be displayed at a position that can only be reached from the top page with a large number of operations or a large amount of operation.

When the information terminal 100 displays individual menu information, not all products included in the individual menu information need to be displayed in order according to taste information regarding the user about products in accordance with the number of orders placed by the user in the past and/or the taste information regarding the user.

When the individual menu screen includes at least a first product and a second product and it is determined that the user prefers the first product to the second product (e.g., the number of times that the user has ordered the first product is larger), the first product, which is preferred by the user, may be displayed in the individual menu screen G11 with priority over the second product. When a product is displayed with priority, for example, the product can be displayed with a smaller number of operations or a smaller amount of operation. Display in order according to taste information may be applied to all products included in individual menu information or some (at least two) of the products.

An example of taste information is order records, but is not limited to this. Taste information may be taste prediction values, instead. The taste prediction values can be obtained by analyzing taste information regarding a large number of users through, for example, collaborative filtering.

Figure 28:
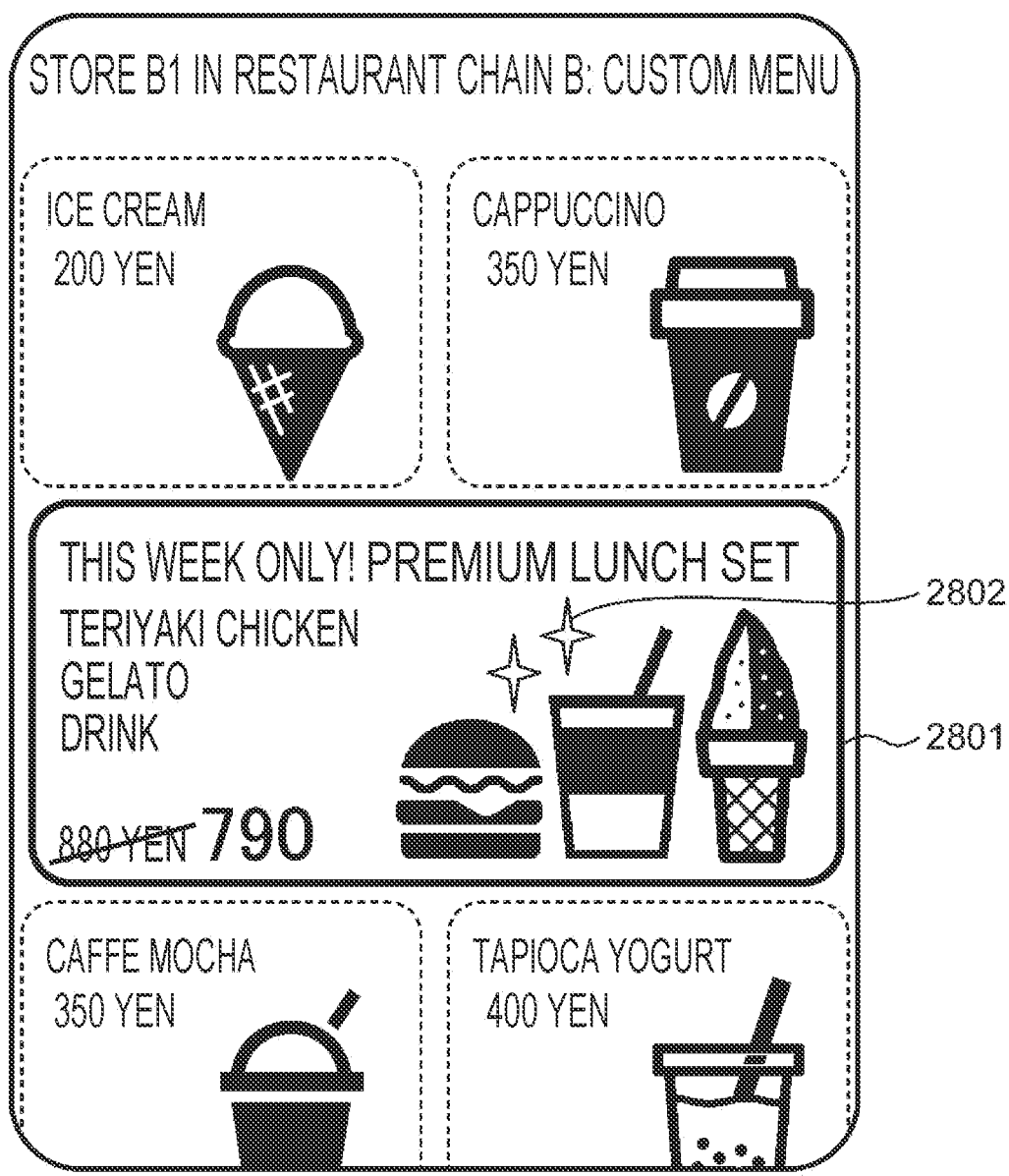
FIG. 28 is a diagram illustrating a second example of the individual menu screen according to the sixth embodiment.
Figure 29:
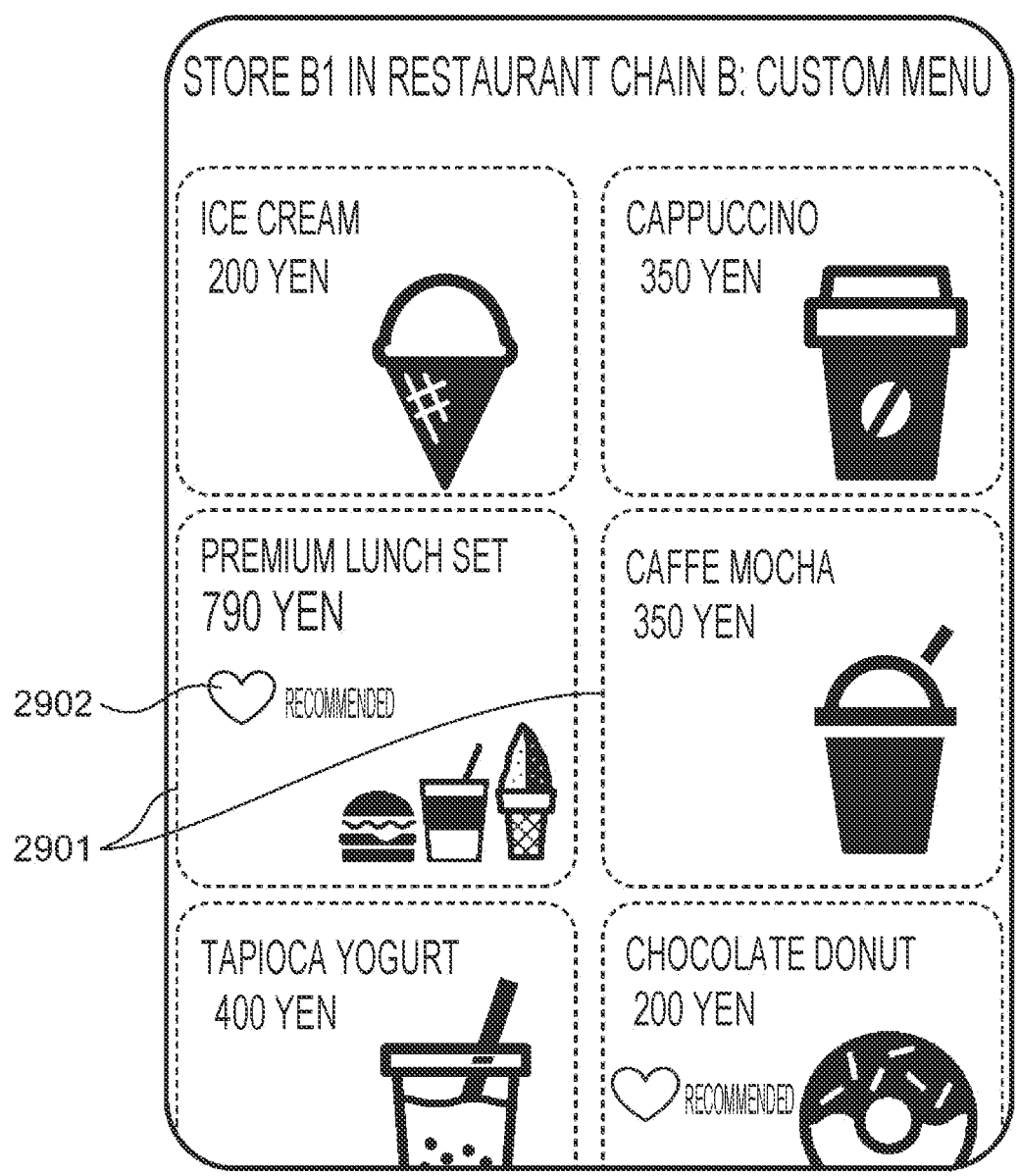
FIG. 29 is a diagram illustrating a third example of the individual menu screen according to the sixth embodiment.

FIG. 28 is a diagram illustrating an individual menu screen G12 in a second example of the sixth embodiment. FIG. 29 is a diagram illustrating an individual menu screen G13 in a third example of the sixth embodiment. In the individual menu screens G12 and G13, products are laid out in order according to taste information regarding the user, and products specified by a store are also laid out. Here, the products added by the store to individual menu information are "premium lunch set" and "chocolate donut". The other products are displayed in the order according to the taste information regarding the user.

In the individual menu screen G12, for example, "premium lunch set", which has been added by the store, is displayed in a second row. In the individual menu screen G13, for example, "premium lunch set", which has been added by the store, is displayed in a second row and a first column, and "chocolate donut", which has been added by the store, is displayed in a third row and a second column.

Like "premium lunch set" in the individual menu screen G12, a frame of a tile object 2801 of a product specified by the store may be displayed thicker than those of other tile objects, and may include a deformation mark 2802. Like "premium lunch set" and "chocolate donut" in the individual menu screen G13, tile objects 2901 of products specified by the store may each include a heart mark 2902 and a message "recommended". The store can thus design tile objects of specified products such that the tile objects can be visually distinguished from other tile objects. As a result, the store can indicate that the specified products are ones that the store desires to promote to the user.

As described above, in the individual menu screens G12 and G13, products laid out in order according to taste information regarding the user (first menu items) and products laid out through specification by the store (second menu items) can be combined freely and displayed. Any display size, any display layout, and any number of products displayed in one display area, for example, may be employed for the first menu items and the second menu items, insofar as the first menu items are laid out in order according to taste information regarding the user.

A process for generating the individual menu screen G11, G12, or G13 is included in step S104 in FIG. 17.

Figure 30:
FIG. 30 is a diagram illustrating a fourth example of the individual menu screen according to the sixth embodiment.
Figure 31:
FIG. 31 is a diagram illustrating the fourth example of the individual menu screen according to the sixth embodiment.

FIGS. 30 and 31 are diagrams illustrating an individual menu screen G14 in a fourth example of the sixth embodiment. The individual menu screen G14 is designed such that a displayed menu screen is switched using tabs. In FIG. 30, the individual menu screen G14 is an example of a screen displayed when an "order records (by preference)" tab for displaying products in order according to taste information regarding the user has been selected. In FIG. 31, the individual menu screen G14 is an example of a screen displayed when a "store recommendations" tab for displaying products specified by the storer has been selected. The tabs may also include a "drinks" tab for displaying only products of drinks and a "lunch" tab for displaying products that can be ordered during lunchtime. These tabs, however, are examples, and the "drinks" tab and the "lunch" tab need not be included.

If the "order records (by preference)" tab is selected, the information terminal 100 displays products in order according to taste information regarding the user as illustrated in FIG. 30. If the "store recommendations" tab is selected, on the other hand, the information terminal 100 displays products that the store has specified for promotion to the user as illustrated in FIG. 31.

Products desired by the user can thus be easily found by switching an attribute of products to be displayed on the screen of the information terminal 100 using the tabs.

Figure 32:
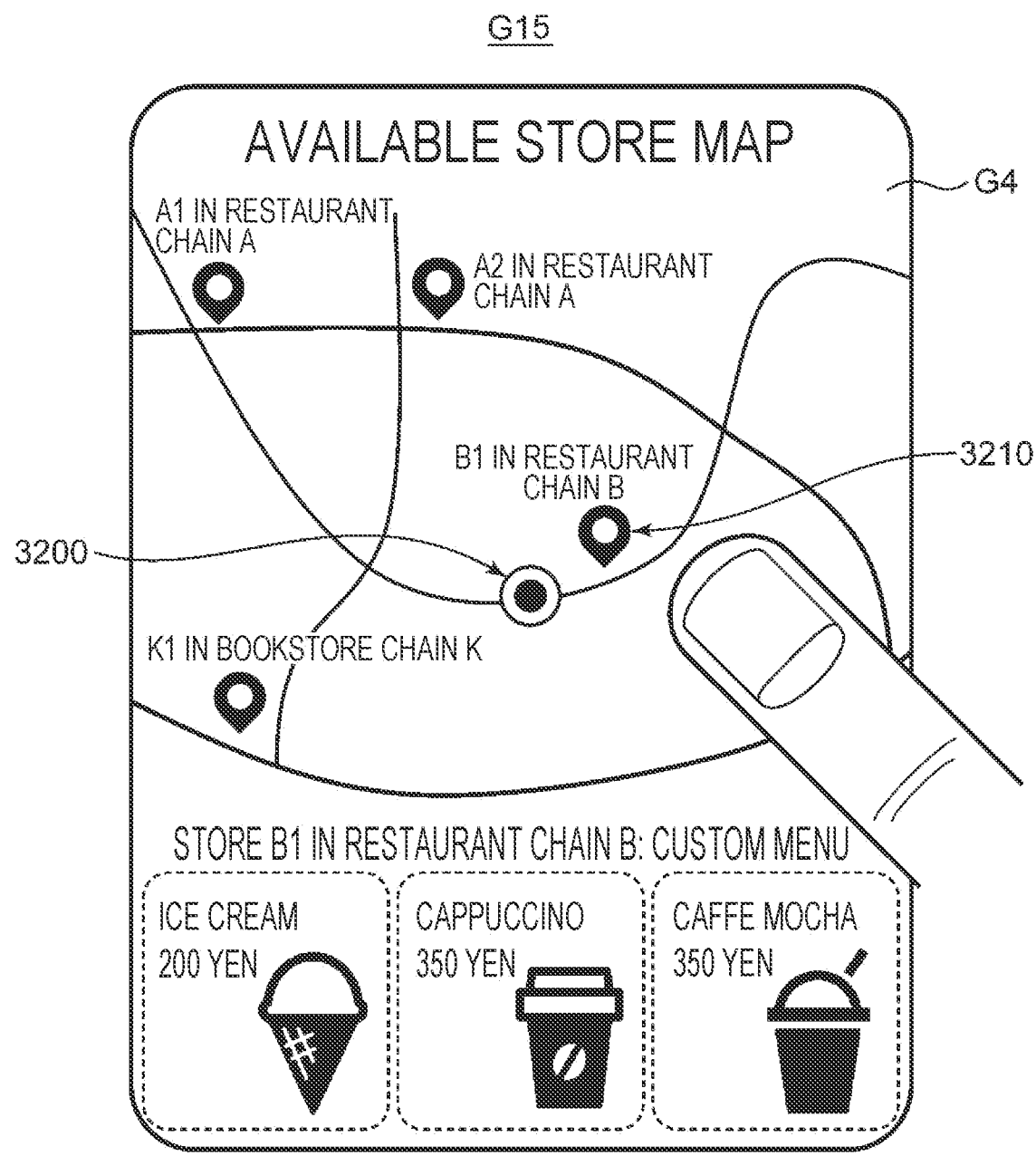
FIG. 32 is a diagram illustrating a fifth example of the individual menu screen according to the sixth embodiment.

FIG. 32 is a diagram illustrating an individual menu screen G15 in a fifth example of the sixth embodiment. If an icon 3210 indicating store B1 in restaurant chain B is selected in the map screen G4 illustrated in FIG. 6, the map screen G4, the positions of the stores displayed in the map screen G4, and the individual menu information regarding the selected store B1 are displayed in the individual menu screen G15 without switching the screen.

Although, in the above description, the map screen G4 and the individual menu screens G5, G6, and G11 to G14 occupy the entirety of the screen when displayed, the present disclosure is not limited to this.

As indicated by the individual menu screen G15, restaurant stores may be arranged in the map screen G4, and individual menu information in which a menu of a selected store and taste information regarding the user are matched may also be displayed.

In this case, the user can check individual menu information regarding each of stores while viewing a position of the store on the map screen G4. The user, therefore, can quickly check individual menu information regarding stores without switching the screen.

In addition, although the first server 200 generates the individual menu screens G11 to G15 in the sixth embodiment, the present disclosure is not limited to this. The information terminal 100 or the second server 300 may generate the individual menu screens G11 to G15, instead. Alternatively, a combination of at least two of the first server 200, the information terminal 100, and the second server 300 may be used to generate the individual menu screens G11 to G15. When the information terminal 100 generates the individual menu screens G11 to G15, the information terminal 100 may generate the individual menu screens G11 to G15 through the process according to the second or fifth embodiment. When the second server 300 generates the individual menu screens G11 to G15, the second server 300 may generate the individual menu screens G11 to G15 through the process according to the third or fourth embodiment. When the first server 200 or the information terminal 100 generates the individual menu screens G11 to G15, the first server 200 or the information terminal 100 may obtain standard menu information in advance.

APPENDIX (A-1) In the present disclosure, an identifier (ID) may be identification information of any type expressed by a sign, a number, a character string, a uniform resource locator (URL), or the like used to identify a corresponding target.

(A-2) In the present disclosure, a store ID need not be manually input by the user, and may be automatically selected, instead. For example, a store ID of a store visited by the user may be automatically selected by identifying the current position of the information terminal 100 using a wireless communication technique such as GPS, ultra-wideband (UWB), or Bluetooth, or candidates may be reduced down to stores close to the current position of the information terminal 100 and the user may select one of the stores through a sound or a touch operation.

(A-3) In the present disclosure, "order according to taste information" need not necessarily mean that all dishes (products) included in an individual menu are arranged in order according to taste information. When there are at least a first dish and a second dish to be displayed in an individual menu, for example, it is only required that the first dish and the second dish be arranged and displayed in order according to, or in consideration of, taste information regarding the user about each of the dishes.

That is, it is only required that at least two dishes to be displayed in an individual menu be arranged in order according to taste information about each of the dishes. For example, seasonal dishes, dishes recommended by a restaurant, and dishes frequently ordered by persons with taste information similar to that regarding the user need not be arranged in order according to the taste information regarding the user. Such dishes may be displayed in an initial screen of an individual menu or in an individual menu with relatively high priority.

(A-4) In the present disclosure, "first menu items included in the menu information are arranged" is not limited to a mode in which dishes are rearranged in the individual menu in order according to taste information. For example, as in the individual menu screen G6 illustrated in FIG. 8, an expression method according to taste information different from ones used for other dishes may be used for each of dishes without rearrangement. Examples of the expression method include area, thickness, color, and blinking of a dish selection frame (tile object), size and deformation of a dish image, size and deformation of text information indicating a dish name and features of a dish, and assignment of a mark or a number indicating matching or a degree of matching with taste information regarding the user.

(A-5) In the present disclosure, "servers associated with second restaurants" include all servers connected, over a network, to a server (or a computer) to which the second restaurants save and distribute menu information. For example, "servers associated with second restaurants" may include the second server 300 that holds menu information and one or more servers (or computers) that mediate between the second server 300 and the first server 200. Like "data transaction market operators" as defined in a data transaction market, "servers associated with second restaurants" may include a data transaction market operator that mediates between data providers and data recipients and that provides functions such as data and consideration exchange and settlement and a server (or a computer) operated by the data transaction market operator.

(B-1) In the present disclosure, an "area including a position indicated by positional information" refers to any area where people engage in economic activity and that includes a position indicated by positional information. Examples of the "area including a position indicated by positional information" include the Earth, a country, an administrative unit such as a prefecture or a municipality, a circular parcel of a certain radius, and a parcel having any shape. The "area including a position indicated by positional information" may thus be any limited range recognizable by the user.

(B-2) When the "second menu items specified by the second restaurant are displayed" in the present disclosure, an individual menu is displayed over the entirety of the display 105 of the information terminal 100 in the example illustrated in FIG. 10. A display mode, however, is not limited to this. As in the example illustrated in FIG. 32, when the "second menu items specified by the second restaurant are displayed", a mode in which at least two of a map, a selected store, and an individual menu of the store are simultaneously displayed may be included. In doing so, screen transition is reduced, and the user can quickly check dishes recommended by the store.

(B-3) When the first server 200 provides part or all of personal information for an external party, the personal information may be provided using a mechanism with which the party who uses the personal information (e.g., an application on the information terminal 100 or the second server 300) cannot decipher the personal information. This mechanism is called secure computation. In secure computation, personal information is provided for a user in an encrypted state, and the user performs necessary operations on the encrypted personal information. That is, unlike conventional methods that encrypt saved data or data to be communicated, secure computation is a cryptographic technique that performs necessary operations on encrypted data as it is. In order to achieve secure utilization of personal information by the information terminal 100 and the second server 300 in the present disclosure, secure computation may be used.

(B-4) An information bank has been described in the present disclosure as a business operator that provides a service for accumulating personal information such as attributes, taste, and behavior by name for each person and managing the personal information under the will of the person, but this is just an example. An information bank may be interpreted as a personal data store (PDS), a personal information management system (PIMS), a data sharing company, or a data processing company that provides similar functions, instead.

(C-1) In the present disclosure, an "input device" is not limited to the display 105 of the information terminal 100, which is operated by touch with a finger. The "input device" may receive an instruction to select a store based on the user's voice from a microphone sensor (not illustrated) of the information terminal 100 or the user's line of sight from the camera 103 of the information terminal 100. For example, an icon of a store on the user's line of sight may be detected, and the store indicated by the icon may be determined to be the store selected by the user. Alternatively, the "input device" may be the GPS sensor 107 of the information terminal 100. In this case, the information terminal 100 may automatically determine a store selected by the user on the basis of current position information detected by the GPS sensor 107. If the information terminal 100 detects that the user has entered a store on the basis of the current position information, for example, the information terminal 100 may determine that the store is one selected by the user. Information obtained by these input devices may be combined together to receive an instruction to select a store.

(C-2) In the present disclosure, "obtaining taste information associated with the identification information from the first server" obviously includes obtaining taste information through one or more servers (or computers) networked with the first server. If part or all of taste information regarding the user managed by the first server is securely cached or stored in the memory 102 of the information terminal 100 and can be used securely from the memory 102 of the information terminal 100, the taste information regarding the user may be obtained from not the first server 200 but the information terminal 100. In this case, there are advantages such as reduction of a processing load of the first server 200 and prevention of processing delays on the network or the first server 200. Furthermore, in this case, if a data protection architecture in the information terminal 100 is sufficiently advanced and reliable, there is also an advantage of avoiding a risk of information leakage through communication with the first server 200.

(D-1) In the present disclosure, "authorized by the user" includes authorizing, on the basis of a direct instruction from the user or a prior arrangement, a second restaurant (or a second server associated with the second restaurant) to use part or all of taste information regarding the user.

(D-2) In the present disclosure, "held in a second server" includes a mode in which a server other than the second server or a computer from which the second server can obtain menu information holds the menu information.

An example of the method for providing information in the present disclosure is effective as a technique provided for a food service industry, which provides foods and drinks to users, since the users can efficiently order foods and drinks with the method.

What is claimed is:

1. A method for providing information in an information management system that manages taste information regarding a user including an order record at a first restaurant with the user's permission and that associates the taste information with identification information for identifying the user, the method comprising:
   obtaining, from a terminal apparatus, the identification information and a store identifier indicating a second restaurant in a chain different from a chain to which the first restaurant belongs;
   obtaining menu information regarding the second restaurant indicated by the store identifier from a server associated with the second restaurant over a network;
   arranging, when a number of order records of the user at the second restaurant is smaller than a certain value on a basis of the taste information associated with the identification information and the menu information regarding the second restaurant, first menu items included in the menu information regarding the second restaurant in order that reflects the taste information including the order record at the first restaurant with the user's permission, without transmitting the taste information regarding the user to the server, the menu information including the first menu items and second menu items specified by the second restaurant; and
   transmitting, to the terminal apparatus, the menu information including the first menu items arranged in the order and the second menu items to the terminal apparatus, to display the first menu items arranged in the order in a first display area of a display screen of the terminal apparatus and display the second menu items specified by the second restaurant in a second display area of the display screen.

2. The method according to claim 1,
wherein arrangement of the second menu items in the second display area is specified by the second restaurant.

3. The method according to claim 1,
wherein, when the order that reflects the taste information is first order, the first menu items are arranged in the first order and displayed in the first display area, and
when the order that reflects the taste information is second order, which is different from the first order, the first menu items are arranged in the second order and displayed in the first display area, and
wherein the second menu items are displayed in the second display area in a same mode regardless of whether the order that reflects the taste information is the first order or the second order.

4. The method according to claim 1,
wherein the second restaurant includes a coffee shop in a chain different from the chain to which the first restaurant belongs.

5. The method according to claim 1,
wherein the second restaurant includes a hamburger shop in a chain different from the chain to which the first restaurant belongs.

6. The method according to claim 1, further comprising:
obtaining positional information regarding the terminal apparatus of the user; and
providing, on a basis of the positional information, the terminal apparatus with restaurant information indicating one or more restaurants in an area including a position indicated by the positional information,
wherein the store identifier is selected on the terminal apparatus on a basis of the restaurant information.

7. The method according to claim 6,
wherein the positional information regarding the terminal apparatus of the user is obtained using a global positioning system.

8. The method according to claim 1,
wherein, when there is no order record of the user at the second restaurant in the information management system, the first menu items included in the menu information regarding the second restaurant are arranged in the order that reflects the taste information including the order record at the first restaurant on a basis of the taste information associated with the identification information and the menu information regarding the second restaurant.

9. The method according to claim 8,
wherein, when there is an order record of the user at the second restaurant in the information management system, the first menu items included in the menu information regarding the second restaurant are arranged in order that reflects the order record at the second restaurant on a basis of the order record at the second restaurant and the menu information regarding the second restaurant.

10. The method according to claim 1,
wherein, when the number of order records of the user at the second restaurant is larger than or equal to the certain value in the information management system, the first menu items included in the menu information regarding the second restaurant are arranged in order that reflects the order record at the second restaurant on a basis of the order record at the second restaurant and the menu information regarding the second restaurant.

11. The method according to claim 1,
wherein the order record at the first restaurant is stored in the information management system and associated with a store identifier indicating the first restaurant.

12. The method according to claim 1,
wherein the store identifier is selected on the terminal apparatus.

13. A method for providing information in an information management system that manages taste information regarding a user including an order record at a first restaurant with the user's permission and that associates the taste information with identification information for identifying the user, the method comprising:
   obtaining, from a terminal apparatus, the identification information and a store identifier indicating a second restaurant in a chain different from a chain to which the first restaurant belongs;
   obtaining menu information regarding the second restaurant indicated by the store identifier from a server associated with the second restaurant over a network;
   arranging, when a latest order record of the user at the second restaurant precedes a certain period of time on a basis of the taste information associated with the identification information and the menu information regarding the second restaurant, the first menu items included in the menu information regarding the second restaurant in order that reflects the taste information including the order record at the first restaurant with the user's permission, without transmitting the taste information regarding the user to the server, the menu information including the first menu items and second menu items specified by the second restaurant; and transmitting, to the terminal apparatus, the menu information including the first menu items arranged in the order and the second menu items, to display the first menu items arranged in the order in a first display area of a display screen of the terminal apparatus and display the second menu items specified by the second restaurant in a second display area of the display screen.

14. The method according to claim 13,
wherein, when the latest order record of the user at the second restaurant is within the certain period of time in the information management system, the first menu items included in the menu information regarding the second restaurant are arranged in order that reflects the order record at the second restaurant on a basis of the order record at the second restaurant and the menu information regarding the second restaurant.

15. A method for providing information in an information management system that manages taste information regarding a user including an order record at a first restaurant with the user's permission and that associates the taste information with identification information for identifying the user, the method comprising:

obtaining positional information regarding a terminal apparatus used by the user;

providing, on a basis of the positional information, the terminal apparatus with restaurant information indicating one or more restaurants in an area including a position indicated by the positional information;

obtaining, from the terminal apparatus, the identification information and a store identifier indicating, among the one or more restaurants, a second restaurant in a chain different from a chain to which the first restaurant belongs;

obtaining menu information regarding the second restaurant indicated by the store identifier from a server associated with the second restaurant over a network;

arranging, when a number of order records of the user at the second restaurant is smaller than a certain value on a basis of the taste information associated with the identification information and the menu information regarding the second restaurant, first menu items included in the menu information regarding the second restaurant in order that reflects the taste information including the order record at the first restaurant with the user's permission, without transmitting the taste information regarding the user to the server, the menu information including the first menu items and second menu items specified by the second restaurant; and transmitting, to the terminal apparatus, the menu information including the first menu items arranged in the order and the second menu items to the terminal apparatus, to display the first menu items arranged in the order in a first display area of a display screen of the terminal apparatus and display the second menu items specified by the second restaurant in a second display area of the display screen.

16. The method according to claim 15,
wherein the order record at the first restaurant is stored in the information management system and associated with a store identifier indicating the first restaurant.

17. The method according to claim 15,
wherein the store identifier is selected on the terminal apparatus.

18. A method for providing information in an information management system that manages taste information regarding a user including an order record at a first restaurant with the user's permission and that associates the taste information with identification information for identifying the user, the method comprising:

obtaining, from a terminal apparatus, the identification information and a store identifier indicating a second restaurant in a chain different from a chain to which the first restaurant belongs;

obtaining menu information regarding the second restaurant indicated by the store identifier from a server associated with the second restaurant over a network;

arranging, when a number of orders at the second restaurant within a set period of time is smaller than or equal to a certain value on a basis of the taste information associated with the identification information and the menu information regarding the second restaurant, first menu items included in the menu information regarding the second restaurant in order that reflects the taste information including the order record at the first restaurant with the user's permission, without transmitting the taste information regarding the user to the server, the menu information including the first menu items and second menu items specified by the second restaurant; and transmitting, to the terminal apparatus, the menu information including the first menu items arranged in the order and the second menu items, to display the first menu items arranged in the order in a first display area of a display screen of the terminal apparatus and display the second menu items specified by the second restaurant in a second display area of the display screen.

* * * * *